(12) United States Patent
Ishikawa et al.

(10) Patent No.: US 7,723,413 B2
(45) Date of Patent: May 25, 2010

(54) METHOD AND COMPOSITION FOR CONTROL OF CRYSTALLIZATION RATE OF POLYOLEFIN RESIN, RESIN COMPOSITION AND RESIN MOLDING

(75) Inventors: Masahide Ishikawa, Uji (JP); Sukehiro Niga, Otsu (JP)

(73) Assignee: New Japan Chemical Co., Ltd., Kyoto-Shi (JP)

( * ) Notice: Subject to any disclaimer, the term of this patent is extended or adjusted under 35 U.S.C. 154(b) by 769 days.

(21) Appl. No.: 10/583,000

(22) PCT Filed: Dec. 22, 2004

(86) PCT No.: PCT/JP2004/019701

§ 371 (c)(1),
(2), (4) Date: Jun. 13, 2006

(87) PCT Pub. No.: WO2005/063874

PCT Pub. Date: Jul. 14, 2005

(65) Prior Publication Data

US 2007/0142514 A1  Jun. 21, 2007

(30) Foreign Application Priority Data

Dec. 26, 2003 (JP) .............................. 2003-432138
Jun. 7, 2004 (JP) .............................. 2004-169266

(51) Int. Cl.
*C08G 12/12* (2006.01)

(52) U.S. Cl. ..................... 524/226; 524/227; 524/228; 524/229

(58) Field of Classification Search .................. 524/226, 524/227, 228, 229

See application file for complete search history.

(56) References Cited

U.S. PATENT DOCUMENTS

| 5,969,021 A | 10/1999 | Reddy et al. ................. 524/229 |
| 2006/0091581 A1* | 5/2006 | Sadamitsu et al. .......... 264/211 |

FOREIGN PATENT DOCUMENTS

| JP | 4-261447 | 9/1992 |
| JP | 6-192496 | 7/1994 |
| JP | 6-234890 | 8/1994 |
| JP | 7-242610 | 9/1995 |
| JP | 7-278374 | 10/1995 |
| JP | 08-100088 | 4/1996 |
| JP | 8-157640 | 6/1996 |
| JP | 10-273569 | 10/1998 |
| JP | 10-279739 | 10/1998 |
| JP | 11-228707 | 8/1999 |

* cited by examiner

*Primary Examiner*—Peter D Mulcahy
(74) *Attorney, Agent, or Firm*—Kratz, Quintos & Hanson, LLP

(57) ABSTRACT

Disclosed are a composition for controlling the crystallization rate of a polyolefin-based resin, the composition comprising (A) an amide-based compound which is a substituted or unsubstituted cyclohexylamide of 1,2,3-propanetricarboxylic acid or 1,2,3,4-butanetetracarboxylic acid and (B) a fatty acid metal salt, wherein the component (A):component (B) weight ratio is from 100:0 to 30:70; a method for controlling the crystallization rate of a polyolefin-based resin, comprising incorporating the composition into the polyolefin-based resin to obtain a polyolefin-based resin composition and molding the resin composition; molded products obtained by the method; and the like.

31 Claims, 6 Drawing Sheets

Fig. 8

| (A):(B) | Molding method (I)<br>Tm ≤ T ≤ Tsh | | Molding method (II)<br>Tsh < T |
|---|---|---|---|
| (A):(B)=100:0 | Component (A) only<br><br>Region (IA) | ≥ | Component (A) only<br><br>Region (IIA) |
| | ∧∣ | Crystalli-<br>zation<br>rate | ∨<br>∨ |
| 30:70≤(A):(B)<100:0 | Component (A) +<br>Component (B)<br><br>Region (IAB) | ≫≫ | Component (A) +<br>Component (B)<br><br>Region (IIAB) |

Crystallization rate :
  Region (IAB) ≥ Region (IA) ≥ Region (IIA) >> Region (IIAB)

METHOD AND COMPOSITION FOR CONTROL OF CRYSTALLIZATION RATE OF POLYOLEFIN RESIN, RESIN COMPOSITION AND RESIN MOLDING

TECHNICAL FIELD

The present invention relates to a composition for controlling crystallization rate of a polyolefin-based resin, a polyolefin-based resin composition containing the crystallization rate-controlling composition, a polyolefin-based resin molded product obtained by molding the resin composition, a method for controlling the crystallization rate during molding of the polyolefin-based resin composition, and a process for preparing polyolefin-based resin molded product using the controlling method.

BACKGROUND ART

Due to their excellent moldability, mechanical characteristics, electrical properties, etc., polyolefin-based resins are used in various fields as materials for film molding (i.e., molding for production of films), sheet molding (i.e., molding for production of sheets), blow molding, injection molding, etc. Although physical properties are generally excellent, such polyolefin-based resins have the problem of having low transparency, crystallizability and rigidity.

There have heretofore been proposals to use amide-based compounds, etc. as a nucleating agent so as to solve these problems (Japanese Unexamined Patent Publication No. 1994-192496, Japanese Unexamined Patent Publication No. 1995-242610, Japanese Unexamined Patent Publication No. 1995-278374, and Japanese Unexamined Patent Publication No. 1996-100088). When polyolefin-based resin compositions containing such amide-based compounds are molded, molded products with excellent transparency and mechanical strength can be obtained.

However, in order to obtain molded products with such outstanding characteristics in commercial production, the molding conditions need to be optimized according to the molding method to be adopted.

The molding methods include injection molding, extrusion molding, sheet molding, film molding, blow molding, etc. Molded product manufacturers must appropriately determine the molding conditions (injection or extrusion rate, injection pressure, resin temperature, mold temperature, chill roll temperature, shape of molds, etc.) of the molding machine according to the molding method, so as to optimize the processing conditions.

However, optimization of such molding conditions takes much time since many variables need to be determined, and the determination thereof is complicated. When such molding conditions are not determined correctly, the following problems may occur: white spots originating from non-dispersed nucleating agents may appear in the molded products, the transparency of the molded products may be inferior, the mechanical strength of the molded products may be weak, etc.

It is also known that certain nucleating agents elevate the crystallization temperature of polyolefin-based resins to some extent, and the molding cycle time can be shortened by using such nucleating agent. However, the use of such nucleating agent merely results in a crystallization temperature peculiar to the use of such nucleating agent, and the crystallization temperature cannot be controlled. Therefore, the use of such nucleating agent currently does not greatly contribute toward facilitating and expediting the setting of molding conditions or diversification and flexibility of the processing conditions.

DISCLOSURE OF THE INVENTION

In view of the above situation, an object of the invention is to facilitate and expedite the setting of molding conditions, or to diversify and render flexible the processing conditions.

Under the above-described circumstances, the inventors have conducted intensive research to solve the above-described problems. In particular, the inventors investigated into the setting of processing conditions, and found that the cumbersomeness in setting processing conditions is largely attributable to the crystallization rate of polyolefin-based resins, and if the crystallization rate of polyolefin-based resins can be controlled without solely depending on the setting of processing conditions by means of a molding machine, the setting of processing conditions can be facilitated and expedited, and the processing conditions can be rendered flexible and diversified.

More specifically, depending on the type of the molding method and the resin to be molded, the rapid crystallization rate of a resin may sometimes hinder the processing. For example, if the crystallization rate of the polyolefin-based resin is not in a suitable range, a homogenous molded product cannot be obtained by film molding, sheet molding, blow forming, injection molding of a large-size product, or the like. However, in order to reduce the crystallization rate to said suitable range, the cumbersome setting of processing conditions (such as resin discharge speed, resin discharge amount, pressure at the time of injection molding, chill roll rotation speed, mold or chill roll temperature, mold shape, cooling time, cooling rate, etc.) by means of a molding machine must be resorted to. On the other hand, it would be industrially advantageous, for example, in the field of the injection molding for small-size products or the like, if the crystallization rate of polypropylene-based resin can be increased to shorten the molding cycle time (high speed molding) so as to reduce production costs as much as possible. However, in order to shorten the molding cycle time, it is only known to use a certain nucleating agent to increase the crystallization temperature, and in order to increase the crystallization rate, the cumbersome setting of the processing conditions by means of a molding machine (such as cooling time, cooling speed, etc.) must again be resorted to.

Under the circumstances, the present inventors considered that a resin composition by which the crystallization rate can be controlled, if provided, would allow a wide range of processing without solely depending on the cumbersome procedure for determining processing variables by means of a molding machine.

The present inventors conducted further researches, and found that when (A) a specific amide-based compound and (B) a specific fatty acid metal salt are mixed with a polyolefin-based resin in a specific weight ratio, the crystallization rate (end time of crystallization) of the polyolefin-based resin is controllable. Specifically, the inventors obtained the following findings:

(a) Specific amide-based compounds (A) are dissolution-type nucleating agents.

(b) When the change in storage modulus with temperature of a molten polyolefin-based resin composition prepared by dissolving the amide-based compound (A) in a polyolefin-based resin is measured, there is a transition point in each of the curve obtained during heating and the curve obtained during cooling, and the derivative curve obtained from each storage modulus temperature dependency curve shows an extreme value.

(c) The finding in item (b) above shows that a network structure formed of fibrous particles of the above amide-based compound is present in the molten polyolefin-based resin in a specific temperature range. This fact was heretofore not known at all, but was discovered for the first time by the inventors.

(d) When the resin temperature (molding temperature) T during molding is set to a temperature not higher than the transition temperature of storage modulus during heating Tsh or to a temperature higher than Tsh, and the amide-based compound (A) and a specific fatty acid metal salt (B) are used in a specific ratio, the crystallization rate (end time of crystallization) of the polyolefin-based resin can be controlled.

(e) More specifically, as shown in FIG. 8, in case the resin temperature (molding temperature) T during molding is set to a temperature not lower than the melting temperature Tm of the polyolefin-based resin but not higher than the transition temperature of storage modulus during heating Tsh (molding method (I) shown in FIG. 8), the crystallization rate of the polyolefin-based resin can be increased (end time of crystallization can be shortened) when the proportion of the specific fatty acid metal salt (B) is increased (region (IA)→region (IAB)).

(f) Also in case the resin temperature (molding temperature) T during molding is set to a temperature higher than the transition temperature of storage modulus during heating Tsh (molding method (II) shown in FIG. 8), the crystallization rate of the polyolefin-based resin can be reduced (end time of crystallization can be prolonged) when the proportion of the specific fatty acid metal salt (B) is increased (region (IIA)→region (IIAB)).

(g) Thus, when observed over the entire molding temperature range consisting of the temperature range not higher than the transition temperature of storage modulus during heating Tsh and the temperature range higher than Tsh, and also when observed in each of the resin temperature range from Tm to Tsh and the resin temperature range higher than Tsh, by changing the proportion of the specific fatty acid metal salt, the crystallization rate of the polyolefin-based resin can be controlled, i.e., reduced or increased, as compared with the crystallization rate achieved in molding method (II) mentioned in item (f) by using the crystallization rate controlling composition comprising only the specific amide-based compound (without containing the fatty acid metal salt).

(h) Molding method (I) mentioned in item (e) above can increase the crystallization rate, and therefore shortens the molding cycle time, the reduction of which is generally the main purpose of using nucleating agents, and is therefore suitable mainly for injection molding of small-size products at high speed. In this case, the molding is carried out at a resin temperature not higher than the transition temperature of storage modulus during heating Tsh, and therefore, as shown in (I) of FIG. 7, the molding is carried out while the network structure mentioned in item (c) above is present, and the fibrous particles constituting the network structure is oriented, with the result that the polyolefin-based resin crystal lamellae can be oriented in the resulting molded product, consequently giving a molded product that is particularly excellent in rigidity. By increasing or reducing the proportion of fatty acid metal salt (B), the crystallization rate of the polyolefin-based resin can be controlled.

(i) On the other hand, molding method (II) mentioned in item (f) above can decrease the crystallization rate, and tends to give homogeneous molded products, and therefore is advantageous for film molding, sheet molding and injection molding of large-size molded products. In this case, the molding is carried out at a resin temperature higher than the transition temperature of storage modulus during heating Tsh, and therefore, as shown in (II) of FIG. 7, the molding is carried out, with no network structure mentioned in item (c) above being present, with the result that, upon cooling the molten resin composition, fibrous particles of the amide-based compound are formed and re-constitute a network structure, from which minute crystals (spherulites) of the polyolefin-based resin are formed, and consequently molded products having excellent transparency can be produced. By increasing or reducing the proportion of fatty acid metal salt (B), the crystallization rate of the polyolefin-based resin can be controlled.

(j) As stated above, the present invention can control (change) the polyolefin-based resin crystallization rate, but does not substantially modify other nucleating functions of the amide-based compound. Thus, according to the invention, the crystallization rate can be controlled not only by setting the molding machine variables but also by using the crystallization rate-controlling composition of the invention, thereby expanding the flexibility of setting the molding conditions during molding process, consequently facilitating production of molded products having excellent properties.

Based on these findings, the inventors conducted further research and accomplished the present invention. The present invention provides a polyolefin-based resin crystallization rate-controlling composition, a resin composition comprising the crystallization rate-controlling composition, a molded product obtained by molding the polyolefin-based resin composition and its production process, and a method for controlling the crystallization rate of the polyolefin-based resin, a process for producing a polyolefin-based resin molded product using the controlling method, and the like, that are described below.

Item 1. A composition for controlling the crystallization rate of a polyolefin-based resin, the composition comprising:

(A) at least one amide-based compound represented by General Formula (1)

(1)

wherein $R^1$ represents a residue obtained by removing all the carboxyl groups of 1,2,3-propanetricarboxylic acid or 1,2,3,4-butanetetracarboxylic acid, k represents an integer of 3 or 4, and the three or four $R^2$ groups are the same or different, and each represent cyclohexyl or cyclohexyl substituted with one $C_{1-10}$ linear or branched alkyl; and (B) at least one fatty acid metal salt represented by General Formula (2)

(2)

wherein $R^3$ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two $R^3$ groups may be the same or different, and M represents a monovalent or divalent metal, the component (A):component (B) weight ratio being from 100:0 to 30:70 (namely based on the total amount of components (A) and (B), component (A) being present in an amount of 100 to 30 wt. % and component (B) being present in an amount of 0 to 70 wt. %).

Item 2. The composition according to Item 1, wherein the component (A):component (B) weight ratio is from 95:5 to 30:70 (namely based on the total amount of components (A) and (B), component (A) being present in an amount of 95 to 30 wt. % and component (B) being present in an amount of 5 to 70 wt. %).

Item 3. The composition according to Item 1 or Item 2, wherein the three or four $R^2$ groups in General Formula (1) are the same or different and each represent cyclohexyl or cyclohexyl substituted with one $C_{1-4}$ alkyl.

Item 4. The composition according to Item 1, wherein the three or four $R^2$ groups in General Formula (1) are the same or different and each represent cyclohexyl, or 2-methyl-, 3-methyl- or 4-methyl-substituted cyclohexyl.

Item 5. The composition according to any one of Items 1 to 4, wherein $R^1$ in General Formula (1) represents a residue obtained by removing all of the carboxyl groups from 1,2,3-propanetricarboxylic acid, and k is 3.

Item 6. The composition according to any one of Items 1 to 5, wherein M in General Formula (2) is at least one metal selected from the group consisting of alkali metals, alkaline earth metals and zinc.

Item 7. The composition according to any one of Items 1 to 6, wherein $R^3$ in General Formula (2) is a residue obtained by removing the carboxyl group from a $C_{10-18}$ saturated or unsaturated aliphatic monocarboxylic acid which may have at least one hydroxyl group per molecule.

Item 8. The composition according to Item 7, wherein the aliphatic monocarboxylic acid is at least one member selected from the group consisting of lauric acid, myristic acid, palmitic acid, stearic acid, oleic acid and 12-hydroxystearic acid.

Item 9. A method for controlling the crystallization rate of a polyolefin-based resin during molding of the polyolefin-based resin, the method comprising incorporating into the polyolefin-based resin a polyolefin-based resin crystallization rate-controlling composition comprising:

(A) at least one amide-based compound represented by General Formula (1)

$$R^1\text{-(CONH R}^2)_k \qquad (1)$$

wherein $R^1$ represents a residue obtained by removing all of the carboxyl groups from 1,2,3-propanetricarboxylic acid or 1,2,3,4-butanetetracarboxylic acid, k represents an integer of 3 or 4, and the three or four $R^2$ groups are the same or different and each represent cyclohexyl or cyclohexyl substituted with one $C_{1-10}$ linear or branched alkyl, and (B) at least one fatty acid metal salt represented by General Formula (2)

$$(R^3\text{—COO})_n M \qquad (2)$$

wherein $R^3$ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two $R^3$ groups may be the same or different, and M represents a monovalent or divalent metal, the weight ratio of component (A):component (B) being from 100:0 to 30:70 (namely based on the total amount of components (A) and (B), component (A) being present in an amount of 100 to 30 wt. % and component (B) being present in an amount of 0 to 70 wt. %), or incorporating component (A) and component (B), simultaneously or separately, into the polyolefin-based resin such that the weight ratio of component (A):component (B) is from 100:0 to 30:70 (namely, such that based on the total amount of components (A) and (B), component (A) is present in an amount of 100 to 30 wt. % and component (B) is present in an amount of 0 to 70 wt. %)

to thereby give a polyolefin-based resin composition, and molding the resin composition.

Item 10. The method according to Item 9, wherein the weight ratio of component (A):component (B) is from 95:5 to 30:70 (namely based on the total amount of components (A) and (B), component (A) is present in an amount of 95 to 30 wt. % and component (B) is present in an amount of 5 to 70 wt. %).

Item 11. The method according to Item 9 or Item 10, wherein the resin composition is molded at a resin temperature higher than the transition temperature of storage modulus during heating.

Item 12. The method according to Item 9 or 10, wherein the resin composition is molded (particularly, molded by a molding method comprising an injection step or an extrusion step) at a resin temperature not lower than the melting temperature of the polyolefin-based resin and not higher than the transition temperature of storage modulus during heating.

Item 13. Use of a composition for controlling the crystallization rate of a polyolefin-based resin during molding of the polyolefin-based resin, the composition comprising:

(A) at least one amide-based compound represented by General Formula (1)

$$R^1\text{-(CONH R}^2)_k \qquad (1)$$

wherein $R^1$ represents a residue obtained by removing all of the carboxyl groups from 1,2,3-propanetricarboxylic acid or 1,2,3,4-butanetetracarboxylic acid, k represents an integer of 3 or 4, the three or four $R^2$ groups are the same or different and each represent cyclohexyl or cyclohexyl substituted with one $C_{1-10}$ linear or branched alkyl, and (B) at least one fatty acid metal salt represented by General Formula (2)

$$(R^3\text{—COO})_n M \qquad (2)$$

wherein $R^3$ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two $R^3$ groups may be the same or different and M represents a monovalent or divalent metal, the weight ratio of component (A):component (B) being from 100:0 to 30:70 (namely, based on the total amount of components (A) and (B), component (A) being present in an amount of 100 to 30 wt. % and component (B) being present in an amount of 0 to 70 wt. %).

Item 14. The use according to Item 13 wherein the weight ratio of component (A):component (B) is in the range from 95:5 to 30:70 (namely, based on the total amount of components (A) and (B), component (A) is present in an amount of 95 to 30 wt. % and component (B) is present in an amount of 5 to 70 wt. %).

Item 15. A process for producing a polyolefin-based resin molded product, the process comprising incorporating into a polyolefin-based resin a polyolefin-based resin crystallization rate-controlling composition comprising:

(A) at least one amide-based compound represented by General Formula (1)

$$R^1\text{-(CONH R}^2)_k \qquad (1)$$

wherein R¹ represents a residue obtained by removing all of the carboxyl groups from 1,2,3-propanetricarboxylic acid or 1,2,3,4-butanetetracarboxylic acid, k represents an integer of 3 or 4, and the three or four R² groups are the same or different and each represent cyclohexyl or cyclohexyl substituted with one $C_{1-10}$ linear or branched alkyl, and (B) at least one fatty acid metal salt represented by General Formula (2)

$(R^3—COO)_{\overline{n}}M$        (2)

wherein R³ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two R³ groups may be the same or different, and M represents a monovalent or divalent metal, the weight ratio of component (A):component (B) being from 100:0 to 30:70 (namely based on the total amount of components (A) and (B), component (A) being present in an amount of 100 to 30 wt. % and component (B) being present in an amount of 0 to 70 wt. %), or incorporating component (A) and component (B), simultaneously or separately, into a polyolefin-based resin such that the weight ratio of component (A):component(B) is from 100:0 to 30:70 (namely, such that based on the total amount of components (A) and (B), component (A) is present in an amount of 100 to 30 wt. % and component (B) is present in an amount of 0 to 70 wt. %)

to thereby give a polyolefin-based resin composition, and molding the resin composition.

Item 16. The process according to Item 15, wherein the weight ratio of component (A):component (B) is from 95:5 to 30:70 (namely based on the total amount of components (A) and (B), component (A) is present in an amount of 95 to 30 wt. % and component (B) is present in an amount of 5 to 70 wt. %).

Item 17. The process according to Item 15 or 16, wherein the resin composition is molded at a resin temperature higher than the transition temperature of storage modulus during heating.

Item 18. The process according to Item 15 or 16, wherein the resin composition is molded at a resin temperature not lower than the melting temperature of the polyolefin-based resin and not higher than the transition temperature of storage modulus during heating.

Item 19. A process for producing a polyolefin-based resin molded product (or a process according to Item 18), the process comprising the step of molding a molten polyolefin-based resin composition comprising a network structure formed of fibrous particles of at least one amide-based compound represented by the formula (1-p)

$R^{1P}—(CONH R^{2P})_3$        (1-p)

wherein $R^{1P}$ represents a residue obtained by removing all of the carboxyl groups from 1,2,3-propanetricarboxylic acid, and the three $R^{2P}$ groups are the same or different and each represent cyclohexyl or cyclohexyl substituted with one $C_{1-4}$ linear or branched alkyl, under temperature conditions such that the fibrous particles constituting the network structure do not dissolve or melt.

Item 20. A process according to Item 19 comprising the steps of (a) dissolving said at least one amide-based compound represented by the formula (1-p) in a molten polyolefin-based resin to prepare a molten mixture, (b) cooling the molten mixture to a temperature not higher than the transition temperature of storage modulus during cooling to obtain a polyolefin-based resin composition containing a network structure formed of fibrous particles of said at least one amide-based compound represented by the formula (1-p), and (c) molding the polyolefin-based resin composition at a resin temperature not lower than the melting temperature of the polyolefin-based resin and not higher than the transition temperature of storage modulus during heating.

Item 21. The process according to Item 20, wherein said polyolefin-based resin composition is in the form of pellets.

Item 22. The process according to any one of Items 19 to 21, wherein said polyolefin-based resin composition further contains at least one fatty acid metal salt represented by the formula (2)

$(R^3—COO)_{\overline{n}}M$        (2)

wherein R³ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two R³ groups may be the same or different, and M represents a monovalent or divalent metal.

Item 23. The process according to any one of Items 19 to 22, wherein the polyolefin-based resin composition containing the network structure formed of said fibrous particles is molded by a molding method comprising an injection step or an extrusion step.

Item 24. The process according to Item 23, wherein said molding method comprising an injection step or an extrusion step is injection molding, extrusion molding, injection-blow molding, injection-extrusion blow molding, injection-compression molding, extrusion-blow molding, extrusion-thermoforming or melt-spinning.

Item 25. The process according to any one of Items 15 to 24, wherein said polyolefin-based resin is at least one member selected from the group consisting of propylene homopolymers and propylene copolymers.

Item 26. A polyolefin-based resin molded product prepared by the process of Item 18 or Item 19 and having an orientation degree represented by the ratio of the (040) reflection intensity to the (110) reflection intensity determined by wide angle X-ray diffractometry of at least 2.

Item 27. A polyolefin-based resin molded product comprising:

a polyolefin-based resin, (A) at least one amide-based compound represented by General Formula (1)

$R^1—(CONH R^2)_k$        (1)

wherein R¹ represents a residue obtained by removing all of the carboxyl groups from 1,2,3-propanetricarboxylic acid or 1,2,3,4-butanetetracarboxylic acid, k represents an integer of 3 or 4, and the three or four R² groups are the same or different and each represent cyclohexyl or cyclohexyl substituted with one $C_{1-10}$ linear or branched alkyl, and (B) at least one fatty acid metal salt represented by General Formula (2)

$(R^3—COO)_{\overline{n}}M$        (2)

wherein R³ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two R³ groups may be the same or different and M represents a monovalent or divalent metal, the weight ratio of component (A):component (B) being from 100:0 to 30:70 (namely, based on the total amount of components (A) and (B), component (A) being present in an amount of 100 to 30 wt. % and component (B) being present in an amount of 0 to 70 wt. %), the molded product having an orientation degree represented by the ratio of the (040) reflection intensity to the (110) reflection intensity determined by wide angle X-ray diffractometry of at least 2.

Item 28. A polyolefin-based resin molded product comprising:

a polyolefin-based resin, and (a) at least one amide-based compound represented by the formula (1-p)

$$R^{1P}-(CONH\ R^{2P})_3 \quad (1\text{-}p)$$

wherein $R^{1P}$ represents a residue obtained by removing all of the carboxyl groups from 1,2,3-propanetricarboxylic acid, and the three $R^{2P}$ groups are the same or different and each represent cyclohexyl or cyclohexyl substituted with one $C_{1-4}$ linear or branched alkyl, or (b) said at least one amide-based compound represented by General Formula (1-p) and at least one fatty acid metal salt represented by General Formula (2)

$$(R^3-COO)_n M \quad (2)$$

wherein R³ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two R³ groups may be the same or different and M represents a monovalent or divalent metal, the molded product having an orientation degree represented by the ratio of the (040) reflection intensity to the (110) reflection intensity determined by wide angle X-ray diffractometry of at least 2.

Item 29. A polyolefin-based resin composition comprising a polyolefin-based resin and a crystallization rate-controlling composition of any one of Items 1 to 8.

Item 30. The polyolefin-based resin composition according to Item 29 comprising the crystallization rate-controlling composition in an amount of 0.01 to 10 parts by weight per 100 parts by weight of the polyolefin-based resin.

Item 31. A polyolefin-based resin molded product obtainable (or obtained) by molding the polyolefin-based resin composition of Item 29 or Item 30.

EFFECTS OF THE INVENTION

According to the invention, the use of the crystallization rate-controlling composition of the invention allows control of the crystallization rate of a polyolefin-based resin during molding of the polyolefin-based resin. The details are described as follows.

(I) In the case where the resin temperature during molding (molding temperature) T is not lower than the melting temperature Tm of a polyolefin-based resin and not higher than the transition temperature of storage modulus during heating Tsh, the crystallization rate of the polyolefin-based resin can be increased (the end time of crystallization can be shortened) by increasing the proportion of component (B) within the component (A):component (B) weight ratio range of 100:0 to 30:70.

(II) In the case where the resin temperature during molding (molding temperature) T is higher than the transition temperature of storage modulus during heating Tsh, the crystallization rate of the polyolefin-based resin can be reduced (the end time of crystallization can be extended) by increasing the proportion of component (B) within the component (A):component (B) weight ratio range of 100:0 to 30:70.

Thus, when observed over the entire molding temperature range, and also when observed in each of the resin temperature range from Tm to Tsh and the resin temperature range higher than Tsh, by changing the proportion of component (B) within the component (A):component (B) weight ratio range of 100:0 to 30:70, the crystallization rate of the polyolefin-based resin can be controlled, i.e., reduced or increased, as compared with the crystallization rate achieved in molding method (I) above wherein the component (A):component (B) weight ratio is 100:0.

Therefore, the polyolefin-based resin crystallization rate-controlling composition, when blended with a polyolefin-based resin, can control the crystallization rate during molding of the polyolefin-based resin, provide a further option for setting molding conditions for producing desired molded products, and facilitate setting of the molding conditions, without solely depending on molding machines. In other words, the invention provides a polyolefin-based resin composition that is suitable and flexible for use in various molding methods such as injection molding, extrusion molding, sheet molding, film molding, blow molding and the like.

When the polyolefin-based resin composition thus obtained is molded by method (I) or (II) mentioned above, molded products with excellent properties can be obtained. More specifically, the processing according to (I) above significantly contributes to the improvement of rigidity of polyolefin-based resin molded products, and this effect is remarkable especially in homopolypropylene resins, block polypropylene resins, and high-density polyethylene resins. On the other hand, the processing according to (II) above significantly contributes to an improvement in transparency of the polyolefin-based resin molded products, and this effect is remarkable especially in homopolypropylene resins and random polypropylene resins.

BRIEF DESCRIPTION OF THE DRAWINGS

In FIG. 7, (I) conceptually shows a production process in which the conditions of molding method (I) of the invention are used, and (II) conceptually shows a production process in which the conditions of molding method (II) of the invention are used.

FIG. 8 is a conceptual diagram illustrating the relationship among the constitution of the crystallization rate-controlling composition of the invention, resin temperature during molding and crystallization rate, with respect to the control of the crystallization rate of a polyolefin-based resin according to the invention.

Figure 1:
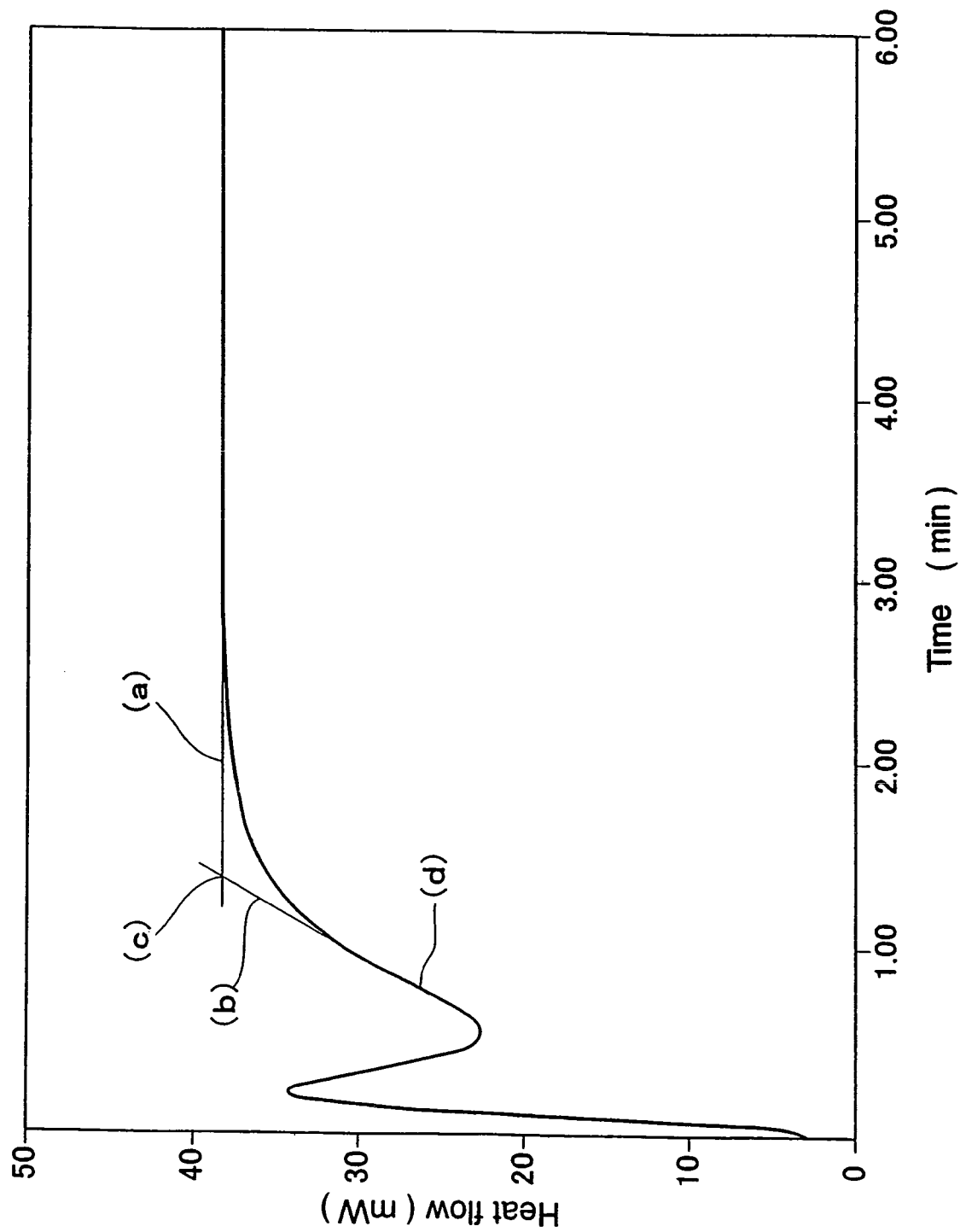
FIG. 1 is a DSC chart of the test piece (molded product) obtained in Example 2, and shows how to determine the "end time of crystallization".

The reference numerals in the drawings have the following meanings.

(a) extension line
(b) tangential line
(c) intersection point
1 injection molding machine
2 hopper
3 mold
4 nozzle

DETAILED DESCRIPTION OF THE INVENTION

Polyolefin-based Resin Crystallization Rate-controlling Composition

The polyolefin-based resin crystallization rate-controlling composition of the invention comprises (A) at least one amide-based compound represented by General Formula (1), or said component (A) and (B) at least one fatty acid metal salt represented by General Formula (2) as essential ingredient(s).

The component (A):component (B) weight ratio can be suitably selected from a wide range. The component (A):component (B) weight ratio generally ranges from 100:0 to 30:70, preferably from 95:5 to 30:70, more preferably from 90:10 to 60:40, and particularly preferably from 90:10 to 70:30.

In other words, the polyolefin-based resin crystallization rate-controlling composition of the invention comprises, based on the total amount of components (A) and (B), component (A) in an amount of 100 to 30% by weight (particularly, less than 100% by weight but not less than 30% by weight), preferably 95 to 30% by weight, more preferably 90 to 60% by weight, and particularly preferably 90 to 70% by weight, and component (B) in an amount of 0 to 70% by weight (particularly, more than 0% by weight but not more than 70% by weight), preferably 5 to 70% by weight, more preferably 10 to 40% by weight, and particularly preferably 10 to 30% by weight.

If the amount of component (A) is lower than 30% by weight based on the total amount of components (A) and (B), the effect of improving transparency or rigidity of the obtained resin molded product does not tend to be significant.

Component (A):Amide-based Compound

The amide-based compound (A) of the invention represented by General Formula (1) can be easily prepared by amidating an aliphatic polycarboxylic acid component with a substituted or non-substituted cyclohexylamine according to a known process, such as the process disclosed in Japanese Unexamined Patent Publication No. 1995-242610.

As the above-mentioned polycarboxylic acid component, a polycarboxylic acid or a reactive derivative thereof (typically, derivatives such as its acid chloride, or an ester of the polycarboxylic acid with a $C_{1-4}$ lower alcohol) can be used. There is no particular restriction on the production method, and the amide-based compounds may be produced by any method.

Examples of the aliphatic polycarboxylic acid include 1,2,3-propanetricarboxylic acid, 1,2,3,4-butanetetracarboxylic acid, with 1,2,3-propanetricarboxylic acid being recommended.

Examples of the substituted or unsubstituted cyclohexylamine include cyclohexylamine which may be substituted with one $C_{1-10}$ linear or branched alkyl group, such as cyclohexylamine, 2-methylcyclohexylamine, 2-ethylcyclohexylamine, 2-n-propylcyclohexylamine, 2-isopropylcyclohexylamine, 2-n-butylcyclohexylamine, 2-isobutylcyclohexylamine, 2-sec-butylcyclohexylamine, 2-tert-butylcyclohexylamine, 2-n-pentylcyclohexylamine, 2-n-hexylcyclohexylamine, 2-n-heptylcyclohexylamine, 2-n-octylcyclohexylamine, 2-(2-ethylhexyl)cyclohexylamine, 2-n-nonylcyclohexylamine, 2-n-decylcyclohexylamine, 3-methylcyclohexylamine, 3-ethylcyclohexylamine, 3-n-propylcyclohexylamine, 3-isopropylcyclohexylamine, 3-n-butylcyclohexylamine, 3-isobutylcyclohexylamine, 3-sec-butylcyclohexylamine, 3-tert-butylcyclohexylamine, 3-n-pentylcyclohexylamine, 3-n-hexylcyclohexylamine, 3-n-heptylcyclohexylamine, 3-n-octylcyclohexylamine, 3-(2-ethylhexyl)cyclohexylamine, 3-n-nonylcyclohexylamine, 3-n-decylcyclohexylamine, 4-methylcyclohexylamine, 4-ethylcyclohexylamine, 4-n-propylcyclohexylamine, 4-isopropylcyclohexylamine, 4-n-butylcyclohexylamine, 4-isobutylcyclohexylamine, 4-sec-butylcyclohexylamine, 4-tert-butylcyclohexylamine, 4-n-pentylcyclohexylamine, 4-n-hexylcyclohexylamine, 4-n-heptylcyclohexylamine, 4-n-octylcyclohexylamine, 4-(2-ethylhexyl)cyclohexylamine, 4-n-nonylcyclohexylamine, 4-n-decylcyclohexylamine, etc.

Among these, preferable are cyclohexylamine and cyclohexylamine having as a substituent a $C_{1-4}$ linear or branched alkyl group, particularly methyl.

When the substituent is methyl, the substitution position thereof may be 2-position, 3-position or 4-position, with the 2-position being particularly preferable.

When the substituent is a $C_{2-4}$ linear or branched alkyl group, the substitution position thereof is preferably 2-position.

Examples of such preferable substituted cyclohexylamine include 2-methylcyclohexylamine, 3-methylcyclohexylamine, 4-methylcyclohexylamine, 2-ethylcyclohexylamine, 2-n-propylcyclohexylamine, 2-isopropylcyclohexylamine, 2-n-butylcyclohexylamine, 2-isobutylcyclohexylamine, 2-sec-butylcyclohexylamine, 2-tert-butylcyclohexylamine, and like 2-alkyl($C_{1-4}$)-cyclohexylamines, etc.

The above-described alkylcyclohexylamines may be in the form of the cis isomer, the trans isomer, or a mixture of these stereoisomers. The ratio of trans isomer:cis isomer can be determined by GLC (gas-liquid chromatography).

In carrying out the amidation, such substituted or unsubstituted cyclohexylamines can be used singly or at least two of them may be used in combination.

Preferable Amide-based Compound

Among the amide-based compounds of the invention, those represented by General Formula (1) wherein $R^2$ is cyclohexyl or cyclohexyl substituted with a $C_{1-4}$ linear or branched alkyl group are preferable, since their nucleating performance is excellent.

Among the above-described preferable amide-based compounds, amide-based compounds in which $R^1$ is a 1,2,3-propanetricarboxylic acid residue are as follows:

1,2,3-propanetricarboxylic acid tricyclohexylamide;
1,2,3-propanetricarboxylic acid tris(2-methylcyclohexylamide);
1,2,3-propanetricarboxylic acid tris(3-methylcyclohexylamide);
1,2,3-propanetricarboxylic acid tris(4-methylcyclohexylamide);
1,2,3-propanetricarboxylic acid tris(2-ethylcyclohexylamide);
1,2,3-propanetricarboxylic acid tris(3-ethylcyclohexylamide);
1,2,3-propanetricarboxylic acid tris(4-ethylcyclohexylamide);
1,2,3-propanetricarboxylic acid tris(2-n-propylcyclohexylamide);
1,2,3-propanetricarboxylic acid tris(3-n-propylcyclohexylamide);
1,2,3-propanetricarboxylic acid tris(4-n-propylcyclohexylamide);
1,2,3-propanetricarboxylic acid tris(2-isopropylcyclohexylamide);
1,2,3-propanetricarboxylic acid tris(3-isopropylcyclohexylamide);
1,2,3-propanetricarboxylic acid tris(4-isopropylcyclohexylamide);
1,2,3-propanetricarboxylic acid tris(2-n-butylcyclohexylamide);
1,2,3-propanetricarboxylic acid tris(3-n-butylcyclohexylamide);
1,2,3-propanetricarboxylic acid tris(4-n-butylcyclohexylamide);
1,2,3-propanetricarboxylic acid tris(2-isobutylcyclohexylamide);
1,2,3-propanetricarboxylic acid tris(3-isobutylcyclohexylamide);
1,2,3-propanetricarboxylic acid tris(4-isobutylcyclohexylamide);
1,2,3-propanetricarboxylic acid tris(2-sec-butylcyclohexylamide);
1,2,3-propanetricarboxylic acid tris(3-sec-butylcyclohexylamide);
1,2,3-propanetricarboxylic acid tris(4-sec-butylcyclohexylamide);
1,2,3-propanetricarboxylic acid tris(2-tert-butylcyclohexylamide);
1,2,3-propanetricarboxylic acid tris(3-tert-butylcyclohexylamide);
1,2,3-propanetricarboxylic acid tris(4-tert-butylcyclohexylamide); etc.

Preferable amide-based compounds in which $R^1$ is a 1,2,3,4-butanetetracarboxylic acid residue are as follows:

1,2,3,4-butanetetracarboxylic acid tetracyclohexylamide;
1,2,3,4-butanetetracarboxylic acid tetrakis(2-methylcyclohexylamide);
1,2,3,4-butanetetracarboxylic acid tetrakis(3-methylcyclohexylamide);
1,2,3,4-butanetetracarboxylic acid tetrakis(4-methylcyclohexylamide);
1,2,3,4-butanetetracarboxylic acid tetrakis(2-ethylcyclohexylamide);
1,2,3,4-butanetetracarboxylic acid tetrakis(3-ethylcyclohexylamide);
1,2,3,4-butanetetracarboxylic acid tetrakis(4-ethylcyclohexylamide);
1,2,3,4-butanetetracarboxylic acid tetrakis(2-n-propylcyclohexylamide);
1,2,3,4-butanetetracarboxylic acid tetrakis(3-n-propylcyclohexylamide);
1,2,3,4-butanetetracarboxylic acid tetrakis(4-n-propylcyclohexylamide);
1,2,3,4-butanetetracarboxylic acid tetrakis(2-isopropylcyclohexylamide);
1,2,3,4-butanetetracarboxylic acid tetrakis(3-isopropylcyclohexylamide);
1,2,3,4-butanetetracarboxylic acid tetrakis(4-isopropylcyclohexylamide);
1,2,3,4-butanetetracarboxylic acid tetrakis(2-n-butylcyclohexylamide);
1,2,3,4-butanetetracarboxylic acid tetrakis(3-n-butylcyclohexylamide);
1,2,3,4-butanetetracarboxylic acid tetrakis(4-n-butylcyclohexylamide);
1,2,3,4-butanetetracarboxylic acid tetrakis(2-isobutylcyclohexylamide);
1,2,3,4-butanetetracarboxylic acid tetrakis(3-isobutylcyclohexylamide);
1,2,3,4-butanetetracarboxylic acid tetrakis(4-isobutylcyclohexylamide);
1,2,3,4-butanetetracarboxylic acid tetrakis(2-sec-butylcyclohexylamide);
1,2,3,4-butanetetracarboxylic acid tetrakis(3-sec-butylcyclohexylamide);
1,2,3,4-butanetetracarboxylic acid tetrakis(4-sec-butylcyclohexylamide);
1,2,3,4-butanetetracarboxylic acid tetrakis(2-tert-butylcyclohexylamide);
1,2,3,4-butanetetracarboxylic acid tetrakis(3-tert-butylcyclohexylamide);
1,2,3,4-butanetetracarboxylic acid tetrakis(4-tert-butylcyclohexylamide); etc.

Among the preferable amide-based compounds, those of General Formula (1) wherein $R^2$ is cyclohexyl or cyclohexyl substituted with methyl is particularly preferable since such amide-based compounds have an excellent nucleating performance and the starting materials are readily available.

Specific examples include:

1,2,3-propanetricarboxylic acid tricyclohexylamide;
1,2,3-propanetricarboxylic acid tris(2-methylcyclohexylamide);
1,2,3-propanetricarboxylic acid tris(3-methylcyclohexylamide);
1,2,3-propanetricarboxylic acid tris(4-methylcyclohexylamide);
1,2,3,4-butanetetracarboxylic acid tetracyclohexylamide;
1,2,3,4-butanetetracarboxylic acid tetrakis(2-methylcyclohexylamide);
1,2,3,4-butanetetracarboxylic acid tetrakis(3-methylcyclohexylamide); and
1,2,3,4-butanetetracarboxylic acid tetrakis(4-methylcyclohexylamide).

Among them, particularly preferable are 1,2,3-propanetricarboxylic acid tricyclohexyl amide, 1,2,3-propanetricarboxylic acid tris(2-methylcyclohexylamide), 1,2,3-propanetricarboxylic acid tris(3-methylcyclohexylamide), and 1,2,3-propanetricarboxylic acid tris(4-methylcyclohexylamide).

The crystal form of the amide-based compound of the invention is not limited insofar as the effects of the invention are obtained, and any crystal form, such as a hexagonal, monoclinic, cubic, etc. can be used. Such crystal forms are also known or can be produced by known processes.

The amide-based compounds of the invention may contain a small amount of impurities. It is recommended that the purity of the amide-based compound represented by General Formula (1) is generally 90% by weight or more, preferably 95% by weight or more, and more preferably 97% by weight or more. Examples of the impurities include monoamidedicarboxylic acids or esters thereof, diamidemonocarboxylic acid or esters thereof, monoamidetricarboxylic acid or esters thereof, diamidedicarboxylic acid or esters thereof, triamidecarboxylic acid or esters thereof, compounds having imide skeleton(s) such as amide-imide or bisimide structure(s), that are derived from reaction intermediates or unreacted reactants.

The particle size of the amide-based compounds of the invention is not limited insofar as the effects of the invention are obtained. In view of the dissolution rate or their dispersibility in a molten polyolefin-based resin, a particle size as small as possible is preferable. The maximum particle diameter as measured by a laser diffraction light scattering method is generally 200 μm or less, preferably 100 μm or less, more preferably 50 μm or less, and particularly preferably 10 μm or less.

Examples of methods for controlling the maximum particle diameter within the above ranges include a method comprising pulverizing the amide-based compound into fine particles using conventional apparatus known in the art, and then classifying the obtained fine particles. Specifically, the amide-based compound can be pulverized into fine particles and classified using a jet mill, such as "Fluidized bed counterjet mill 100AFG" (product name, product of Hosokawa Micron Corporation), "Supersonic jet mill PJM-200" (product name, product of Nippon Pneumatic MFG Co., Ltd.), etc.

In the amide-based compound represented by General Formula (1) according to the present invention, cis-configured moiety and trans-configured moiety with respect to the stereoisomeric structure of its alkylcyclohexylamine residue (especially, 2-alkylcyclohexylamine residue) constituting the amide-based compound may be present as mixed. Also, the amide-based compound may be a mixture of at least two amide-based compounds having different trans-configured moiety to cis-configured moiety ratios.

The proportion of the total of trans-configured moiety to the total of cis configured moiety of at least one amide-based compound can be verified by the ratio of the absorbance of the N—H stretching vibration peak of the trans-configured moiety to the absorbance of the N—H stretching vibration peak of the cis-configured moiety as measured by FT-IR spectroscopy.

In this specification, the trans configured moiety with respect to the streoisomeric structure of the alkylcyclohexylamine residue (especially, the residue obtained by removing the amino group from an alkylcyclohexylamine, particularly the residue obtained by removing the amino group from a 2-alkylcyclohexylamine) constituting the amide-based compound represented by General Formula (1) refers to an alkylcyclohexyl moiety represented by General Formula (X),

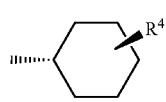

(X)

wherein $R^4$ represents a $C_{1-10}$ linear or branched alkyl group (especially, methyl), and in particular, to a 2-alkylcyclohexyl moiety represented by General Formula (X1),

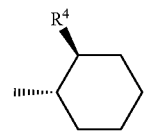

(X1)

wherein $R^4$ has the same meaning as the alkyl group in General Formula (X).

In this specification, the structure represented by General Formula (X) or (X1) is a group obtained by removing the amino group from a trans-alkylcyclohexylamine, and is referred to as a "trans-alkylcyclohexylamine residue".

The cis-configured moiety with respect to the streoisomeric structure of the alkylcyclohexylamine residue (especially, a 2-alkylcyclohexylamine residue) constituting the amide-based compound represented by General Formula (1) refers to an alkylcyclohexyl moiety represented by General Formula (Y),

(Y)

wherein $R^4$ has the same meaning as the alkyl group in General Formula (X), and in particular 2-alkylcyclohexyl moiety represented by General Formula (Y1)

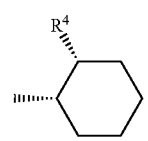

(Y1)

wherein $R^4$ has the same meaning as the alkyl group in General Formula (X).

In this specification, the structure represented by General Formula (Y) or (Y1) is a group obtained by removing the amino group from a cis-alkylcyclohexylamine, and is referred to as a "cis-alkylcyclohexylamine residue".

In other words, examples of the above-mentioned preferable amide-based compounds include an amide-based compound or a mixture of at least two such amide-based compounds represented by General Formula (1Z):

$$R^1\text{--(CONH R}^{2Z})_k \quad (1Z)$$

wherein $R^1$ is as defined in General Formula (1), k represents an integer of 3 or 4, and the three or four $R^{2Z}$ groups are the same or different and each represent a trans-alkylcyclohexylamine residue represented by General Formula (X) or a cis-alkylcyclohexyl amine residue represented by General Formula (Y), and when $R^1$ in the formula (1Z) is a residue obtained by removing all of the carboxyl groups from 1,2,3-propanetricarboxylic acid (k in General Formula (1Z) is 3), the content of trans-alkylcyclohexylamine residues in the compound or mixture thereof is preferably 50 to 100%, and more preferably 65 to 100%, or when $R^1$ in the formula (1Z) is a residue obtained by removing all the carboxyl groups from 1,2,3,4-butanetetracarboxylic acid (k in General Formula (1Z) is 4), the content of trans-alkylcyclohexylamine residues in the compound or mixture thereof is preferably 10 to 80%, and more preferably 25 to 60%.

It was found that the ratio of trans-configured moieties:cis-configured moieties (trans:cis) of a mixture of the above-mentioned amide-based compounds of the invention (wherein $R^2$ is alkylcyclohexyl) is substantially the same as the ratio of trans isomer:cis isomer (molar ratio determined by GLC; hereinafter referred to as "GLC composition ratio") of a starting material alkylcyclohexylamine. This is confirmed by the following observation: (a) the ratio of trans isomer:cis isomer of a starting material alkylcyclohexylamine is identical to the ratio of trans isomer:cis isomer of the unreacted alkylcyclohexylamine remaining after the starting material was subjected to the amidation reaction, and (b) the product amide obtained in the invention, when treated at a temperature condition similar to that used in the amidation reaction (room temperature to 280° C.), had a FT-IR spectrum and a melting point that are in full agreement with those measured before the treatment, verifying that the stereo configuration was not altered by the amidation reaction. Thus, the ratio of trans configured moiety:cis configured moiety (trans: cis) in the amide-based compound mixture is controllable by the trans:cis isomer ratio of the starting material amine.

Component (B): Fatty Acid Metal Salt

The fatty acid metal salt (B) of the invention is a fatty acid metal salt obtained from a $C_{8-32}$, and preferably $C_{10-18}$, saturated or unsaturated aliphatic monocarboxylic acid which may have at least one hydroxyl group (particularly 1 or 2 hydroxyl groups) per molecule, and a monovalent or divalent metal. Such fatty acid metal salts may be those commercially available. It is also possible to use an aliphatic monocarboxylic acid and a metal or its chloride, oxide or hydroxide in such a manner that said fatty acid metal salt can be formed in the polyolefin-based resin.

Examples of the above-mentioned aliphatic monocarboxylic acid include:

saturated monocarboxylic acids, such as caprylic acid, nonanoic acid, capric acid, undecanoic acid, lauric acid, tridecanoic acid, myristic acid, pentadecanoic acid, palmitic acid, heptadecanoic acid, stearic acid, nonadecanoic acid, icosanoic acid, henicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hentricontanoic acid, dotriacontanoic acid, etc;

unsaturated monocarboxylic acids, such as octenoic acid, nonenoic acid, decenoic acid, undecenoic acid, dodecenoic acid, tridecenoic acid, tetradecenoic acid, pentadecenoic acid, hexadecenoic acid, oleic acid, linoleic acid, linolenic acid, nonadecenoic acid, icosenoic acid, henicosenoic acid, docosenoic acid, tricosenoic acid, tetracosenoic acid, pentacosenoic acid, hexacosenoic acid, heptacosenoic acid, octacosenoic acid, nonacosenoic acid, etc.;

hydroxyl-containing aliphatic monocarboxylic acids such as 12-hydroxystearic acid, ricinoleic acid, etc.

Among them, recommended are lauric acid, myristic acid, palmitic acid, stearic acid, oleic acid, and 12-hydroxystearic acid.

Such aliphatic monocarboxylic acids may be used singly or in combination.

Examples of metals in General Formula (2) include monovalent or bivalent metals such as alkali metals, alkaline earth metals, and Group 12 metals of the periodic table (see Chemistry and Chemical Industry, edited by Chemical Society of Japan, volume 57, No. 4 (2004)), and among them, alkali metals, alkaline earth metals and zinc are preferable. In particular, sodium, potassium, magnesium, calcium, and zinc are recommended. Such metals may be used singly or in combination.

Preferable Fatty Acid Metal Salts

Regarding preferable fatty acid metal salts, from the viewpoint of imparting a relatively high crystallization temperature to a polyolefin-based resin, preferable are fatty acid monovalent metal salts formed from the above-described aliphatic monocarboxylic acid and a monovalent metal, particularly sodium or potassium. From the viewpoint of being excellent in improving the solubility and dispersibility of the amide-based compounds in polyolefin-based resins, preferable are fatty acid divalent metal salts formed from an aliphatic monocarboxylic acid and a divalent metal, particularly calcium, magnesium and zinc.

From the viewpoint of heat resistance and availability, preferable aliphatic monocarboxylic acid is at least one aliphatic monocarboxylic acid selected from the group consisting of lauric acid, myristic acid, palmitic acid, stearic acid, oleic acid and 12-hydroxystearic acid.

Preferable examples of fatty acid monovalent metal salts include sodium laurate, sodium myristate, sodium palmitate, sodium stearate, sodium 12-hydroxystearate, sodium oleate, potassium laurate, potassium myristate, potassium palmitate, potassium stearate, potassium 12-hydroxystearate, potassium oleate, etc.

Preferable examples of fatty acid divalent metal salts include calcium laurate, calcium myristate, calcium palmitate, calcium stearate, calcium 12-hydroxystearate, calcium oleate, magnesium laurate, magnesium myristate, magnesium palmitate, magnesium stearate, magnesium 12-hydroxystearate, magnesium oleate, zinc laurate, zinc myristate, zinc palmitate, zinc stearate, zinc 12-hydroxystearate, zinc oleate, etc.

Such fatty acid metal salts can be used singly or in combination

Preferable Crystallization Rate-controlling Compositions

Examples of preferable crystallization rate-controlling compositions include combinations of the members selected from the above-mentioned preferable examples of component (A) and component (B). Among these, particularly preferable combinations are those in which component (A) is at least one member selected from the group consisting of 1,2,3-propanetricarboxylic acid tricyclohexylamide, 1,2,3-propanetricarboxylic acid tris(2-methylcyclohexylamide), 1,2,3-propanetricarboxylic acid tris(3-methylcyclohexylamide) and 1,2,3-propanetricarboxylic acid tris (4-methylcyclohexylamide), and component (B) is at least one member selected from the group consisting of sodium stearate, potassium stearate, calcium stearate, magnesium stearate, zinc stearate, sodium 12-hydroxystearate, potassium 12-hydroxystearate, calcium 12-hydroxystearate, magnesium 12-hydroxystearate and zinc 12-hydroxystearate.

When component (B) is a fatty acid monovalent metal salt, specific examples of preferable combinations are as follows:

1,2,3-propanetricarboxylic acid tricyclohexylamide+sodium stearate;

1,2,3-propanetricarboxylic acid tricyclohexylamide+potassium stearate;

1,2,3-propanetricarboxylic acid tris(2-methylcyclohexylamide)+sodium stearate;

1,2,3-propanetricarboxylic acid tris(2-methylcyclohexylamide)+potassium stearate;
1,2,3-propanetricarboxylic acid tris(3-methylcyclohexylamide)+sodium stearate;
1,2,3-propanetricarboxylic acid tris(3-methylcyclohexylamide)+potassium stearate;
1,2,3-propanetricarboxylic acid tris(4-methylcyclohexylamide)+sodium stearate;
1,2,3-propanetricarboxylic acid tris(4-methylcyclohexylamide)+potassium stearate,
1,2,3-propanetricarboxylic acid tricyclohexylamide+sodium 12-hydroxystearate;
1,2,3-propanetricarboxylic acid tricyclohexylamide+potassium 12-hydroxystearate;
1,2,3-propanetricarboxylic acid tris(2-methylcyclohexylamide)+sodium 12-hydroxystearate;
1,2,3-propanetricarboxylic acid tris(2-methylcyclohexylamide)+potassium 12-hydroxystearate;
1,2,3-propanetricarboxylic acid tris(3-methylcyclohexylamide)+sodium 12-hydroxystearate;
1,2,3-propanetricarboxylic acid tris(3-methylcyclohexylamide)+potassium 12-hydroxystearate;
1,2,3-propanetricarboxylic acid tris(4-methylcyclohexylamide)+sodium 12-hydroxystearate;
1,2,3-propanetricarboxylic acid tris(4-methylcyclohexylamide)+potassium 12-hydroxystearate, etc.

When component (B) is a fatty acid divalent metal salt, specific examples of preferable combinations are as follows:
1,2,3-propanetricarboxylic acid tricyclohexylamide+calcium stearate;
1,2,3-propanetricarboxylic acid tricyclohexylamide+magnesium stearate;
1,2,3-propanetricarboxylic acid tricyclohexylamide+zinc stearate;
1,2,3-propanetricarboxylic acid tris(2-methylcyclohexylamide)+calcium stearate;
1,2,3-propanetricarboxylic acid tris(2-methylcyclohexylamide)+magnesium stearate;
1,2,3-propanetricarboxylic acid tris(2-methylcyclohexylamide)+zinc stearate,
1,2,3-propanetricarboxylic acid tris(3-methylcyclohexylamide)+calcium stearate;
1,2,3-propanetricarboxylic acid tris(3-methylcyclohexylamide)+magnesium stearate,
1,2,3-propanetricarboxylic acid tris(3-methylcyclohexylamide)+zinc stearate,
1,2,3-propanetricarboxylic acid tris(4-methylcyclohexylamide)+calcium stearate,
1,2,3-propanetricarboxylic acid tris(4-methylcyclohexylamide)+magnesium stearate,
1,2,3-propanetricarboxylic acid tris(4-methylcyclohexylamide)+zinc stearate,
1,2,3-propanetricarboxylic acid tricyclohexylamide+calcium 12-hydroxystearate;
1,2,3-propanetricarboxylic acid tricyclohexylamide+magnesium 12-hydroxystearate;
1,2,3-propanetricarboxylic acid tricyclohexylamide+zinc 12-hydroxystearate;
1,2,3-propanetricarboxylic acid tris(2-methylcyclohexylamide)+calcium 12-hydroxystearate;
1,2,3-propanetricarboxylic acid tris(2-methylcyclohexylamide)+magnesium 12-hydroxystearate;
1,2,3-propanetricarboxylic acid tris(2-methylcyclohexylamide)+zinc 12-hydroxystearate,
1,2,3-propanetricarboxylic acid tris(3-methylcyclohexylamide)+calcium 12-hydroxystearate;
1,2,3-propanetricarboxylic acid tris(3-methylcyclohexylamide)+magnesium 12-hydroxystearate,
1,2,3-propanetricarboxylic acid tris(3-methylcyclohexylamide)+zinc 12-hydroxystearate,
1,2,3-propanetricarboxylic acid tris(4-methylcyclohexylamide)+calcium 12-hydroxystearate,
1,2,3-propanetricarboxylic acid tris(4-methylcyclohexylamide)+magnesium 12-hydroxystearate,
1,2,3-propanetricarboxylic acid tris(4-methylcyclohexylamide)+zinc 12-hydroxystearate, etc.

The following combinations are also preferable.
1,2,3,4-butanetetracarboxylic acid tetracyclohexylamide and at least one member selected from the group consisting of sodium stearate, potassium stearate, calcium stearate, magnesium stearate, zinc stearate, sodium 12-hydroxystearate, potassium 12-hydroxystearate, calcium 12-hydroxystearate, magnesium 12-hydroxystearate and zinc 12-hydroxystearate, and
1,2,3,4-butanetetracarboxylic acid tetrakis(2-methylcyclohexylamide) and at least one member selected from the group consisting of sodium stearate, potassium stearate, calcium stearate, magnesium stearate, zinc stearate, sodium 12-hydroxystearate, potassium 12-hydroxystearate, calcium 12-hydroxystearate, magnesium 12-hydroxystearate and zinc 12-hydroxystearate.

The crystallization rate-controlling composition of the invention not only controls the crystallization rate of the polyolefin-based resin, but also improves, by addition of component (B), the dispersibility and solubility of the amide-based compounds in tho polyolefin-based resin.

In particular, by using an amide-based compound and a fatty acid metal salt as admixed in advance, the attained effects tend to be more remarkable. The mixing method is not particularly limited, and it is possible to employ methods such as a method comprising mixing them in a powder form; a method comprising mixing them at a temperature not lower than the melting point of the fatty acid metal salt; a method comprising mixing the amide-based compound and the fatty acid metal salt in a form dissolved or dispersed in a solvent, removing the solvent and drying, followed by, if necessary, granulation, pulverizing, crashing, etc.

There is no limitation on the forms of the crystallization rate-controlling composition of the invention, and they may be suitably selected from powders, granules, tablets, pellets and the like.

When the crystallization rate-controlling composition takes the form of a powder or granules, the particle diameter thereof is not limited as long as the effects of the invention can be obtained. However, from the viewpoint of dispersibility or dissolution speed in a molten polyolefin-based resin, the smaller the particle diameter the better. The maximum particle diameter, as measured by laser diffraction light scattering, is generally not more than 200 μm, preferably not more than 100 μm, more preferably not more than 50 μm, and particularly preferably not more than 10 μm.

When the crystallization rate-controlling composition takes the form of granules, tablets, pellets or like granulated form, the shape and particle diameter thereof can be suitably selected and these granulated forms can be obtained using known granulators, pulverizers/crushers, classifiers, etc. Such granulated forms, when taken, contribute toward improving powder flowability, suppressing dust explosion (decrease in occurrence of dust explosion), and the like.

Examples of usable granulators include dry- or wet-extrusion granulators, mixing granulators, tableting machines, dry compression roll granulators, and marumerizers (product name, product of DALTON Co., Ltd.). Examples of pulverizers/crushers include pin mills, jet mills, pulverizers, cutter mills, hammer mills, planer crushers, and nibblers. Examples of classifiers include vibrating sieves, air separators, etc.

In addition to an amide-based compound and a fatty acid metal salt, if necessary, polyolefin resin modifiers and the like may be added, insofar as the effects of the invention are not adversely affected.

Examples of such polyolefin modifiers include the various additives listed in "The Tables of Positive Lists of Additives" edited by the Japan Hygienic Olefin and Styrene Plastic Association (January, 2002). More specific examples include stabilizers (such as metal compounds, epoxy compounds, nitrogen compounds, phosphorus compounds, sulfur compounds, etc.), UV absorbers (such as benzophenone-based compounds and benzotriazole-based compounds), antioxidants (such as phenol-based compounds, phosphorous ester-based compounds, and sulfur-based compounds), surfactants (such as glycerol monostearate and like glycerol fatty acid esters), lubricants (such as paraffins, waxes (such as polyethylene wax and polypropylene wax), and other aliphatic hydrocarbons, $C_8$ to $C_{22}$ higher fatty acids, $C_8$ to $C_{22}$ higher aliphatic alcohols (such as stearyl alcohol), polyglycols, esters of $C_4$ to $C_{22}$ higher fatty acids and $C_4$ to $C_{18}$ aliphatic monohydric alcohols, $C_8$ to $C_{22}$ higher fatty acid amides, silicone oils, and rosin derivatives), foaming agents, foaming auxiliaries, polymer additives, and additionally include plasticizers (such as dialkyl phthalates, dialkyl hexahydrophthalates, etc.), crosslinking agents, crosslinking accelerators, antistatic agents, flame retardants, dispersants, organic and inorganic pigments, processing aids, fillers, other nucleating agents, and like additives. The amount of the additives is not limited insofar as the effects of the invention are not adversely affected.

Examples of the above fillers include talc, clay, mica, hydrotalcite, asbestos, zeolite, glass fibers, glass flakes, glass beads, perlite, calcium silicate, calcium carbonate, montmorillonite, bentonite, graphite, aluminum powder, alumina, silica, diatomaceous earth, titanium oxide, magnesium oxide, pumice powder, pumice balloon, aluminium hydroxide, magnesium hydroxide, basic magnesium carbonate, dolomite, calcium sulfate, potassium titanate, barium sulfate, calcium sulfite, molybdenum sulfide, etc. Among these, talc, hydrotalcite, mica, zeolite, perlite, diatomaceous earth, calcium carbonate, etc. are preferable. Such fillers can be used singly or in combination.

When the above-mentioned additives are added, though there is no particular limitation, a preferable method is that the amide-based compound, fatty acid metal salt and other components are dry blended to obtain a homogeneous mixture.

Polyolefin-based Resin Composition

The polyolefin-based resin composition of the invention comprises a polyolefin-based resin, the above-described components (A) and (B), and, if necessary, polyolefin resin modifiers and the like. The polyolefin-based resin composition can be obtained, for example, by incorporating the crystallization rate-controlling composition into a polyolefin-based resin by a conventional method.

The polyolefin resin composition of the invention can be manufactured by any conventional method, with no particular restrictions thereon, as long as the desired resin composition is obtained. For example, a polyolefin-based resin (powder, granules or pellets) and a crystallization rate-controlling composition of the invention (or alternatively, a polyolefin-based resin (powder, granules or pellets), components (A) and (B) of the invention, and, if necessary, the above-mentioned polyolefin resin modifiers) are mixed using a conventional mixer, such as a Henschel mixer, a ribbon blender, a V-blender or the like to obtain a blend type polyolefin-based resin composition. Other examples include a method in which this blend type polyolefin-based resin composition is melt-kneaded in a conventional kneader, such as a single screw or twin screw extruder, generally at a temperature of 160 to 300° C., preferably 180 to 280° C., and particularly preferably 200 to 260° C., the extruded strands are cooled, and the strands thus obtained are cut into pellets, thereby giving a pellet type polyolefin-based resin composition.

As the method of adding the crystallization rate-controlling composition of the invention to a polyolefin-based resin, a single-step addition using a conventional machine, such as a single screw or twin screw extruder, etc., is preferable. However, a two-step addition using a master batch of high concentration in the range of about 2 to 15 wt. % may also be employed.

An amide-based compound (A) and a fatty acid metal salt (B) according to the invention may be added to a polyolefin-based resin in the form of a crystallization rate-controlling composition, or may be added simultaneously or separately such that the component (A):component (B) weight ratio fall within a range of 100:0 to 30:70, preferably 95:5 to 30:70.

For example, the polyolefin-based resin composition of the invention may be prepared by dissolving component (B) of the invention in the polyolefin-based resin to obtain a resin composition in the form of a powder, pellets, granules, etc. in advance, and then incorporating component (A) of the invention and if desired the above polyolefin modifiers and the like into the obtained resin composition.

There are no particular restrictions on the amount of the crystallization rate-controlling composition in the polyolefin-based resin composition of the invention as long as the desired effects can be attained, and the amount can be suitably selected from a wide range. Generally, however, the amount of the crystallization rate-controlling composition is 0.01 to 10 parts by weight, preferably 0.05 to 5 parts by weight, and more preferably 0.05 to 2 parts by weight, per 100 parts by weight of the polyolefin-based resin. By blending the crystallization rate-controlling composition of the invention in an amount within the above range, the effects of the invention can be sufficiently produced.

Components (A) and (B) may be simultaneously or separately added to the polyolefin-based resin, and in that case, it is also recommended that the total amount of components (A) and (B) is 0.01 to 10 parts by weight, preferably 0.05 to 5 parts by weight, and more preferably 0.05 to 2 parts by weight, per 100 parts by weight of the polyolefin-based resin.

From the standpoint of nucleating performance, the amount of at least one amide-based compound represented by General Formula (1) (Component (A)) is preferably 0.01 to 5 parts by weight, more preferably 0.05 to 2 parts by weight, per 100 parts by weight of the polyolefin-based resin. Within this range, a significant improvement in transparency or rigidity can be observed.

The polyolefin-based resin composition can give a molded product having excellent transparency or rigidity, even when the amide-based compound of General Formula (1) alone is used (namely component (A) alone is used without using component (B)). However, in order to improve transparency or rigidity and also in order to control the crystallization rate of the polyolefin-based resin, it is preferable to use a fatty acid metal salt (component (B)).

It is advantageous that the amount of the fatty acid metal salt (component (B)) is generally 0 to 5 parts by weight, preferably 0 to 1 parts by weight, more preferably 0.005 to 0.5 parts by weight, particularly preferably 0.01 to 0.3 parts by weight, per 100 parts by weight of the polyolefin-based resin. Also, by increasing the proportion of component (B) within the component (A):component (B) weight ratio range of 100:0 to 30:70, the crystallization rate of the polyolefin-based resin can be controlled (end time of crystallization can be controlled).

Examples of polyolefin-based resins of the present invention include polyethylene-based resins, polypropylene-based resins, polybutene-based resins, polymethylpentene-based resins, polybutadiene-based resin, and the like. Specific examples thereof include high-density polyethylenes, medium-density polyethylenes, linear polyethylenes, ethylene copolymers with an ethylene content of at least 50 wt %, and preferably 70 wt % or higher, propylene homopolymers, propylene copolymers with a propylene content of at least 50 wt %, and preferably 70 wt % or higher, butene homopolymers, butene copolymers with a butene content of at least 50 wt %, and preferably 70 wt % or higher, methylpentene homopolymers, methylpentene copolymers with a methylpentene content of at least 50 wt %, and preferably 70 wt % or higher, polybutadiene, etc.

The above copolymers may be random copolymers or block copolymers. The stereoregularity of these resins may be isotactic or syndiotactic.

Specific examples of comonomers which can form the above various copolymers include ethylene, propylene, butene, pentene, hexene, heptene, octene, nonene, decene, undecene, dodecene and like $C_2$-$C_{12}$ α-olefins;

1,4-endomethylenecyclohexene and like bicyclic monomers; methyl (meth)acrylate, ethyl (meth)acrylate and like (meth) acrylic esters; vinyl acetate, etc.

Examples of catalysts used for manufacturing such polymers include not only generally used Ziegler-Natta catalysts but also catalyst systems comprising a combination of a transition metal compound (e.g., a titanium halide such as titanium trichloride or titanium tetrachloride) supported on a support comprising, as a main component, magnesium chloride or like magnesium halide, with an alkylaluminum compound (such as triethylaluminum or diethylaluminum chloride), and metallocene catalysts.

The recommended melt flow rate (hereinafter referred to as "MFR", measured according to JIS K 7210-1995) of the polyolefin resin used in the invention can be suitably selected according to the molding method to be employed, but is usually 0.01 to 200 g/10 min, and preferably 0.05 to 100 g/10 min.

To the extent that the effects of the invention are not impaired, the above-mentioned known polyolefin modifiers may be added to the polyolefin-based resin composition of the invention depending on the purpose and/or application thereof.

With the thus-obtained polyolefin-based resin composition of the invention, the crystallization rate can be controlled by varying the resin temperature conditions during molding and the proportions of component (A) and component (B). The details are as follows.

(I) In the case where the resin temperature during molding (molding temperature) T is not lower than the melting temperature of a polyolefin-based resin and not higher than the transition temperature of storage modulus during heating Tsh, the crystallization rate of the polyolefin-based resin can be increased (the end time of crystallization can be shortened) by increasing the proportion of component (B) within the component (A):component (B) weight ratio range of 100:0 to 30:70. With this molding method (I), molded products especially excellent in rigidity can be produced.

(II) In the case where the resin temperature during molding (molding temperature) T is higher than the transition temperature of storage modulus during heating Tsh, the crystallization rate of the polyolefin-based resin can be reduced (the end time of crystallization can be extended) by increasing the proportion of component (B) within the components (A): component (B) weight ratio range of 100:0 to 30:70. With this molding method (II), molded products especially containing a low amount of undispersed nucleating agent and having excellent transparency can be produced.

Thus, when observed over the entire molding temperature range consisting of the resin temperature range from Tm to Tsh and the resin temperature range higher than Tsh, and also when observed in each of the resin temperature range from Tm to Tsh and the resin temperature range higher than Tsh, by changing the proportion of component (B), the crystallization rate of the polyolefin-based resin can be controlled, i.e., reduced or increased, as compared with the crystallization rate achieved in molding method (II) wherein component (A):component (B) weight ratio is 100:0.

Method for Controlling the Crystallization Rate of a Polyolefin-based Resin

As described above, the polyolefin-based resin composition of the invention can control the crystallization rate during molding by varying the resin temperature conditions during molding and the proportions of component (A) and component (B). Thus, the present invention also provides a method for controlling the crystallization rate (end time of crystallization) of a polyolefin-based resin during molding, the method comprising incorporating components (A) and (B) into the polyolefin-based resin in such a manner that the component (A):component (B) weight ratio is within the range from 100:0 to 30:70.

In the controlling method of the invention, there are no particular restrictions on the amount of the polyolefin-based resin crystallization rate-controlling composition of the invention as long as the desired effects can be attained, and the amount can be suitably selected from a wide range. Generally, the amount of the crystallization rate-controlling composition is 0.01 to 10 parts by weight, preferably 0.05 to 5 parts by weight, and more preferably 0.05 to 2 parts by weight, per 100 parts by weight of polyolefin-based resin.

When Components (A) and (B) are simultaneously or separately added to the polyolefin-based resin, it is also recommended that the total amount of components (A) and (B) is 0.01 to 10 parts by weight, preferably 0.05 to 5 parts by weight, and more preferably 0.05 to 2 parts by weight, per 100 parts by weight of the polyolefin-based resin.

In this specification and claims, the term "end time of crystallization" denotes a value determined from the results obtained by using a differential scanning calorimeter ("DSC7", trade name, manufactured by Perkin-Elmer), as will be described below and later in Examples.

More specifically, the temperature of a polyolefin-based resin composition is adjusted to a temperature at which molding is carried out, and is then quenched to a temperature at which end time of crystallization is measured (which is in the range 0 to 20° C. higher than the crystallization temperature (determined by the method to be described in Examples) of the composition) at a cooling rate of 100 to 200° C. per minute, and then isothermal crystallization of the polyolefin-based resin is carried out at the measurement temperature.

In the chart (see FIG. 1) obtained by the differential scanning calorimetry, an extension line indicated by (a) in FIG. 1 is drawn by extending the baseline from the longer time side toward the shorter time side, and also a tangential line indicated by (b) in FIG. 1 is drawn at the point of the curve (d) in the longer time side of the heat flow peak where the tangential line has a maximum slope, and then the point (indicated by (c) in FIG. 1) at which the extension line and the tangential line intersect is determined. The time at the intersection is defined as "the end time of crystallization" of the polyolefin-based resin composition.

The longer the end time of crystallization, the longer the time period during which the polyolefin-based resin composition is moldable. Measurement start time in measuring the end time of crystallization is a point at which the temperature of the polyolefin-based resin composition quenched has reached the measurement temperature.

Depending on the type of molding methods and resins to be molded, a rapid crystallization rate of a resin may sometimes hinder the processing. For example, if the crystallization rate of a polyolefin-based resin is not within a suitable range, a homogenous molded product is difficult to obtain by injection molding of large-size products, film molding, sheet molding, blow forming, or the like.

On the other hand, it would be industrially advantageous, for example, in the field of injection molding for small-size products, if the crystallization rate of polyolefin-based resins can be increased to shorten crystallization time so as to reduce production costs as much as possible.

Thus, if a method for controlling the crystallization rate of a polyolefin-based resin, or a resin composition in which the crystallization rate can be controlled is available, a wide range of processing can be realized without solely depending on the complicated procedures for determining molding machine variables, whereby an object of the invention is achieved. The present invention also provides a method for controlling the crystallization rate of a polyolefin-based resin and a polyolefin-based resin composition that is suitable for various molding methods.

The method of controlling the crystallization rate of the polyolefin-based resin according to the invention comprises incorporating a polyolefin-based resin crystallization rate-controlling composition into a polyolefin-based resin to give a polyolefin-based resin composition, and molding the polyolefin-based resin composition.

Alternatively, the controlling method may comprise, for example, dissolving component (B) of the invention in the polyolefin-based resin to give a resin composition in advance in the form of a powder, pellets, granules, etc., incorporating component (A) of the invention into the resin composition to obtain the polyolefin-based resin composition of the invention, and then molding the polyolefin-based resin composition.

More specifically the method for controlling the crystallization rate according to the invention comprises the step of:

(1) incorporating components (A) and (B) which constitute the polyolefin-based resin crystallization-rate controlling composition simultaneously or separately into a polyolefin-based resin to give a polyolefin-based resin composition of the invention, and (2) molding said polyolefin-based resin composition.

Step (1) is as described above in the item entitled "Polyolefin-based resin composition." Since the amide-based compound (A) of the invention is a dissolution-type nucleating agent, it is important to fully dissolve the crystallization rate-controlling composition of the invention in a polyolefin-based resin before Step (2) above is carried out, in order that the performance of the crystallization rate-controlling composition can be maximally achieved and that the effects of the invention are produced.

Step (2) is described below in detail.

In this specification and claims, the transition temperature of storage modulus during cooling (referred to as "Tsc") and the transition temperature of storage modulus during heating (referred to as "Tsh") are defined as follows.

The amide-based compound represented by General Formula (1) used in the invention forms a thermo-reversible network structure made of fibrous particles in the polyolefin-based resin. The storage modulus of the invention is attributed to this formation of the network structure formed by the fibrous particles of the amide-based compound. The storage modulus (G') of the molten polyolefin-based resin containing the amide-based compound changes discontinuously as a function of temperature. An example is schematically shown in FIG. 2.

Figure 2:
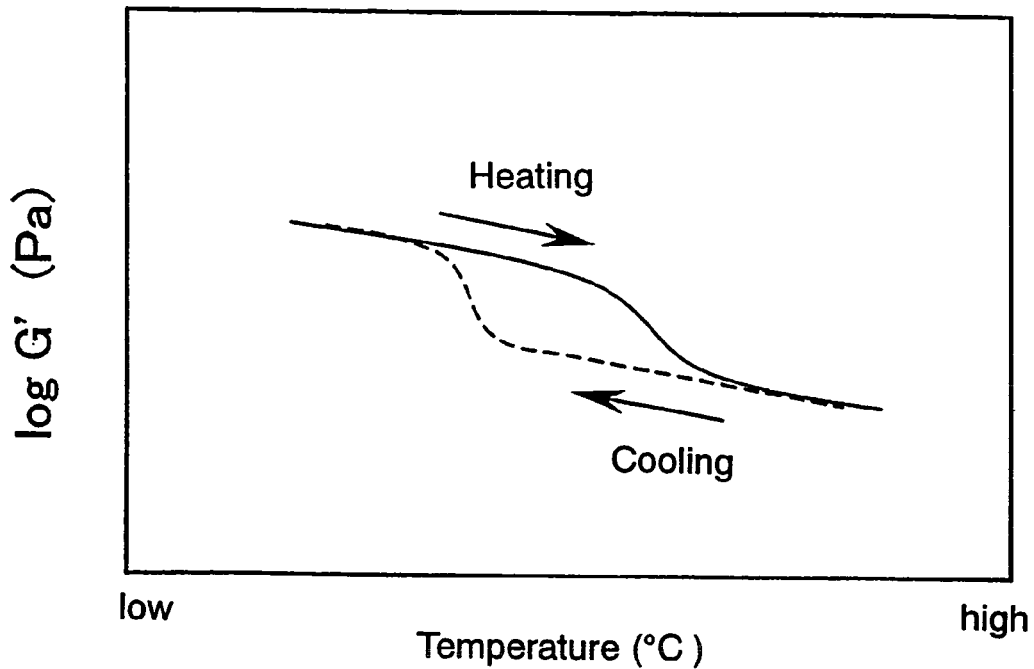
FIG. 2 is a graph schematically showing storage modulus temperature dependency curves during heating (solid line) and during cooling (broken line) of a resin composition comprising a polyolefin-based resin and an amide-based compound represented by the formula (1).

As shown by the broken line in FIG. 2, the storage modulus (G') of the molten polyolefin-based resin containing the amide-based compound varies (increases) discontinuously due to the formation of a network structure made of fibrous particles during cooling, and the temperature at which the maximum rate of change of variation occurs is defined as Tsc. As shown by the solid line in FIG. 2, G' varies (decreases) during heating due to a breakdown of the network structure due to dissolution of fibrous particles of the amide-based compound, and the temperature at which the maximum rate of change of variation occurs is defined as Tsh.

Figure 3:
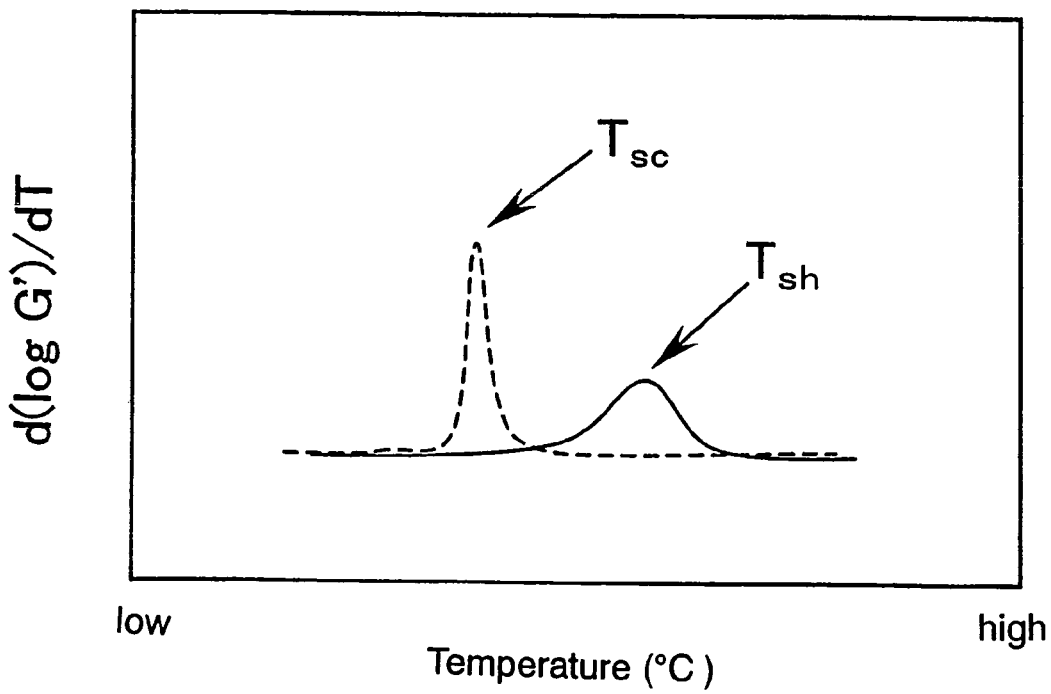
FIG. 3 is a graph schematically showing the derivative curves of the temperature dependency curves of FIG. 2.

Tsc and Tsh can be determined by measuring the dynamic viscoelasticity using a rheometer. The measurement method will be described later in detail in Examples. Thereby, a curve during heating (solid line) and a curve during cooling (broken line) are obtained as shown in FIG. 2, and the curves are converted into derivative curves, whereby peaks appear as shown in FIG. 3. The temperatures at which these peaks appear are defined as Tsh and Tsc, respectively.

Tsh and Tsc may vary depending on the type of the amide-based compound(s) represented by General Formula (1) used, and the amount thereof and the like. For example, Tsh and Tsc shift to higher temperatures when the content of amide-based compound(s) is high or when the proportion of the trans-configured form of the stereoisomeric alkylcyclohexylamine residue constituting the amide-based compound(s) is high.

Therefore, before manufacturing the polyolefin-based resin molded product of the invention, a polyolefin-based resin composition containing the crystallization rate-controlling composition dissolved therein is preliminarily prepared, and the Tsh and Tsc values of the obtained resin composition are measured beforehand. According to the Tsh and Tsc values thus measured, the temperature conditions during practical production of the polyolefin-based resin molded product may be adjusted.

Generally, when at least one amide-based compound represented by General Formula (1) wherein $R^1$ is a residue obtained by removing all of the carboxyl groups from 1,2,3-propanetricarboxylic acid is used, Tsh may range from 170 to 250° C., particularly from 180 to 240° C. When at least one amide-based compound represented by General Formula (1) wherein $R^1$ is a residue obtained by removing all of the carboxyl groups from 1,2,3,4-butanetetracarboxylic acid is used, Tsh may generally range from 180 to 280° C., particularly from 190 to 270° C.

For controlling the crystallization rate of the polyolefin-based resin, the resin temperature (molding temperature) T during step (2) is a particularly important variable. Hereinafter, the method for controlling the crystallization rate will be described with respect to a situation (molding method (I)) in which the resin temperature T is not higher than Tsh (and not lower than the melting temperature of the polyolefin-based resin), and then with respect to a situation (molding method (II)) in which the resin temperature is higher than Tsh.

<Molding Method (I)>

When the resin temperature T is not lower than the melting temperature of the polyolefin-based resin (hereinafter, referred to as "Tm") and is not higher than Tsh (i.e., Tm≦T≦Tsh), the crystallization rate of the polyolefin-based resin composition can be increased (end time of crystallization can be shortened) by increasing the proportion of component (B) within the component (A):component (B) weight ratio range of 100:0 to 30:70.

Figure 7:
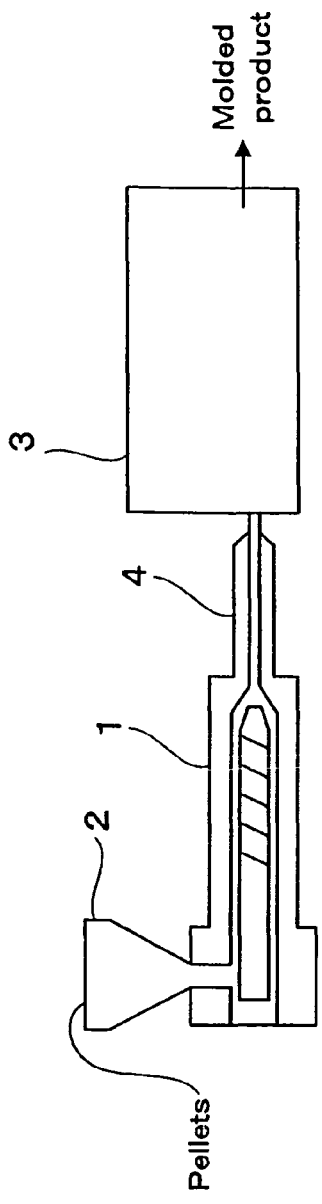
FIG. 7 is a conceptual diagram illustrating the state of a polyolefin-based resin composition during each step of molding processes.
Figure 7:
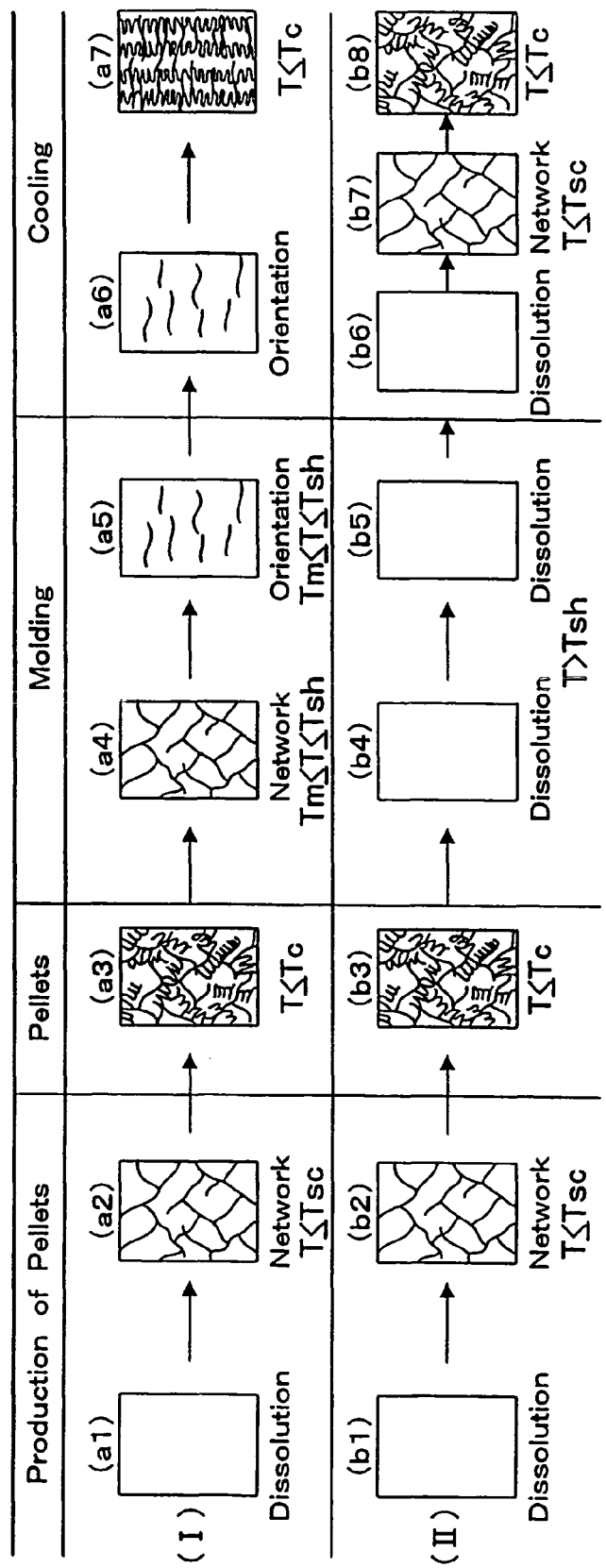

Specifically, as shown in FIG. 8, when the resin temperature during molding (molding temperature) T is set to a temperature that is not lower than the melting temperature Tm of the polyolefin-based resin and not higher than the transition temperature of storage modulus during heating Tsh (molding method (I) of FIG. 7), the crystallization rate of the polyolefin-based resin can be increased (end time of crystallization can be shortened) by increasing the proportion of the specific fatty acid metal salt (B) (region (IA)→region (IAB)). The degree of increase in crystallization rate mainly depends on the combination of components (A) and (B) and the weight ratio of component (B) to component (A).

Molding method (I) significantly contributes to an improvement in rigidity of a polyolefin-based resin molded product, and the improvement is particularly noticeable in homopolypropylene resins, block polypropylene resins and high-density polyethylene resin.

In this resin temperature range, molding is carried out in such a state that the above-described network structure is maintained (i.e., a temperature at which the fibrous particles forming the network structure do not dissolve or melt), and thus the fibrous particles forming the network structure are orientated, and the polyolefin-based resin crystallizes in an orientated manner.

More specifically, as shown in (I) in FIG. 7, molding is carried out at a temperature not higher than the transition temperature of storage modulus during heating Tsh, with the network structure being maintained, and therefore the fibrous particles constituting the network structure is oriented, with the result that the polyolefin-based resin crystal lamellae are orientated in the resulting molded product, consequently giving a molded product especially excellent in rigidity.

The molding method of the polyolefin-based resin composition in step (2) can be widely applied to all types of molding methods that comprise an injection step or an extrusion step. Such molding methods include injection molding, extrusion molding, injection blow molding, injection extrusion blow molding, injection compression molding, extrusion blow molding, extrusion thermoform molding, fiber production by melt spinning, etc.

In molding step (2), the crystallization rate of the polyolefin-based resin can be controlled over a wide range by utilizing the phenomenon that the amide-based compound represented by General Formula (1) forms a network structure in the polyolefin-based resin, in addition to the use of the polyolefin-based resin crystallization rate-controlling composition of the invention.

Hereinafter, molding method (I) is described in more detail. Molding method (I) is also a process for producing a molded product, the process being capable of controlling (increasing) the crystallization rate by the use of component (B). Molding method (I) will be described with reference to (I) of FIG. 7 which schematically illustrates the production method of the polyolefin-based resin composition (production of pellets) and the process for producing a polyolefin-based resin molded product (molding method) of the invention.

<Process for Preparing a Polyolefin-based Resin Composition (Pellets)>

As described above, the polyolefin-based resin composition of the invention is typically produced by the following method.

For example, the polyolefin-based resin (in the form of particles, granules, or pellets) and the above-described crystallization rate-controlling composition of the invention (alternatively, the polyolefin-based resin (in the form of particles, granules, or pellets) and components (A) and (B) of the invention, and, if desired, the above-described polyolefin modifiers) are dry-blended using a conventional mixer, such as a Henschel mixer, ribbon blender, V-blender, etc. The dry-blended product thus obtained is melt-kneaded at a temperature which is the same as or higher than the temperature at which the amide-based compound of the invention represented by General Formula (1) melts, using a conventional kneader, such as single screw or twin screw extruder or the like, giving a molten mixture (see (a1) of FIG. 7).

The obtained molten mixture is extruded and the resin temperature T of the resultant strand is cooled to a temperature which is equal to or lower than the transition temperature of storage modulus during cooling Tsc, thus giving a polyolefin-based resin composition containing a network structure of fibrous particles of the amide-based compound (see (a2) of FIG. 7). The thin lines in (a2) of FIG. 7 schematically illustrate the fibrous particles (and this similarly applies to the other views in FIG. 7).

Insofar as the resin temperature T of the obtained polyolefin-based resin composition is adjusted to a temperature which is not higher than Tsc, the polyolefin-based resin itself is not necessarily in a solid state, and may be in a molten state.

If desired, however, the resin temperature T of the obtained strand may be cooled to the crystallization temperature (hereinafter, referred to as "Tc") of the polyolefin-based resin composition or lower, for example, to room temperature or lower, and the resultant strand may be cut, giving pellets of the polyolefin-based resin composition (see (a3) of FIG. 7).

In the pellets thus obtained, crystalline lamellae of the polyolefin-based resin have grown from the fibrous particles of the amide-based compound represented by General Formula (1). The wavy lines shown in (a3) of FIG. 7 schematically illustrate the crystal lamellae of the polyolefin-based resin (and this similarly applies to the other views in FIG. 7).

The above process for producing pellets is the same as the process for producing pellets in molding method (II) that will be described later.

<Process for Producing Polyolefin-based Resin Molded Products>

Preferable embodiments of the production process (molding method (I)) of the invention include, for example, one employing the following steps [1] to [5]. Hereinafter, these steps are described with reference to (I) of FIG. 7. While FIG. 7 shows a molding method comprising an injection step, a molding method comprising an extrusion step will also be described below.

[1] First, as shown in (a1) of FIG. 7, the crystallization rate-controlling composition of the invention (or, components (A) and (B) and, if desired, polyolefin modifiers, etc.) is dissolved as uniformly as possible. The resin temperature T during this step is, for example, in the range of from 160 to 300° C. in the case of using a polypropylene-based resin.

[2] Next, as shown in (a2) of FIG. 7, the polyolefin-based resin composition is cooled to a resin temperature not higher than the transition temperature of storage modulus during cooling Tsc, whereby a network structure composed of fibrous particles of the amide-based compound is formed.

Tsc shifts to higher temperatures with an increase in the content of the amide-based compound or with an increase in the proportion of trans-configured form of the stereoisomeric alkylcyclohexylamine reside constituting the amide-based compound(s).

If required, as shown in (a3) of FIG. 7, the resin temperature T may be further lowered to a temperature which is equal to or lower than the crystallization temperature Tc of the polyolefin-based resin, and the polyolefin-based resin in the molten polyolefin-based resin composition is crystallized and pellets may be produced. At this time point, the network structure of fibrous particles formed of the amide-based compound represented by General Formula (1) is maintained in the pellets.

[3] In the invention, when a molding method comprising an injection step is adopted, the polyolefin-based resin composition (shown in (a2) of FIG. 7) containing a network structure of fibrous particles made of the amide-based compound is formed into pellets (shown in (a3) of FIG. 7), and the obtained pellets are introduced from a hopper 2 of the injection molding machine 1. Subsequently, as shown in (a4) of FIG. 7, the injection molding is carried out under such conditions that the above-mentioned network structure is maintained, under specific temperature conditions (namely, Tm$\leq$T$\leq$Tsh). By doing so, as shown in (a5) in FIG. 7, the minute fibrous particles of the amide-based compound represented by General Formula (1) constituting the network structure are orientated by the shearing forces generated at the time of injection, especially by the shearing forces generated by the flow in the nozzle 4 of the injection molding machine 1 and by the flow in the mold 3.

On the other hand, when a molding method comprising an extrusion step is adopted, the polyolefin-based resin composition (shown in (a2) of FIG. 7) containing the network structure of fibrous particles of the amide-based compound represented by General Formula (1) does not need to be made into pellets and is subjected as it is to a molding method comprising an extrusion step under the specific temperature conditions, while the network structure is maintained. Alternatively, the polyolefin-based resin composition containing the network structure (shown in (a2) of FIG. 7) is made into pellets as shown in (a3) of FIG. 7, and the obtained pellets are subjected to a molding method comprising an extrusion step under the specific temperature conditions during which the network structure is maintained. By doing so, the minute fibrous particles of the amide-based compound represented by General Formula (1) are orientated by the shearing forces generated during extrusion.

The above-described specific temperature condition adopted in these molding methods are such that the resin temperature T is adjusted to a temperature not lower than the melting temperature Tm of the polyolefin-based resin, and not higher than the transition temperature of storage modulus during heating Tsh of the polyolefin-based resin composition (i.e., Tm$\leq$T$\leq$Tsh). Tsh shifts to higher temperatures with an increase in the content of the amide-based compound or with an increase in the proportion of the trans-configured form of the stereoisomeric alkylcyclohexylamine residue constituting the amide-based compound(s).

Examples of the above-described specific temperature conditions are as follows. When at least one amide-based compound represented by General Formula (1) wherein $R^1$ is a residue obtained by removing all of the carboxyl groups from 1,2,3-propanetricarboxylic acid is used, the resin temperature T may generally range from 170 to 250° C., particularly from 180 to 240° C. When at least one amide-based compound represented by General Formula (1) wherein $R^1$ is a residue obtained by removing all of the carboxyl groups from 1,2,3,4-butanetetracarboxylic acid is used, the resin temperature T may generally range from 180 to 280° C., particularly from 190 to 270° C.

[4] The molten polyolefin resin composition which has reached the mold in the molding method comprising an injection step is cooled by the mold, and thus the minute fibrous particles of the amide-based compound represented by General Formula (1) remain orientated in the resin flow direction (see (a6) of FIG. 7).

Similarly, the molten polyolefin resin composition which has reached a chill roll in the molding method comprising an extrusion step is cooled by the chill roll, and thus the minute fibrous particles of the amide-based compound represented by General Formula (1) remain orientated in the resin flow direction.

[5] Subsequently, the resin composition, shown in (a6) of FIG. 7, wherein the minute fibrous particles of the amide-based compound represented by General Formula (1) are orientated, is cooled to a temperature equal to or lower than the crystallization temperature (Tc) of the polyolefin-based resin, thereby causing crystallization of the polyolefin-based resin. Since the fibrous particles have been orientated, the polyolefin-based resin crystalline lamellae grown from the fibrous particles are also orientated during this step (see (a7) of FIG. 7). The same also happens in the molding method comprising an extrusion step.

During this step, the temperature of the mold or chill roll needs to be equal to or lower than the crystallization temperature Tc of the polyolefin-based resin. Preferably, the temperature may be, for example, in the range of 10 to 80° C.

As a result, the polyolefin-based resin molded product obtained by the production process of the invention is characterized in that the crystalline lamellae of the polyolefin-based resin are orientated.

As described above, molding method (I) of the invention utilizes the phenomenon that the amide-based compound represented by General Formula (1) forms a network structure under the above-mentioned specific temperature conditions, and comprises conducting molding in a state in which the network structure is maintained (i.e., at a temperature at which the fibrous particles forming the network structure do not dissolve or melt), thereby orientating the fibrous particles, and crystallizing the polyolefin-based resin in an oriented manner.

As a result, the molding method (I) of the invention can provide a molded product with excellent mechanical strength, particularly rigidity (flexural modulus).

Accordingly, the invention also provides, as described in Item 18 above, a process for producing a polyolefin-based resin molded product, the process comprising molding the resin composition of the invention at a resin temperature not lower than the melting temperature of the polyolefin-based resin and not higher than the transition temperature of storage modulus during heating.

In this production process, it is preferable that $R^1$ represents a residue obtained by removing all carboxyl groups from 1,2,3-propanetricarboxylic acid, and three $R^2$ groups are the same or different and represent cyclohexyl or cyclohexyl substituted with one $C_{1-4}$ linear or branched alkyl (i.e. process of Item 19).

In the production process (molding method (I)), it is recommended that the amount of at least one amide-based compound represented by General Formula (1) is preferably 0.01 to 5 parts by weight, more preferably 0.05 to 2 parts by weight, per 100 parts by weight of the polyolefin-based resin. Within this range, a significant improvement in rigidity can be observed. It is also possible to use the amide-based compound in an amount of more than 5 parts by weight.

The above production process can produce a molded product having excellent rigidity, even when the amide-based compound of General Formula (1) alone is used (namely component (A) alone is used without using component (B)). However, in order to improve rigidity and also in order to control the crystallization rate of the polyolefin-based resin, it is preferable to use a fatty acid metal salt (component (B)).

It is advantageous that the amount of the fatty acid metal salt (component (B)) is generally 0 to 5 parts by weight, preferably 0 to 1 parts by weight, more preferably 0.005 to 0.5 parts by weight, particularly preferably 0.01 to 0.3 parts by weight, per 100 parts by weight of the polyolefin-based resin. Also, by increasing the proportion of component (B) within the component (A):component (B) weight ratio range of 100:0 to 30:70, the crystallization rate of the polyolefin-based resin can be increased (end time of crystallization can be shortened).

<Molding Method (II)>

When the resin temperature T exceeds Tsh (i.e., Tsh<T), it is possible to reduce the crystallization rate (i.e., to prolong the end time of crystallization) of a polyolefin-based resin by increasing the proportion of component (B) within the component (A):component (B) weight ratio range of 100:0 to 30:70.

Specifically, as shown in FIG. 8, when the resin temperature during molding (molding temperature) T is set to a temperature that is higher than the transition temperature of storage modulus during heating Tsh (molding method (II) of FIG. 7), the crystallization rate of the polyolefin-based resin can be reduced (end time of crystallization can be prolonged) by increasing the proportion of the fatty acid metal salt (B) (region (IIA)→region (IIAB)).

By increasing the proportion of component (B), it is also possible to lower the crystallization temperature Tc of the polyolefin-based resin.

The degree of decrease in crystallization rate and degree of lowering of crystallization temperature mainly depend on the combination of components (A) and (B) and the ratio of component (B) to component (A).

Molding method (II) greatly improves the transparency of polyolefin-based resin molded products, and this effect is particularly noticeable in homopolypropylene resins and random polypropylene resins.

In molding method (II), an excessively high resin temperature T might deteriorate the resin, and therefore the resin temperature T is preferably not higher than 300° C., in particular not higher than 280° C.

In such a resin temperature range, fibrous particles of the above-mentioned amide-based compound are melted or dissolved, and a network structure is not present.

More specifically, according to molding method (II), as shown in (II) of FIG. 7, the molding is carried out at a temperature higher than the transition temperature of storage modulus during heating Tsh, with no network structure being present, with the result that, upon cooling the molten resin composition, fibrous particles of the amide-based compound are formed and re-constitute a network structure, from which minute crystals (spherulites) of the polyolefin-based resin are formed, and consequently molded products having excellent transparency can be obtained.

<Process for Producing Polyolefin-based Resin Molded Products>

Hereunder, molding method (II) is explained in detail. Molding method (II) is also a process for preparing a molded product, the process being capable of controlling (reducing) the crystallization rate by the use of component (B).

A preferable example of the molding method is described below with reference to (II) of FIG. 7, which is a diagram schematically illustrating a process for producing the polyolefin-based resin molded product (molding method) of the present invention.

Note that the method for producing the polyolefin-based resin composition (production of pellets) as shown in (b1) to (b3) of (II) of FIG. 7 is the same as that shown in (a1) to (a3) of (I) of FIG. 7 described with respect to the above-described molding method (I).

As shown in (b4) and (b5) of FIG. 7, when the resin composition is molded while the resin temperature T is set to a temperature higher than Tsh, the resin composition is molded in a state such that the fibrous particles have been melted or dissolved and the network structure has disappeared.

As a result, after an injection or extrusion step, the molten polyolefin-based resin composition reaches a mold or a chill roll with no network structure being present, and, as shown in (b6) and (b7) of FIG. 7, the molten polyolefin-based resin composition is cooled to a temperature not higher than the transition temperature of storage modulus during cooling Tsc, whereby a network structure is reconstituted. At this point, the resin composition is subjected to an injection or extrusion step, and therefore the network structure is slightly orientated, but the degree of the orientation is low.

Since the degree of orientation of the fibrous particles is low as described above, the resulting molded product, obtained by cooling the polyolefin-based resin composition to a temperature equal to or lower than the crystallization temperature Tc, has a low degree of orientation of its crystalline lamellae, as shown in (b8) of FIG. 7.

According to molding method (II), it is possible to obtain a molded product having high transparency and containing a low amount of undispersed nucleating agent. Therefore, the present invention provides, as described in Item 17 above, a process for producing a polyolefin-based resin molded product, wherein the polyolefin-based resin composition of the invention is molded at a resin temperature higher than the transition temperature of storage modulus during heating.

In the above molding method (II), the molding method may include molding methods comprising an injection step or an extrusion step. Such molding methods include injection molding, extrusion molding, injection blow molding, injection extrusion blow molding, injection compression molding, extrusion blow molding, extrusion thermoform molding, fiber production by melt spinning, etc.

The effects of the invention (production of a molded product having high transparency and containing a low amount of undispersed nucleating agent) achieved by employing molding method (II) are produced when the weight ratio of component (A):component (B) is preferably in the range from 100:0 to 30:70, preferably 95:5 to 30:70, more preferably 90:10 to 60:40, and particularly preferably 90:10 to 70:30. By increasing the proportion of component (B) within this range, the crystallization rate of the polyolefin-based resin can be reduced.

In the above production process (molding method (II)) as well, it is recommended that the amount of at least one amide-based compound (component (A)) represented by General Formula (1) is preferably 0.01 to 5 parts by weight, more preferably 0.05 to 2 parts by weight, per 100 parts by weight of the polyolefin-based resin. Within this range, a significant improvement in transparency can be observed. It may be used in an amount of more than 5 parts.

The above production process can produce a molded product having excellent transparency, even when the amide-based compound of General Formula (1) alone is used (namely component (A) alone is used without using component (B)). However, in order to improve transparency and also in order to control the crystallization rate of the polyolefin-based resin, it is preferable to use a fatty acid metal salt (component (B)).

It is advantageous that the amount of the fatty acid metal salt (component (B)) is generally 0 to 5 parts by weight, preferably 0 to 1 parts by weight, more preferably 0.005 to 0.5 parts by weight, particularly preferably 0.01 to 0.3 parts by weight, per 100 parts by weight of the polyolefin-based resin. Also, by increasing the proportion of component (B) within the component (A):component (B) weight ratio range of 100:0 to 30:70, the crystallization rate of the polyolefin-based resin can be decreased (end time of crystallization can be extended).

As is clear from the above description of method (I) and method (II), by using component (A) in combination with component (B) in a specific ratio, it is possible in the present invention to control the crystallization rate of a polyolefin-based resin during molding of the polyolefin-based resin composition of the invention. Thus, the invention also provides the use of a composition comprising component (A) and component (B) having a weight ratio of component (A):component (B) in the range of 100:0 to 30:70 for controlling the crystallization rate of a polyolefin-based resin during the molding of the polyolefin-based resin.

Polyolefin-based Resin Molded Product

The molded product of the present invention can be obtained by molding a polyolefin-based resin composition of the invention by a conventional molding method insofar as the conditions required for molding methods (I) and (II) are used. Because it is possible to control the crystallization rate of the polyolefin-based resin composition of the invention, any known method, such as injection molding, extrusion molding, blow molding, pressure forming, rotational molding, sheet molding or film molding, can be employed as the method for molding the polyolefin resin composition. The processing conditions may be suitably selected from the wide range of conditions that have been employed to date.

When molding method (II) is employed, molded products having excellent transparency can be obtained. When molding method (I) is employed, molded products having excellent rigidity can be obtained.

A polyolefin-based resin molded product obtained by molding method (I), in particular, a molded product obtained by using a generally-used ethylene-propylene random copolymer (especially, one having an ethylene content of about 2 to 4 wt. % with the balance being propylene), a propylene homopolymer or an ethylene-propylene block copolymer (especially, one having an ethylene content of about 5 to 15 wt. % and the balance being propylene), and at least one amide-based compound represented by General formula (1), has a degree of orientation of 2 or more (particularly 2 to 10), as defined by the ratio of the (040) reflection intensity to the (110) reflection intensity measured by wide-angle X-ray diffractometry, and exhibits significantly high rigidity. The degree of orientation is measured as follows:

The X-ray diffraction intensity is measured according to conventional symmetrical reflection X-ray diffractometry using a centralized optical system that rotates while maintaining the relationship θ-2θ wherein θ is an incident angle of an X-ray relative to the surface of the sample of the injection molded product and 2θ is a diffraction detection angle. The thus obtained X-ray diffraction intensity pattern is then subjected to peak-separation between amorphous halo peaks and crystalline peaks, and the degree of orientation is obtained from the ratio of the peak intensity of the (040) plane reflection (2θ=about 16.6°) to the peak intensity of the (110) plane reflection (2θ=about 13.9°) with respect to polypropylene crystals using the following formula (F):

$$\text{Degree of orientation} = I_{(040)}/I_{(110)} \quad (F)$$

wherein $I_{(110)}$ represents the peak intensity (cps) due to the (110) plane reflection and $I_{(040)}$ represents the peak intensity (cps) due to the (040) plane reflection.

The polyolefin-based resin composition obtained by molding method (I) of the invention can impart excellent rigidity to a polyolefin-based resin molded product. This also contributes toward making molded products thin and light-weight.

The thus-obtained polyolefin resin molded products of the invention can be suitably used in the fields in which polyolefin resin molded products containing metal phosphates, aromatic carboxylic acid metal salts, benzylidene sorbitols, etc., as nucleating agents, are used. Specific examples include medical instruments sterilized by heat, radiation or the like, such as disposable syringes, infusion and transfusion sets, blood collection equipment, etc.; packaging materials for foods, plants, etc., sterilized by radiation or the like; cases such as cases for clothing, containers for storing clothing, etc.; cups for heat-packed foods, packaging containers for retort-processed foods; containers for use in microwave ovens; cans, bottles, etc., for beverages, such as juice, tea, etc., cosmetics, medicines, shampoos, etc.; containers and cups for seasonings such as miso, soy sauce, etc.; cases and containers for food stuffs such as water, rice, bread, pickles, etc.; sundries such as cases for use in refrigerators, etc.; stationeries; electrical and mechanical parts; automobile parts, etc.

EXAMPLES

The invention is described below in detail with reference to Examples and Comparative Examples, but the invention is not limited to or by these examples.

Storage modulus transition temperature (° C.) of a polyolefin-based resin composition of the invention, and crystallization temperature (° C.), end time of crystallization (min.), haze value (%), dispersibility (number of white spots), and flexural modulus (MPa), X-ray diffraction and degree of orientation of a molded product obtained from the polyolefin-based resin composition of the invention were measured and evaluated by the following methods.

(1) Crystallization Temperature Tc (° C.)

Using a differential scanning calorimeter (product name "DSC7", product of Perkin Elmer, Inc.), the peak temperature of the exothermic peak was measured according to JIS K-7121 except that a measurement sample (sample weight=10 mg; prepared by cutting the molded product (test piece) obtained in each Example or Comparative Example)

was heated to a resin temperature at which the molding of the polyolefin-based resin composition had been carried out, and kept at the same temperature for 3 minutes.

The higher the crystallization temperature (Tc), the shorter the molding cycle can be.

(2) End Time of Crystallization (min.) (Hereinafter Referred to as "Te")

Using a differential scanning calorimeter (product name "DSC7", product of Perkin Elmer, Inc.), a measurement sample (sample weight=10 mg; prepared by cutting the molded product (test piece) obtained in each Example or Comparative Example) was heated at a heating rate of 200° C./min. to a resin temperature at which the molding of the polyolefin-based resin composition had been carried out, and, after reaching this temperature, the resin composition was maintained at this temperature for 3 minutes. The resin composition was then quenched at a cooling rate of 100° C./min. to a measurement temperature at which the "end time of crystallization" was measured (isotactic ethylene-propylene random copolymer resin: 120° C., isotactic homopolypropylene resin and ethylene-propylene block copolymer resin: 130° C.), and the polyolefin-based resin was subjected to isothermal crystallization. Note that the start time for measuring the "end time of crystallization" was the point at which the temperature reached said measurement temperature after the quenching.

In the obtained differential scanning calorimetry (DSC) chart, the intersection point ((c) in FIG. 1) between an extension line ((a) in FIG. 1) extending from the base line from the longer time side toward the shorter time side and a tangential line ((b) of FIG. 1) drawn at the point of the curve ((d) of FIG. 1) in the longer time side of the exothermic peak where the tangential line has a maximum slope, and the time corresponding to the intersection point is defined as "end time of crystallization" (min.). The longer the "end time of crystallization", the longer the time over which composition can be molded.

(3) Haze Value (%)

The haze value of test piece having a size of 5 cm×5 cm×1 mm obtained in each Example or Comparative Example was measured according to JIS K-7136 (2000) using a haze meter (product of Toyo Seiki Seisakusho). The smaller the measured value, the higher the transparency.

(4) Dispersibility (Number of White Spots)

Ten test pieces (each 5 cm×5 cm×1 mm) obtained in each Example or Comparative Example were visually observed for white spots caused by undispersed or undissolved amide-based compound, and the average number of white spots per test piece was calculated and evaluated based on the following criteria.

Evaluation: average number of white spots
  S: 0.5 or less per test piece
  A: 1 or less per test piece
  B: more than 1 but not more than 2 per test piece
  C: more than 2 but not more than 10 per test piece
  D: more than 10 per test piece (5) Transition Temperature (° C.) of Storage Modulus (G')

Using a dynamic viscoelasticity analyzer (product of Rheology Co. Ltd., product name "MR-500 Soliquidmeter"), storage modulus temperature dependency curves of the polypropylene resin composition in the form of pellets produced in each example were obtained under the following measurement conditions. Tsc corresponds to the temperature of the peak maximum of the derivative curve of the temperature dependency curve during cooling, and Tsh corresponds to the temperature of the peak maximum of the derivative curve of the temperature dependency curve during heating.

<Conditions for Measuring the Storage Modulus>
  Measuring equipment: parallel plate (diameter of 20 mm)
  Frequency: 0.5 Hz
  Strain amplitude: 0.5°
  Temperature conditions:
  (i) Transition temperature of storage modulus during cooling (Tsc): This temperature was measured by maintaining the polyolefin-based resin composition (pellets) at 250° C. (or at 280° C. for Examples in which BTC-2MeCHA was used, or at 260° C. for Examples in which PTC-2MeCHA [100] or PTC-2MeCHA (100) was used) for one minute and cooling the resin composition to 150° C. at a cooling rate of 5° C./min.
  (ii) Transition temperature of storage modulus during heating (Tsh): This temperature was measured, after measuring the transition temperature of storage modulus during cooling, by re-heating the polyolefin-based resin composition to 250° C. (or to 280° C. for Examples in which BTC-2MeCHA was used, or to 260° C. for Examples in which PTC-2MeCHA [100] or PTC-2MeCHA (100) was used) at a heating rate of 5° C./min.

(6) Flexural Modulus (MPa)

The flexural modulus (MPa) of polyolefin-based resin molded products was measured according to JIS K-7203 (1982) using an Instron universal tester. The test temperature was 25° C., and the test speed was 10 mm/min. The greater the flexural modulus, the higher the rigidity.

Note that in the Examples and Comparative Examples in which flexural modulus was measured, the test pieces for measuring the flexural modulus had a length of 90 mm, a width of 10 mm and a height of 4 mm, unless otherwise specified.

(7) X-ray Diffraction Measurement

Figure 4:
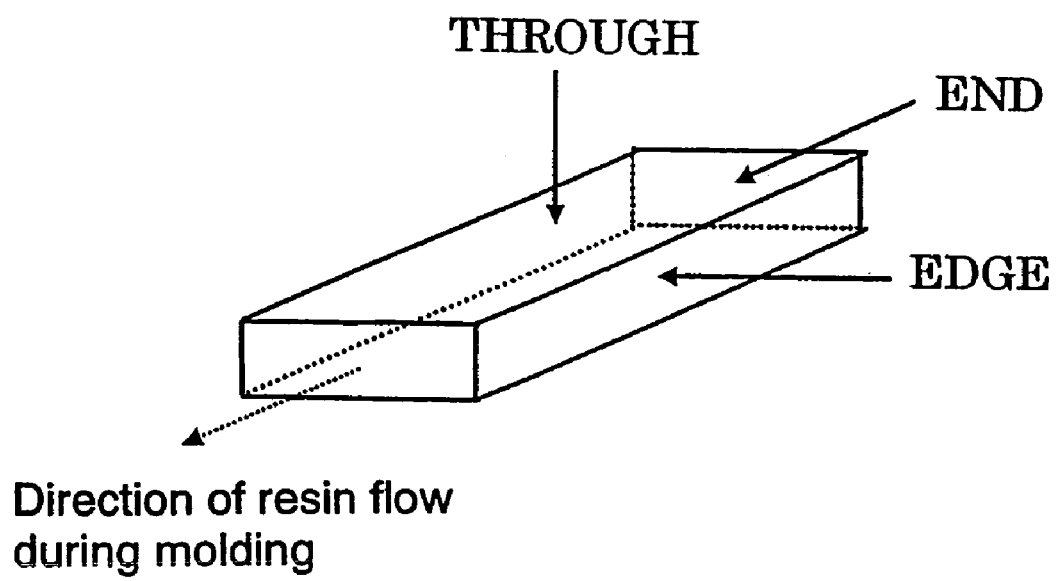
FIG. 4 shows a view showing THROUGH direction, END direction and EDGE direction of the test piece used in Examples and Comparative Examples.

Using an X-ray diffractometer (product of Rigaku Corporation, product name "RINT2000"), the X-ray diffraction of a test piece having a length of 90 mm, a width of 10 mm, and a height of 4 mm was measured. The X-rays were incident to the center of the test piece from the Through direction (see FIG. 4).

<Conditions for Measuring X-ray Diffraction>
  X-ray beam: CuKα
  X-ray tube: Cu
  Tube voltage: 40 kV, Tube current: 100 mA
  X-ray incidence angle (θ): θ-2θ scan
  Range of measurement angle (2θ): 5 to 30°
  Scanning speed: 4°/min.

(8) Degree of Orientation

The X-ray diffraction intensity pattern obtained by the method described in (7) above was subjected to separation of crystalline peaks from amorphous halo, and the degree of orientation was obtained from the ratio of the peak intensity of the (040) plane reflection (2θ=about 16.6°) to the (110) plane reflection (2θ=about 13.9°) of the polypropylene resin using the following formula (F):

$$\text{Degree of orientation} = I_{(040)}/I_{(110)} \quad (F)$$

wherein $I_{(110)}$ represents the peak intensity (cps) of the (110) plane reflection and $I_{(040)}$ represents the peak intensity (cps) of the (040) plane reflection.

The greater the degree of orientation, the greater the orientation of the polyolefin crystals.

Production Example 1

(1) In a four-necked 500 ml flask equipped with a stirrer, a thermometer, a condenser and a gas inlet were placed 9.7 g (0.055 mol) of 1,2,3-propanetricarboxylic acid (hereunder referred to as PTC) and 100 g of N-methyl-2-pyrrolidone and the PTC was completely dissolved with stirring under nitrogen atmosphere at room temperature. Subsequently, 20.5 g (0.1815 mol) of 2-methylcyclohexylamine (trans isomer:cis isomer=74.3:25.7, GLC composition ratio), 56.3 g (0.1815 mol) of triphenyl phosphite, 14.4 g (0.1815 mol) of pyridine and 50 g of N-methyl-2-pyrrolidone were added thereto, and the reaction was carried out with stirring under nitrogen atmosphere for 4 hours at 100° C. After cooling, the reaction solution was slowly poured into a mixture of 500 ml of isopropyl alcohol and 500 ml of water, and the resulting mixture was stirred at 40° C. for one hour, and the white precipitate thus formed was then filtered off. The obtained white solid was washed twice with 500 ml of isopropyl alcohol at 40° C., and dried at 100° C. and 133 Pa for 6 hours.

The obtained dry product was ground in a mortar and passed through a standard sieve (according to JIS Z 8801) having openings of 106 μm to give 18.8 g (74% yield) of 1,2,3-propanetricarboxylic acid tris(2-methylcyclohexylamide) (hereinafter referred to as "PTC-2MeCHA").

(2) The unreacted 2-methylcyclohexylamine recovered from the above amidation reaction was subjected to GLC analysis. It was found that the trans:cis ratio of the unreacted amine was 74.3:25.7, which was in agreement with the trans:cis ratio (74.3:25.7, GLC composition ratio) of the 2-methylcyclohexylamine used as the starting material.

The product amide obtained above, when heat-treated at 100° C., had a FT-IR spectrum and a melting point that were in full agreement with those measured before the treatment, verifying that the stereoconfiguration of the 2-methylcyclohexylamine residue constituting the amide-based compound was not altered by the amidation reaction.

In view of the above results, it was confirmed that the ratio of trans-configured 2-methylcyclohexylamine residue:cis-configured 2-methylcyclohexylamine residue of the product amide-based compound of this Production Example 1 was identical to the trans:cis ratio of the starting material amine.

In each of Production Examples 2, 3, 5 and 7, it was confirmed in the same manner as above that the ratio of the trans-configured alkylcyclohexylamine residue:cis-configured alkylcyclohexylamine residue of the product amide-based compound was identical to the trans:cis ratio of the starting material amine.

Production Example 2

The procedure of Production Example 1 was repeated except that 3-methylcyclohexylamine (trans isomer:cis isomer=75.4:24.6, GLC composition ratio) was used in place of 2-methylcyclohexylamine, giving 15.5 g (yield 61%) of 1,2,3-propanetricarboxylic acid tris(3-methylcyclohexylamide) (hereunder referred to as "PTC-3MeCHA").

Production Example 3

The procedure of Production Example 1 was repeated except that 4-methylcyclohexylamine (trans isomer:cis isomer=58.4:41.6, GLC composition ratio) was used in place of 2-methylcyclohexylamine, giving 9.7 g (yield 38%) of 1,2,3-propanetricarboxylic acid tris(4-methylcyclohexylamide) (hereunder referred to as "PTC-4MeCHA").

Production Example 4

The procedure of Production Example 1 was repeated except that cyclohexylamine was used in place of 2-methylcyclohexylamine, giving 17.3 g (yield 75%) of 1,2,3-propanetricarboxylic acid tricyclohexylamide (hereunder referred to as "PTC-CHA").

Production Example 5

The procedure of Production Example 1 was repeated except that 12.9 g (0.055 mol) of 1,2,3,4-butanetetracarboxylic acid (in place of 1,2,3-propanetricarboxylic acid), 27.4 g (0.242 mol) of 2-methylcyclohexylamine (trans isomer:cis isomer=74.3:25.7, GLC composition ratio), 75.1 g (0.242 mol) of triphenyl phosphite and 19.1 g (0.242 mol) of pyridine were used, giving 21.3 g (yield 63%) of 1,2,3,4-butanetetracarboxylic acid tetrakis(2-methylcyclohexylamide) (hereunder referred to as "BTC-2MeCHA").

Production Example 6

The procedure of Production Example 1 was repeated except that 2-methylcyclohexylamine (trans isomer:cis isomer=100:0, GLC composition ratio) was used in place of 2-methylcyclohexylamine (trans isomer:cis isomer=74.3:25.7, GLC composition ratio), giving 20.3 g (yield 80%) of 1,2,3-propanetricarboxylic acid tris(2-methylcyclohexylamide) (hereunder referred to as "PTC-2MeCHA [100]".

Production Example 7

The procedure of Production Example 1 was repeated except that 2-methylcyclohexylamine (trans isomer:cis isomer =50:50, GLC composition ratio) was used in place of 2-methylcyclohexylamine (trans isomer:cis isomer=74.3:25.7, GLC composition ratio), giving 18.0 g (yield 71%) of 1,2,3-propanetricarboxylic acid tris(2-methylcyclohexylamide) (hereunder referred to as "PTC-2MeCHA [50]").

Examples of the present invention are described below. Examples 1 to 51 relate to the above-described molding method (II) (T>Tsh) wherein Examples 1 to 33 use an ethylene-polypropylene random copolymer resin, Examples 34 to 41 use a homopolypropylene resin, and Examples 42 to 51 use an ethylene-propylene block copolymer resin.

Example 1

To 100 parts by weight of an isotactic ethylene-polypropylene random copolymer resin having an ethylene content of 3.0 wt. % (MFR=20 g/10 min., melting temperature=153° C., hereunder referred to as "r-PP") were added 0.2 part by weight of PTC-2MeCHA prepared in Production Example 1 as the amide-based compound, 0.05 part by weight of calcium stearate as the fatty acid metal salt, 0.05 part by weight of tetrakis[methylene-3-(3,5-di-t-butyl-4-hydroxyphenyl)-propionate]methane (product of Ciba Specialty Chemicals Inc., product name "IRGANOX 1010"), and 0.05 part by weight of tetrakis(2,4-di-t-butylphenyl)phosphite (product of Ciba Specialty Chemicals Inc., product name: "IRGAFOS 168"). The mixture was subjected to dry blending using a Henschel mixer at 1000 rpm for 5 minutes.

The dry-blended mixture was melt-kneaded at a resin temperature of 240° C. using a single screw extruder with a diameter of 20 mm, the extruded strands were cooled with water, and the strands thus obtained were cut to obtain a polyolefin-based resin composition in the form of pellets.

The thus obtained pellets were subjected to injection molding at a resin temperature (molding temperature) of 240° C. and a mold temperature of 40° C., giving a polyolefin-based resin molded product (test piece, 5 cm×5 cm×1 mm).

Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Examples 2 and 3

The procedure of Example 1 was repeated except that the amounts of calcium stearate were changed to those described in Table 1. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Examples 4 to 8

The procedure of Example 1 was repeated except that the fatty acid metal salt was changed to those shown in Table 1. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 9

The procedure of Example 1 was repeated except that PTC-3MeCHA prepared in Production Example 2 was used in place of PTC-2MeCHA. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 10

The procedure of Example 1 was repeated except that PTC-4MeCHA prepared in Production Example 3 was used in place of PTC-2MeCHA. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 11

The procedure of Example 1 was repeated except that PTC-CHA prepared in Production Example 4 was used in place of PTC-2MeCHA. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 12

The procedure of Example 1 was repeated except that PTC-2MeCHA [100] prepared in Production Example 6 was used in place of PTC-2MeCHA, and the resin temperature during melt-kneading was changed to 260° C. and the resin temperature during injection molding was changed to 260° C. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 13

The procedure of Example 1 was repeated except that PTC-2MeCHA [50] prepared in Production Example 7 was used in place of PTC-2MeCHA. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Examples 14 to 16

The procedure of Example 1 was repeated except that the fatty acid metal salt was changed to those shown in Table 1. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 17

In a four-necked 200 ml flask equipped with a stirrer, a thermometer, a condenser and a gas inlet were placed 5 parts by weight of methanol, 0.2 part by weight of PTC-2MeCHA (amide-based compound) prepared in Production Example 1, 0.05 part by weight of calcium stearate (fatty acid metal salt), and the mixture was stirred at room temperature for 0.5 hour. The methanol was evaporated off under reduced pressure, and the residue was dried at room temperature and at 133 Pa for 6 hours. The obtained dry product was ground in a mortar and passed through a standard sieve (according to JIS Z-8801) having openings of 106 μm to give a crystallization rate-controlling composition of the invention.

To 100 parts by weight of r-PP were added 0.25 part by weight of the crystallization rate-controlling composition, 0.05 part by weight of tetrakis[methylene-3-(3,5-di-t-butyl-4-hydroxyphenyl)propionate]methane (product of Ciba Specialty Chemicals Inc., product name "IRGANOX 1010"), and 0.05 part by weight of tetrakis(2,4-di-t-butylphenyl) phosphite (product of Ciba Specialty Chemicals Inc., product name "IRGAFOS 168"). The mixture was subjected to dry blending using a Henschel mixer at 1000 rpm for 5 minutes.

The dry-blended mixture was melt-kneaded at a resin temperature of 240° C. using a single screw extruder with a diameter of 20 mm, the extruded strands were cooled with water, and the strands thus obtained were cut to obtain a polyolefin-based resin composition in the form of pellets.

The thus obtained pellets were subjected to injection molding at a resin temperature (molding temperature) of 240° C. and a mold temperature of 40° C., giving a polyolefin-based resin molded product (test piece, size: 5 cm×5 cm×1 mm).

Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 18

The procedure of Example 1 was repeated except that 0.15 part by weight of BTC-2MeCHA prepared in Production Example 5 was used in place of PTC-2MeCHA, and resin temperature during melt-kneading was changed to 280° C. and the resin temperature during injection molding was changed to 280° C. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 19

The procedure of Example 1 was repeated except that 0.1 part by weight of BTC-2MeCHA prepared in Production Example 5 was used in place of PTC-2MeCHA, and resin temperature during melt-kneading was changed to 260° C. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 20

The procedure of Example 19 was repeated except that potassium stearate was used in place of calcium stearate. Storage modulus transition temperatures of the thus-obtained polyolefin-based resin composition in the form of pellets, and crystallization temperature, end time of crystallization, haze value and dispersibility of the test piece obtained were measured. Table 1 shows the measurement results, and the resin temperature during the kneading step and the resin temperature during the (injection) molding step.

Example 21

The procedure of Example 1 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

Examples 22 and 23

The procedure of Example 1 was repeated except that no fatty acid metal salt was used and the amount of the amide-based compound was changed to those shown in Table 2. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

Examples 24 to 26

The procedure of Example 1 was repeated except that additives as shown in Table 2 were used in place of fatty acid metal salt. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

Example 27

The procedure of Example 9 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

Example 28

The procedure of Example 10 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

Example 29

The procedure of Example 11 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

Example 30

The procedure of Example 12 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

Example 31

The procedure of Example 13 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

Example 32

The procedure of Example 18 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

Example 33

The procedure of Example 19 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 2 shows the measurement results, and the resin temperature during the kneading step and the resin temperature during the (injection) molding step.

TABLE 1

(Molding Method (II): r-PP)

| | Amide-based compound (A) | | Fatty acid metal salt (B) | | Kneading step | Molding step | | | | Storage modulus transition temp. (° C.) | | Haze value (%) | Dispersibility |
|---|---|---|---|---|---|---|---|---|---|---|---|---|---|
| | Type | Amount (wt. part) | Type | Amount (wt. part) | Resin temp. (° C.) | Resin temp. (° C.) | Tc (° C.) | Te (° C.) | (min.) | Tsc | Tsh | | |
| Ex. 1 | PTC-2MeCHA | 0.2 | StCa | 0.05 | 240 | 240 | 105 | 2.94 | 177 | 211 | 14 | S |
| Ex. 2 | PTC-2MeCHA | 0.2 | StCa | 0.02 | 240 | 240 | 108 | 1.40 | 181 | 211 | 14 | S |
| Ex. 3 | PTC-2MeCHA | 0.2 | StCa | 0.01 | 240 | 240 | 117 | 1.00 | 184 | 211 | 14 | S |
| Ex. 4 | PTC-2MeCHA | 0.2 | StMg | 0.05 | 240 | 240 | 106 | 4.51 | 174 | 211 | 14 | S |
| Ex. 5 | PTC-2MeCHA | 0.2 | StZn | 0.05 | 240 | 240 | 107 | 2.62 | 176 | 211 | 14 | S |
| Ex. 6 | PTC-2MeCHA | 0.2 | StNa | 0.05 | 240 | 240 | 116 | 1.41 | 180 | 212 | 13 | A |
| Ex. 7 | PTC-2MeCHA | 0.2 | StK | 0.05 | 240 | 240 | 117 | 1.06 | 181 | 212 | 13 | A |
| Ex. 8 | PTC-2MeCHA | 0.2 | 12-OHStCa | 0.05 | 240 | 240 | 115 | 1.36 | 183 | 211 | 13 | S |
| Ex. 9 | PTC-3MeCHA | 0.2 | StCa | 0.05 | 240 | 240 | 106 | 3.77 | 170 | 204 | 25 | S |
| Ex. 10 | PTC-4MeCHA | 0.2 | StCa | 0.05 | 240 | 240 | 107 | 2.94 | 158 | 189 | 19 | S |
| Ex. 11 | PTC-CHA | 0.2 | StCa | 0.05 | 240 | 240 | 106 | 2.32 | 167 | 190 | 18 | S |
| Ex. 12 | PTC-2MeCHA [100] | 0.2 | StCa | 0.05 | 260 | 260 | 105 | 2.12 | 198 | 230 | 13 | S |
| Ex. 13 | PTC-2MeCHA [50] | 0.2 | StCa | 0.05 | 240 | 240 | 107 | 3.14 | 159 | 196 | 14 | S |
| Ex. 14 | PTC-2MeCHA | 0.2 | BeCa | 0.05 | 240 | 240 | 105 | 3.84 | 175 | 211 | 13 | S |
| Ex. 15 | PTC-2MeCHA | 0.2 | BeMg | 0.05 | 240 | 240 | 104 | 4.80 | 175 | 211 | 13 | S |
| Ex. 16 | PTC-2MeCHA | 0.2 | LaMg | 0.05 | 240 | 240 | 105 | 4.58 | 174 | 211 | 14 | S |
| Ex. 17 | PTC-2MeCHA | 0.2 | StCa | 0.05 | 240 | 240 | 105 | 3.04 | 177 | 211 | 14 | S |
| Ex. 18 | BTC-2MeCHA | 0.15 | StCa | 0.05 | 280 | 280 | 109 | 3.60 | 210 | 257 | 19 | S |
| Ex. 19 | BTC-2MeCHA | 0.1 | StCa | 0.05 | 260 | 240 | 114 | 1.82 | 201 | 236 | 25 | S |
| Ex. 20 | BTC-2MeCHA | 0.1 | StK | 0.05 | 260 | 240 | 115 | 1.74 | 203 | 236 | 25 | A |

StCa: Calcium stearate
StMg: Magnesium stearate
StZn: Zinc stearate
StNa: Sodium stearate
Stk: Potassium stearate
12-OHStCa: Calcium 12-hydroxstearate
BeCa: Calcium behenate
BeMg: Magnesium behenate
LaMg: Magnesium laurate

TABLE 2

(Molding Method (II): r-PP)

| | Amide-based compound (A) | | Additive | | Kneading step | Molding step | | | Storage modulus transition temp. (° C.) | | Haze value | Dispersi- |
|---|---|---|---|---|---|---|---|---|---|---|---|---|
| | Type | Amount (wt. part) | Type | Amount (wt. part) | Resin temp. (° C.) | Resin temp. (° C.) | Tc (° C.) | Te (min.) | Tsc | Tsh | (%) | bility |
| Ex. 21 | PTC-2MeCHA | 0.2 | — | — | 240 | 240 | 117 | 0.96 | 185 | 211 | 14 | B |
| Ex. 22 | PTC-2MeCHA | 0.15 | — | — | 240 | 240 | 117 | 0.97 | 180 | 207 | 15 | B |
| Ex. 23 | PTC-2MeCHA | 0.1 | — | — | 240 | 240 | 177 | 1.01 | 168 | 200 | 18 | B |
| Ex. 24 | PTC-2MeCHA | 0.2 | PEWAX | 0.05 | 240 | 240 | 118 | 0.92 | 186 | 211 | 13 | A |
| Ex. 25 | PTC-2MeCHA | 0.2 | StOH | 0.05 | 240 | 240 | 117 | 0.93 | 186 | 212 | 13 | A |
| Ex. 26 | PTC-2MeCHA | 0.2 | GMS | 0.05 | 240 | 240 | 118 | 0.95 | 185 | 211 | 12 | S |
| Ex. 27 | PTC-3MeCHA | 0.2 | — | — | 240 | 240 | 112 | 2.23 | 177 | 204 | 25 | B |
| Ex. 28 | PTC-4MeCHA | 0.2 | — | — | 240 | 240 | 113 | 1.99 | 165 | 196 | 19 | B |
| Ex. 29 | PTC-CHA | 0.2 | — | — | 240 | 240 | 119 | 0.83 | 176 | 189 | 18 | B |
| Ex. 30 | PTC-2MeCHA [100] | 0.2 | — | — | 260 | 260 | 117 | 1.26 | 213 | 235 | 14 | A |
| Ex. 31 | PTC-2MeCHA [50] | 0.2 | — | — | 240 | 240 | 117 | 1.08 | 165 | 201 | 14 | B |
| Ex. 32 | BTC-2MeCHA | 0.15 | — | — | 280 | 280 | 117 | 0.99 | 216 | 257 | 20 | S |
| Ex. 33 | BTC-2MeCHA | 0.1 | — | — | 260 | 240 | 116 | 1.59 | 205 | 236 | 27 | B |

PEWAX: Polyethylene wax
StOH: Stearyl alcohol
GMS: Glycerol monostearate

The following observations are clear from the results shown in Tables 1 and 2.

(1) End Time of Crystallization

When the resin temperature during molding (molding temperature) is higher than the transition temperature of storage modulus during heating (i.e., T>Tsh), it is possible to reduce the crystallization rate (i.e., to prolong the end time of crystallization) of a polyolefin-based resin by controlling the component (A):component (B) ratio, particularly by increasing the proportion of component (B) (see Examples 1-3, Example 17, Examples 21-23).

Fatty acid metal salts according to the invention, other than calcium stearate, can similarly reduce the crystallization rate (i.e., prolong the end time of crystallization) of a polyolefin-based resin (see Examples 4-8, Examples 14-16).

Amide-based compounds according to the invention, other than PTC-2MeCHA, can similarly reduce the crystallization rate (i.e., prolong the end time of crystallization) of a polyolefin-based resin (see Examples 9-13, Examples 18-20 and Examples 27-33).

However, when polyethylene wax, stearyl alcohol, or glycerol stearate is used in combination with an amide-based compound, contribution of such additives toward controlling the crystallization rate (controlling the end time of crystallization) of the polyolefin-based resin is much less significant, compared with the use of the fatty acid metal salt according to the invention (see Examples 24-26).

(2) Crystallization Temperature

When the resin temperature during molding (molding temperature) is higher than the transition temperature of storage modulus during heating (i.e., T>Tsh), the crystallization rate-controlling composition of the present invention, can also lower the crystallization temperature of the polyolefin-based resin, in addition to the above advantages, by selecting the combination of components (A) and (B) and the component (A):component (B) ratio (see Examples 1-5, Examples 9-10 and Examples 14-17).

(3) Haze Value and Dispersibility

By using a crystallization rate-controlling composition of the invention comprising an amide-based compound together with a fatty acid metal salt (in particular, a fatty acid bivalent metal salt), the solubility and dispersibility in a polyolefin-based resin are improved. Therefore, molded products obtained by molding the resulting polyolefin-based resin compositions have a low amount of undispersed nucleating agent (see Examples 1-5, Examples 8-17 and Example 19).

Also the molded products obtained by molding such polyolefin-based resin compositions of the invention have much more improved transparency, compared with the transparency achieved in Comparative Examples 1 and 2 that will be described later, and especially the use of a crystallization rate-controlling composition comprising an amide-based compound prepared from 1,2,3-propanetricarboxylic acid and 2-methylcyclohexylamine imparts excellent transparency. (see Examples 1-8, Examples 12-17, Comparative Examples 1 and 2).

Example 34

The procedure of Example 1 was repeated except that an isotactic homopolypropylene resin (MFR=10 g/10 min., melting temperature=163° C.; hereinafter referred to as "h-PP") was used in place of r-PP. Storage modulus transition temperatures of the thus-obtained polyolefin-based resin composition in the form of pellets, and crystallization temperature, end time of crystallization, haze value and dispersibility of the test piece obtained were measured. Table 3 shows the measurement results, and the resin temperature during the kneading step and the resin temperature during the (injection) molding step.

Examples 35 and 36

The procedure of Example 34 was repeated except that the fatty acid metal salt was changed to those shown in Table 3. Storage modulus transition temperatures of the thus-obtained polyolefin-based resin composition in the form of pellets, and crystallization temperature, end time of crystallization, haze value and dispersibility of the test piece obtained were measured. Table 3 shows the measurement results, and the resin temperature during the kneading step and the resin temperature during the (injection) molding step.

Example 37

The procedure of Example 34 was repeated except that PTC-CHA prepared in Production Example 4 was used in place of PTC-2MeCHA. Storage modulus transition temperatures of the thus-obtained polyolefin-based resin composition in the form of pellets, and crystallization temperature, end time of crystallization, haze value and dispersibility of the test piece obtained were measured. Table 3 shows the measurement results, and the resin temperature during the kneading step and the resin temperature during the (injection) molding step.

Example 38

The procedure of Example 34 was repeated except that PTC-2MeCHA [100] prepared in Production Example 6 was used in place of PTC-2MeCHA and the resin temperature during melt-kneading was changed to 260° C. and the resin temperature during injection molding was changed to 260° C.

Example 39

The procedure of Example 34 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 3 shows the measurement results, and the resin temperature during the kneading step and the resin temperature during the (injection) molding step.

Example 40

The procedure of Example 37 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 3 shows the measurement results, and the resin temperature during the kneading step and the resin temperature during the (injection) molding step.

Example 41

The procedure of Example 38 was repeated except that no fatty acid metal salt was used. Storage modulus transition temperatures of the thus-obtained polyolefin-based resin composition in the form of pellets, and crystallization temperature, end time of crystallization, haze value and dispersibility of the test piece obtained were measured. Table 3 shows the measurement results, and the resin temperature during the kneading step and the resin temperature during the (injection) molding step.

TABLE 3

(Molding Method (II): h-PP)

| | Amide-based compound (A) | | Fatty acid metal salt (B) | | Kneading step | Molding step | | | Storage modulus transition temp. (° C.) | | Haze value (%) | Dis-persibility |
|---|---|---|---|---|---|---|---|---|---|---|---|---|
| | Type | Amount (wt. part) | Type | Amount (wt. part) | Resin temp. (° C.) | Resin temp. (° C.) | Tc (° C.) | Te (min.) | Tsc | Tsh | | |
| Ex. 34 | PTC-2MeCHA | 0.2 | StCa | 0.05 | 240 | 240 | 117 | 2.93 | 174 | 211 | 19 | S |
| Ex. 35 | PTC-2MeCHA | 0.2 | StMg | 0.05 | 240 | 240 | 117 | 2.77 | 172 | 211 | 20 | S |
| Ex. 36 | PTC-2MeCHA | 0.2 | StZn | 0.05 | 240 | 240 | 116 | 3.73 | 172 | 211 | 22 | S |
| Ex. 37 | PTC-CHA | 0.2 | StCa | 0.05 | 240 | 240 | 118 | 2.08 | 163 | 188 | 24 | S |
| Ex. 38 | PTC-2MeCHA [100] | 0.2 | StCa | 0.05 | 260 | 260 | 122 | 3.74 | 194 | 229 | 20 | S |
| Ex. 39 | PTC-2MeCHA | 0.2 | — | — | 240 | 240 | 125 | 1.36 | 186 | 214 | 20 | B |
| Ex. 40 | PTC-CHA | 0.2 | — | — | 240 | 240 | 126 | 1.05 | 168 | 188 | 26 | B |
| Ex. 41 | PTC-2MeCHA [100] | 0.2 | — | — | 260 | 260 | 125 | 1.24 | 207 | 229 | 21 | B |

StCa: Calcium stearate
StMg: Magnesium stearate
StZn: Zinc stearate

The following observations are clear from the results shown in Tables 3.

(1) End Time of Crystallization

With respect to h-PP as well as r-PP mentioned above, when the resin temperature during molding (molding temperature) is higher than the transition temperature of storage modulus during heating, it is possible to reduce the crystallization rate (i.e., to prolong the end time of crystallization) of a polyolefin-based resin by controlling the component (A): component (B) ratio, particularly by increasing the proportion of component (B) (see Examples 34-38 and Examples 39-41).

(2) Crystallization Temperature

With respect to h-PP as well as r-PP mentioned above, when the resin temperature during molding (molding temperature) is higher than the transition temperature of storage modulus during heating, the crystallization rate-controlling composition of the present invention can also lower the crystallization temperature of the polyolefin-based resin by selecting the combination of components (A) and (B) and the component (A):component (B) ratio (see Examples 34-38).

(3) Haze Value and Dispersibility

With respect to h-PP as well as r-PP mentioned above, by using a crystallization rate-controlling composition of the invention comprising an amide-based compound together with a fatty acid metal salt, the solubility and dispersibility in a polyolefin-based resin are improved. Therefore, molded products obtained by molding the resulting polyolefin-based resin compositions have a low amount of undispersed nucleating agent (see Examples 34-38).

Also the molded products obtained by molding such polyolefin-based resin compositions have much more improved transparency, compared with the transparency achieved in Comparative Examples 3 and 4 that will be described later (see Examples 34-38, Examples 39-41 and Comparative Examples 3 and 4).

Example 42

The procedure of Example 1 was repeated except that an ethylene-propylene block copolymer resin having an ethylene content of 9.5 wt. % (MM=26 g/10 min., melting temperature=164° C.; hereinafter refereed to as "b-PP") was used in place of r-PP, and that test pieces having a size of 90 mm×10 mm×4 mm were similarly prepared in addition to test pieces having a size of 5 cm×5 cm×1 mm. Storage modulus transition temperatures of the thus-obtained polyolefin-based resin composition in the form of pellets, and crystallization temperature, end time of crystallization, and flexural modulus of the test piece obtained were measured. The test pieces having a size of 5 cm×5 cm×1 mm were used for measuring crystallization temperature and end time of crystallization, while test pieces having a size of 90 mm×10 mm×4 mm were used for measuring flexural modulus. Table 4 shows the measurement results, and the resin temperature during the kneading step and the resin temperature during the (injection) molding step.

Examples 43 and 44

The procedure of Example 42 was repeated except that the fatty acid metal salt was changed to that shown in Table 4. Storage modulus transition temperatures of the thus-obtained polyolefin-based resin composition in the form of pellets, and crystallization temperature, end time of crystallization, and flexural modulus of the test piece obtained were measured. Table 4 shows the measurement results, and the resin temperature during the kneading step and the resin temperature during the (injection) molding step.

Example 45

The procedure of Example 42 was repeated except that PTC-CHA prepared in Production Example 4 was used in place of PTC-2MeCHA. Storage modulus transition temperatures of the thus-obtained polyolefin-based resin composition in the form of pellets, and crystallization temperature, end time of crystallization, and flexural modulus of the test piece obtained were measured. Table 4 shows the measurement results, and the resin temperature during the kneading step and the resin temperature during the (injection) molding step.

Example 46

The procedure of Example 42 was repeated except that PTC-2MeCHA [100] prepared in Production Example 6 was used in place of PTC-2MeCHA, and the resin temperature during melt-kneading was changed to 260° C. and the resin temperature during injection molding was changed to 260° C. Storage modulus transition temperatures of the thus-obtained polyolefin-based resin composition in the form of pellets, and crystallization temperature, end time of crystallization, and flexural modulus of the test piece obtained were measured. Table 4 shows the measurement results, and the resin temperature during the kneading step and the resin temperature during the (injection) molding step.

Example 47

The procedure of Example 42 was repeated except that PTC-2MeCHA [50] prepared in Production Example 7 was used in place of PTC-2MeCHA. Storage modulus transition temperatures of the thus-obtained polyolefin-based resin composition in the form of pellets, and crystallization temperature, end time of crystallization, and flexural modulus of the test piece obtained were measured. Table 4 shows the measurement results, and the resin temperature during the kneading step and the resin temperature during the (injection) molding step.

Example 48

The procedure of Example 42 was repeated except that no fatty acid metal salt was used. Storage modulus transition temperatures of the thus-obtained polyolefin-based resin composition in the form of pellets, and crystallization temperature, end time of crystallization, and flexural modulus of the test piece obtained were measured. Table 4 shows the measurement results, and the resin temperature during the kneading step and the resin temperature during the (injection) molding step.

Example 49

The procedure of Example 45 was repeated except that no fatty acid metal salt was used. Storage modulus transition temperatures of the thus-obtained polyolefin-based resin composition in the form of pellets, and crystallization temperature, end time of crystallization, and flexural modulus of the test piece obtained were measured. Table 4 shows the measurement results, and the resin temperature during the kneading step and the resin temperature during the (injection) molding step.

Example 50

The procedure of Example 46 was repeated except that no fatty acid metal salt was used. Storage modulus transition temperatures of the thus-obtained polyolefin-based resin composition in the form of pellets, and crystallization temperature, end time of crystallization, and flexural modulus of the test piece obtained were measured. Table 4 shows the measurement results, and the resin temperature during the kneading step and the resin temperature during the (injection) molding step.

Example 51

The procedure of Example 47 was repeated except that no fatty acid metal salt was used. Storage modulus transition temperatures of the thus-obtained polyolefin-based resin composition in the form of pellets, and crystallization temperature, end time of crystallization, and flexural modulus of the test piece obtained were measured. Table 4 shows the measurement results, and the resin temperature during the kneading step and the resin temperature during the (injection) molding step.

Examples 52 to 69 that follow show embodiments of molding method (I) (Tm≦T≦Tsh).

Example 52

The procedure of Example 1 was repeated except that the resin temperature during the (injection) molding step was

TABLE 4

(Molding Method (II): b-PP)

| | Amide-based compound (A) | | Fatty acid metal Salt (B) | | Kneading step | Molding step | | | Storage modulus transition temperature (° C.) | | Flexural modulus |
|---|---|---|---|---|---|---|---|---|---|---|---|
| | Type | Amount (wt. part) | Type | Amount (wt. part) | Resin temp. (° C.) | Resin temp. (° C.) | Tc (° C.) | Te (Min.) | Tsc | Tsh | (MPa) |
| Ex. 42 | PTC-2MeCHA | 0.2 | StCa | 0.05 | 240 | 240 | 117 | 2.51 | 178 | 212 | 1350 |
| Ex. 43 | PTC-2MeCHA | 0.2 | StMg | 0.05 | 240 | 240 | 116 | 3.35 | 175 | 212 | 1350 |
| Ex. 44 | PTC-2MeCHA | 0.2 | StZn | 0.05 | 240 | 240 | 117 | 3.06 | 176 | 212 | 1330 |
| Ex. 45 | PTC-CHA | 0.2 | StCa | 0.05 | 240 | 240 | 117 | 1.50 | 168 | 206 | 1310 |
| Ex. 46 | PTC-2MeCHA [100] | 0.2 | StCa | 0.05 | 260 | 260 | 120 | 2.91 | 201 | 225 | 1270 |
| Ex. 47 | PTC-2MeCHA [50] | 0.2 | StCa | 0.05 | 240 | 240 | 118 | 2.51 | 156 | 200 | 1290 |
| Ex. 48 | PTC-2MeCHA | 0.2 | — | — | 240 | 240 | 127 | 0.83 | 186 | 212 | 1360 |
| Ex. 49 | PTC-CHA | 0.2 | — | — | 240 | 240 | 128 | 0.77 | 174 | 206 | 1320 |
| Ex. 50 | PTC-2MeCHA [100] | 0.2 | — | — | 260 | 260 | 127 | 0.87 | 204 | 227 | 1290 |
| Ex. 51 | PTC-2MeCHA [50] | 0.2 | — | — | 240 | 240 | 127 | 0.92 | 166 | 200 | 1300 |

StCa: Calcium stearate
StMg: Magnesium stearate
StZn: Zinc stearate

The following observations are clear from the results shown in Table 4.

(1) End Time of Crystallization

With respect to b-PP as well as r-PP mentioned above, when the resin temperature during molding (molding temperature) is higher than the transition temperature of storage modulus during heating, it is possible to reduce the crystallization rate (i.e., to prolong the end time of crystallization) of a polyolefin-based resin by controlling the component (A): component (B) ratio, particularly by increasing the proportion of component (B) (see Examples 42-47 and Examples 48-51).

(2) Crystallization Temperature

With respect to b-PP as well as r-PP mentioned above, when the resin temperature during molding (molding temperature) is higher than the transition temperature of storage modulus during heating, the crystallization rate-controlling composition of the present invention can also lower the crystallization temperature of the polyolefin-based resin by selecting the combination of components (A) and (B) and the component (A):component (B) ratio (see Examples 42-47).

(3) Flexural Modulus

When the resin temperature during molding (molding temperature) is higher than the transition temperature of storage modulus during heating, molded products obtained by molding the polyolefin-based resin composition of the invention have improved flexural modulus, compared with that achieved in Comparative Examples 5 and 6 that will be described later (see Examples 42-51 and Comparative Examples 5 and 6).

changed to 200° C. and that test pieces having a size of 90 mm×10 mm×4 mm were similarly prepared in addition to test pieces having a size of 5 cm×5 cm×1 mm. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step. The test pieces having a size of 5 cm×5 cm×1 mm were used for measuring crystallization temperature and end time of crystallization, while test pieces having a size of 90 mm×10 mm×4 mm were used for measuring flexural modulus (The same applies to Examples 53-69 and Comparative Examples 1-6 that follow).

Examples 53 and 54

The procedure of Example 52 was repeated except that the amount of calcium stearate was changed to the amount shown in Table 5. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 55

The procedure of Example 4 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 56

The procedure of Example 5 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 57

The procedure of Example 34 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 58

The procedure of Example 35 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 59

The procedure of Example 36 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 60

The procedure of Example 42 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 61

The procedure of Example 43 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 62

The procedure of Example 44 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 63

The procedure of Example 18 was repeated except that the resin temperature during the (injection) molding step was changed to 240° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 64

The procedure of Example 21 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 65

The procedure of Example 22 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 66

The procedure of Example 23 was repeated except that the resin temperature during the (injection) molding step was changed to 180° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 67

The procedure of Example 39 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 68

The procedure of Example 48 was repeated except that the resin temperature during the (injection) molding step was changed to 200° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

Example 69

The procedure of Example 32 was repeated except that the resin temperature during the (injection) molding step was changed to 240° C. Storage modulus transition temperatures of the thus-obtained polyolefin-based resin composition in the form of pellets, and crystallization temperature, end time of crystallization, and flexural modulus of the test piece obtained were measured. Table 5 shows the measurement results, and the resin temperature during the kneading step and the resin temperature during the (injection) molding step.

The following observations are clear from the results shown in Tables 5.

(1) End Time of Crystallization

When the resin temperature during molding (molding temperature) is not lower than the melting temperature of the polyolefin-based resin and not higher than the transition temperature of storage modulus during heating, it is possible to increase the crystallization rate (i.e., to shorten the end time of crystallization) of a polyolefin-based resin by controlling the component (A):component (B) ratio, particularly by increasing the proportion of component (B) (see Examples 52-54, Examples 64-66).

Fatty acid metal salts according to the invention, other than calcium stearate, can similarly increase the crystallization rate (i.e., shorten the end time of crystallization) of a polyolefin-based resin (see Examples 55 and 56).

In polyolefin-based resins, other than r-PP, the crystallization rate can be increased (i.e., the end time of crystallization can be shortened) (see Examples 57-62, Examples 67 and 68).

(2) Crystallization Temperature

In addition to the above effects, when the resin temperature during molding (molding temperature) is not lower than the melting temperature of the polyolefin-based resin and not higher than the transition temperature of storage modulus during heating, the polyolefin-based resin compositions containing the crystallization rate-controlling composition of the present invention have a crystallization temperature which is not substantially lowered, compared with that achieved by the polyolefin-based resin composition containing the crystallization rate-controlling composition wherein the component (A):component (B) weight ratio is 100:0 in molding method (II). This means that the high crystallization rate is main-

TABLE 5

(Molding Method (I): r-PP, h-PP, b-PP)

| | Amide-based compound (A) | | Fatty acid metal salt (B) | | | Kneading step | Molding step | | | Storage modulus transition temperature (° C.) | | Flexural modulus | |
|---|---|---|---|---|---|---|---|---|---|---|---|---|---|
| | Type | Amount (wt. part) | Type | Amount (wt. part) | Resin | Resin temp. (° C.) | Resin temp. (° C.) | Tc (° C.) | Te (Min.) | Tsc | Tsh | (MPa) | Degree of Orientation |
| Ex. 52 | PTC-2MeCHA | 0.2 | StCa | 0.05 | r-PP | 240 | 200 | 117 | 0.76 | 177 | 211 | 1510 | 2.4 |
| Ex. 53 | PTC-2MeCHA | 0.2 | StCa | 0.02 | r-PP | 240 | 200 | 117 | 0.79 | 181 | 211 | 1500 | 2.3 |
| Ex. 54 | PTC-2MeCHA | 0.2 | StCa | 0.01 | r-PP | 240 | 200 | 117 | 0.81 | 184 | 211 | 1480 | 2.3 |
| Ex. 55 | PTC-2MeCHA | 0.2 | StMg | 0.05 | r-PP | 240 | 200 | 117 | 0.80 | 174 | 211 | 1470 | 2.6 |
| Ex. 56 | PTC-2MeCHA | 0.2 | StZn | 0.05 | r-PP | 240 | 200 | 117 | 0.83 | 176 | 211 | 1460 | 2.6 |
| Ex. 57 | PTC-2MeCHA | 0.2 | StCa | 0.05 | h-PP | 240 | 200 | 127 | 0.92 | 174 | 211 | 1890 | 2.4 |
| Ex. 58 | PTC-2MeCHA | 0.2 | StMg | 0.05 | h-PP | 240 | 200 | 127 | 0.95 | 172 | 211 | 1890 | 2.4 |
| Ex. 59 | PTC-2MeCHA | 0.2 | StZn | 0.05 | h-PP | 240 | 200 | 127 | 0.96 | 172 | 211 | 1890 | 2.4 |
| Ex. 60 | PTC-2MeCHA | 0.2 | StCa | 0.05 | b-PP | 240 | 200 | 128 | 0.81 | 178 | 212 | 1600 | 2.1 |
| Ex. 61 | PTC-2MeCHA | 0.2 | StMg | 0.05 | b-PP | 240 | 200 | 128 | 0.75 | 175 | 212 | 1580 | 2.2 |
| Ex. 62 | PTC-2MeCHA | 0.2 | StZn | 0.05 | b-PP | 240 | 200 | 128 | 0.80 | 176 | 212 | 1560 | 2.2 |
| Ex. 63 | BTC-2MeCHA | 0.15 | StCa | 0.05 | r-PP | 280 | 240 | 117 | 0.96 | 210 | 257 | 1140 | 2.3 |
| Ex. 64 | PTC-2MeCHA | 0.2 | — | — | r-PP | 240 | 200 | 117 | 0.90 | 185 | 211 | 1450 | 2.5 |
| Ex. 65 | PTC-2MeCHA | 0.15 | — | — | r-PP | 240 | 200 | 117 | 0.96 | 180 | 207 | 1460 | 2.5 |
| Ex. 66 | PTC-2MeCHA | 0.1 | — | — | r-PP | 240 | 180 | 117 | 1.01 | 168 | 200 | 1460 | 2.3 |
| Ex. 67 | PTC-2MeCHA | 0.2 | — | — | h-PP | 240 | 200 | 125 | 1.00 | 186 | 214 | 1860 | 2.2 |
| Ex. 68 | PTC-2MeCHA | 0.2 | — | — | b-PP | 240 | 200 | 127 | 0.81 | 186 | 212 | 1570 | 2.3 |
| Ex. 69 | BTC-2MeCHA | 0.15 | — | — | r-PP | 280 | 240 | 117 | 0.98 | 216 | 257 | 1420 | 2.3 |

StCa: Calcium stearate
StMg: Magnesium stearate
StZn: Zinc stearate tained (see, for example, Examples 52-56, Examples 64-66 and Examples 21-23 with respect to r-PP).

(3) Flexural Modulus

When the resin temperature during molding (molding temperature) is not lower than the melting temperature of the polyolefin-based resin and not higher than the transition temperature of storage modulus during heating, the molded products prepared by molding the polyolefin-based resin compositions of the invention have excellent rigidity. This improvement in rigidity is remarkable, when compared with the molded products obtained according to molding method (II) mentioned above (see Examples 52-69, Examples 42-51 and Comparative Examples 1-6).

Amide-based compounds according to the invention, other than PTC-2MeCHA, can similarly improve the rigidity of the molded products (see Example 63 and Example 69).

(4) Degree of Orientation

When the resin temperature during molding (molding temperature) is not lower than the melting temperature of the polyolefin-based resin and not higher than the transition temperature of storage modulus during heating, the molded products prepared by molding the polyolefin-based resin compositions of the invention had a degree of orientation of at least 2. In contrast, the molded products obtained according to molding method (II) mentioned above had a degree of orientation of lower than 2 (see Examples 52-69, Examples 42-51 and Comparative Examples 1-6).

Comparative Example 1

The procedure of Example 1 was repeated except that amide-based compound and fatty acid metal salt were not used. Crystallization temperature, end time of crystallization, haze value, flexural modulus and degree of orientation were measured. Table 6 shows the measurement results and the resin temperature during the kneading step and the resin temperature during the (injection) molding step.

Comparative Example 2

The procedure of Comparative Example 1 was repeated except that 0.05 pars by weight of calcium stearate was added during dry-blending. Crystallization temperature, end time of crystallization, haze value, flexural modulus and degree of orientation were measured. Table 6 shows the measurement results and the resin temperature during the kneading step and the resin temperature during the (injection) molding step.

Comparative Example 3

The procedure of Example 34 was repeated except that amide-based compound and fatty acid metal salt were not used. Crystallization temperature, end time of crystallization, haze value, flexural modulus and degree of orientation were measured. Table 6 shows the measurement results and the resin temperature during the kneading step and the resin temperature during the (injection) molding step.

Comparative Example 4

The procedure of Comparative Example 3 was repeated except that 0.05 pars by weight of calcium stearate was used during dry-blending. Crystallization temperature, end time of crystallization, haze value, flexural modulus and degree of orientation were measured. Table 6 shows the measurement results and the resin temperature during the kneading step and the resin temperature during the (injection) molding step.

Comparative Example 5

The procedure of Example 42 was repeated except that amide-based compound and fatty acid metal salt were not used. Crystallization temperature, end time of crystallization, haze value, flexural modulus and degree of orientation were measured. Table 6 shows the measurement results and the resin temperature during the kneading step and the resin temperature during the (injection) molding step.

Comparative Example 6

The procedure of Comparative Example 5 was repeated except that 0.05 pars by weight of calcium stearate was used during dry-blending. Crystallization temperature, end time of crystallization, haze value, flexural modulus and degree of orientation were measured. Table 6 shows the measurement results and the resin temperature during the kneading step and the resin temperature during the (injection) molding step.

TABLE 6

| | Amide-based compound (A) | | Fatty acid metal salt (B) | | (r-PP, h-PP, b-PP) | | | | | | |
|---|---|---|---|---|---|---|---|---|---|---|---|
| | | | | | | Kneading step | Molding step | | | Haze | Flexural | |
| | Type | Amount (wt. part) | Type | Amount (wt. part) | Resin | Resin temp. (° C.) | Resin temp. (° C.) | Tc (° C.) | Te (Min.) | value (%) | modulus (MPa) | Degree of orientation |
| Comp. Ex. 1 | — | — | — | — | r-PP | 240 | 240 | 99 | >10 | 74 | 920 | 1.2 |
| Comp. Ex. 2 | — | — | StCa | 0.05 | r-PP | 240 | 240 | 99 | >10 | 74 | 920 | 1.2 |
| Comp. Ex. 3 | — | — | — | — | h-PP | 240 | 240 | 109 | >10 | 66 | 1180 | 1.2 |
| Comp. Ex. 4 | — | — | StCa | 0.05 | h-PP | 240 | 240 | 109 | >10 | 66 | 1180 | 1.2 |
| Comp. Ex. 5 | — | — | — | — | b-PP | 240 | 240 | 109 | >10 | 99 | 1060 | 1.2 |
| Comp. Ex. 6 | — | — | StCa | 0.05 | b-PP | 240 | 240 | 109 | >10 | 99 | 1060 | 1.2 |

StCa: Calcium stearate

Molding method (I) and molding method (II) of the invention will be described below in detail with reference to further Examples and Comparative Examples. However, the invention is not limited by and to these examples. Examples of typical methods for producing amide-based compounds are exemplified in Production Examples I-1 to I-4. In the following description, examples indicated with a symbol "I-" such as "Example I-1" relate to embodiments of molding method (I), and examples indicated with a symbol "II-" such as "Example II-1" relate to embodiments of molding method (II).

The storage modulus transition temperature of the polyolefin-based resin composition obtained, and flexural modulus, X-ray diffraction and degree of orientation of the molded products obtained from the polyolefin-based resin compositions of the invention were measured in the same manner as mentioned above. Additionally, impact resistance (Dupont impact strength) was measured and evaluated by the following method.

(9) Impact Resistance (Dupont Impact Strength)

The 50% breaking energy was determined with respect to a sheet having a thickness of 2 mm at 23° C. by the falling weight method according to JIS K 7211. The greater the value, the higher the impact resistance.

Production Example I-1

In a four-necked 500 ml flask equipped with a stirrer, a thermometer, a condenser and a gas inlet were placed 9.7 g (0.055 mol) of 1,2,3-propanetricarboxylic acid (PTC) and 100 g of N-methyl-2-pyrrolidone, and the mixture was stirred under nitrogen atmosphere at room temperature to completely dissolve PTC. Subsequently, 20.5 g (0.18 mol) of 2-methylcyclohexylamine (trans isomer:cis isomer=100:0, GLC composition ratio), 56.3 g (0.18 mol) of triphenylphosphite, 14.4 g (0.18 mol) of pyridine and 50 g of N-methyl-2-pyrrolidone were added thereto, and the reaction was carried out with stirring under nitrogen atmosphere for 4 hours at 100° C. After cooling, the reaction mixture was slowly poured into a mixture of 500 ml of isopropyl alcohol and 500 ml of water, and the resulting mixture was stirred at about 40° C. for one hour, and the white precipitate thus formed was then filtered off. The obtained white solid was washed twice with 500 ml of isopropyl alcohol at about 40° C., and dried at 100° C. and 133 Pa for 6 hours.

The obtained dry product was ground in a mortar and passed through a standard sieve (JIS Z 8801) having openings of 106 μm to give 20.3 g (80% yield) of 1,2,3-propanetricarboxylic acid tris(2-methylcyclohexylamide) (hereinafter referred to as "PTC-2MeCHA(100)").

Production Example I-2

The procedure of Production Example I-1 was repeated except that 2-methylcyclohexylamine (trans isomer:cis isomer=74:26 (GLC composition ratio)) was used in place of 2-methylcyclohexylamine (trans isomer:cis isomer=100:0 (GLC composition ratio)), giving 18.8 g (yield 74%) of 1,2,3-propanetricarboxylic acid tris(2-methylcyclohexylamide) (hereunder referred to as "PTC-2MeCHA(74)").

The unreacted 2-methylcyclohexylamine recovered from the above amidation reaction was subjected to GLC analysis. It was found that the trans:cis ratio of the unreacted amine was 74:26, which was in agreement with the trans:cis ratio (74:26, GLC composition ratio) of the 2-methylcyclohexylamine used as the starting material.

The product amide obtained above, when heat-treated at 100° C., had a ET-IR spectrum and a melting point that were in agreement with those measured before the treatment, verifying that the stereoconfiguration of the 2-methylcyclohexylamine residue constituting the amide-based compound was not altered by the amidation reaction.

In view of the above results, it was confirmed that the ratio of trans-configured 2-methylcyclohexylamine residue:cis-configured 2-methylcyclohexylamine residue of the product amide-based compound of this Production Example I-2 was identical to the trans:cis ratio of the starting material amine.

Production Example I-3

The procedure of Production Example I-1 was repeated except that 2-methylcyclohexylamine (trans isomer:cis isomer=50:50 (GLC composition ratio)) was used in place of 2-methylcyclohexylamine (trans isomer:cis isomer=100:0 (GLC composition ratio)), giving 18.0 g (yield 71%) of 1,2,3-propanetricarboxylic acid tris(2-methylcyclohexylamide) (hereinafter referred to as "PTC-2MeCHA(50)").

When the product amide compound was checked for the stereoconfiguration in the same manner as in Production Example I-2, it was confirmed that the ratio of trans-configured moiety:cis-configured moiety of the product amide-based compound was identical to the trans:cis ratio of the starting material amine.

Production Example I-4

The procedure of Production Example I-1 was repeated except that cyclohexylamine was used in place of 2-methylcyclohexylamine, giving 17.3 g (yield 75%) of 1,2,3-propanetricarboxylic acid tricyclohexylamide (hereunder referred to as "PTC-CHA").

Example I-1

Per 100 parts by weight of r-PP, 0.2 part by weight of PTC-2MeCHA (100), 0.05 part by weight of tetrakis[methylene-3-(3,5-di-t-butyl-4-hydroxyphenyl)propionate]methane (product of Ciba Specialty Chemicals Inc., product name "IRGANOX 1010"), and 0.05 part by weight of tetrakis(2,4-di-t-butylphenyl)phosphite (product of Ciba Specialty Chemicals Inc., product name "IRGAFOS 168") were weighed. These compounds were dry blended with 100 parts by weight of r-PP using a Henschel mixer at 1000 rpm for 5 minutes.

Using a single screw extruder (L/D=440 mm/20 mm), the obtained dry blend was melt-kneaded at a kneading temperature of 260° C. (resin temperature), the extruded strands were cooled with water, and the strands thus obtained were cut to obtain a polyolefin-based resin composition in the form of pellets.

The thus obtained pellets were injection-molded at a molding temperature (resin temperature) of 220° C. and at a mold temperature of 40° C. to prepare test pieces (90 mm in length, 10 mm in width and 4 mm in height).

Table 7 shows the Tsc (° C.) and Tsh (° C.) of the thus-obtained resin composition, and the flexural modulus (MPa) and degree of orientation of the thus-obtained test pieces.

Example I-2

Test pieces were produced in the same manner as in Example I-1 except that PTC-2MeCHA(74) was used in place of PTC-2MeCHA(100), and the kneading temperature was changed to 240° C. and the molding temperature was changed to 200° C. Table 7 shows the Tsc (° C.) and Tsh (° C.) of the thus-obtained resin composition, and the flexural modulus (MPa) and degree of orientation of the thus-obtained test pieces.

Figure 5:
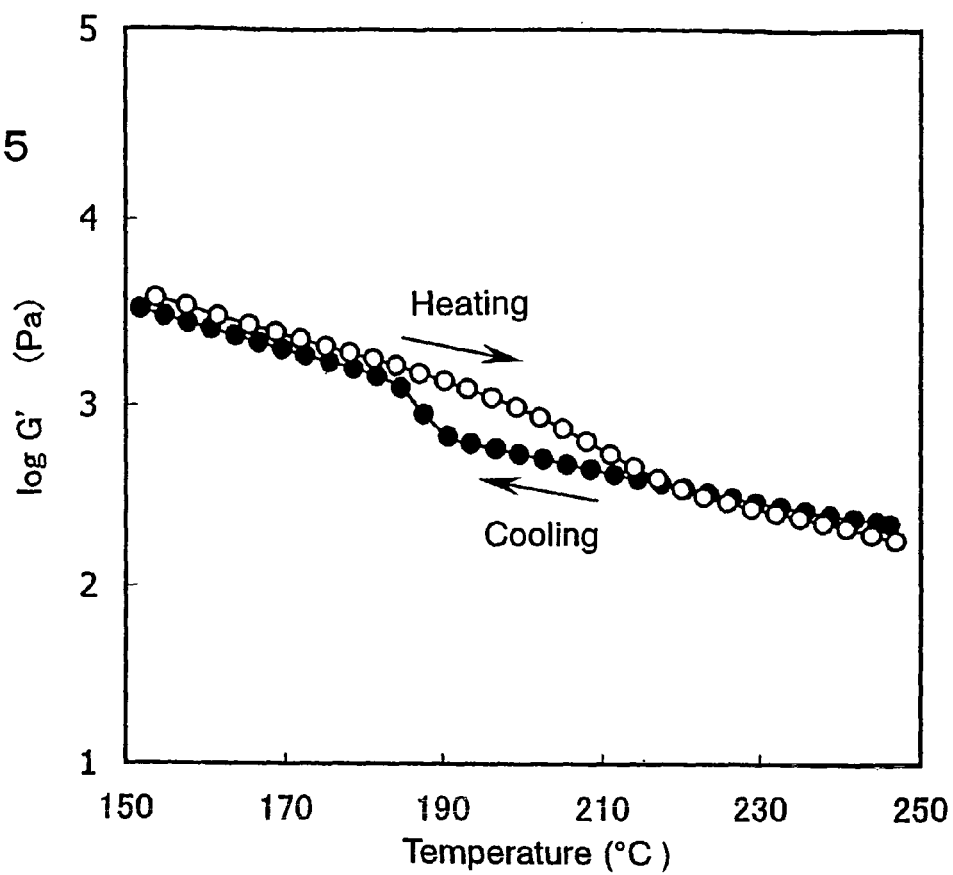
FIG. 5 is a graph showing storage modulus temperature dependency curves during heating and during cooling of the polyolefin-based resin composition obtained in Example I-2. White circles (○) indicate the storage modulus temperature dependency curve during heating and black circles (●) indicate the storage modulus temperature dependency curve during cooling.
Figure 6:
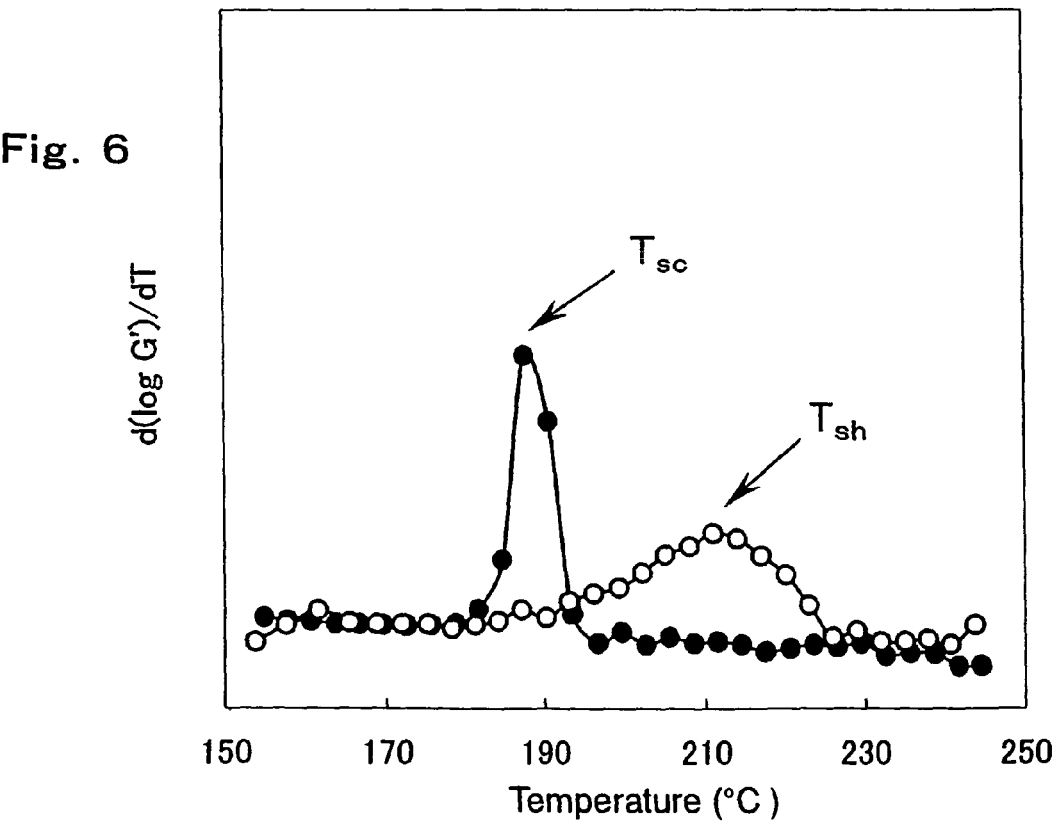
FIG. 6 is the derivative curves of the temperature dependency curves of FIG. 5. White circles (○) indicate the derivative curve of the storage modulus temperature dependency curve during heating and black circles (●) indicate the derivative curve of the storage modulus temperature dependency curve during cooling.

FIG. 5 shows storage modulus temperature dependency curves during heating and during cooling for the polyolefin-based resin composition obtained in Example I-2, and FIG. 6 shows the derivative curves of the temperature dependency curves. In FIG. 5, white circles (○) indicate the storage modulus temperature dependency curve during heating and black circles (●) indicate the storage modulus temperature dependency curve during cooling. Similarly, in FIG. 6, white circles (○) indicate the derivative curve of the storage modulus temperature dependency curve during heating and black circles (●) indicate the derivative curve the storage modulus temperature dependency curve during cooling.

Example I-3

Test pieces were produced in the same manner as in Example I-2 except that 0.1 part by weight of PTC-2MeCHA (74) was used instead of 0.2 part by weight thereof, and the molding temperature was changed to 180° C. Table 7 shows the Tsc (° C.) and Tsh (° C.) of the thus-obtained resin composition, and the flexural modulus (MPa) and degree of orientation of the thus-obtained test pieces.

Example I-4

Test pieces were produced in the same manner as in Example I-1 except that PTC-2MeCHA (50) was used in place of PTC-2MeCHA (100), and the kneading temperature was changed to 240° C. and the molding temperature was changed to 180° C. Table 7 shows the Tsc (° C.) and Tsh (° C.) of the thus-obtained resin composition, and the flexural modulus (MPa) and degree of orientation of the thus-obtained test pieces.

Example I-5

Test pieces were produced in the same manner as in Example I-1 except that PTC-<u>CHA</u> was used in place of PTC-2MeCHA(100), and the kneading temperature was changed to 240° C., and the molding temperature was changed to 180° C. Table 7 shows the Tsc (° C.) and Tsh (° C.) of the thus-obtained resin composition, and the flexural modulus (MPa) and degree of orientation of the thus-obtained test pieces.

Example I-6

Test pieces were produced in the same manner as in Example I-1 except that 0. 05 part by weight of calcium stearate was further added during dry blending. Table 7 shows the Tsc (° C.) and Tsh (° C.) of the thus-obtained resin composition, and the flexural modulus (MPa) and degree of orientation of the thus-obtained test pieces.

Example I-7

Test pieces were produced in the same manner as in Example I-2 except that 0.05 part by weight of calcium stearate was further added during dry blending. Table 7 shows the Tsc (° C.) and Tsh (° C.) of the thus-obtained resin composition, and the flexural modulus (MPa) and degree of orientation of the thus-obtained test pieces.

Example I-8

Test pieces were produced in the same manner as in Example I-2 except that 0.05 part by weight of zinc stearate was used during dry blending. Table 7 shows the Tsc (° C.) and Tsh (° C.) of the thus-obtained resin composition, and the flexural modulus (MPa) and degree of orientation of the thus-obtained test pieces.

Example I-9

Test pieces were produced in the same manner as in Example I-2 except that 0.05 part by weight of magnesium stearate was further added during dry blending. Table 7 shows the Tsc (° C.) and Tsh (° C.) of the thus-obtained resin composition, and the flexural modulus (MPa) and degree of orientation of the thus-obtained test pieces.

Example I-10

Test pieces were produced in the same manner as in Example I-2 except that 0.1 part by weight of calcium stearate was further added during dry blending. Table 7 shows the Tsc (° C.) and Tsh (° C.) of the thus-obtained resin composition, and the flexural modulus (MPa) and degree of orientation of the thus-obtained test pieces.

Example I-11

Test pieces were produced in the same manner as in Example I-5 except that 0.05 part by weight of calcium stearate was further added during dry blending. Table 7 shows the Tsc (° C.) and Tsh (° C.) of the thus-obtained resin composition, and the flexural modulus (MPa) and degree of orientation of the thus-obtained test pieces.

Example II-1

The pellets prepared in Example I-1 were subjected to injection molding at a molding temperature (resin temperature) of 260° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example II-2

The pellets prepared in Example I-2 were subjected to injection molding at a molding temperature (resin temperature) of 240° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example II-3

The pellets prepared in Example I-3 were subjected to injection molding at a molding temperature (resin temperature) of 240° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example II-4

The pellets prepared in Example I-4 were subjected to injection molding at a molding temperature (resin temperature) of 240° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example II-5

The pellets prepared in Example I-5 were subjected to injection molding at a molding temperature (resin temperature) of 240° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example II-6

The pellets prepared in Example I-6 were subjected to injection molding at a molding temperature (resin temperature) of 260° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example 11-7

The pellets prepared in Example I-7 were subjected to injection molding at a molding temperature (resin temperature) of 240° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example II-8

The pellets prepared in Example I-8 were subjected to injection molding at a molding temperature (resin temperature) of 240° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example II-9

The pellets prepared in Example I-9 were subjected to injection molding at a molding temperature (resin temperature) of 240° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example II-10

The pellets prepared in Example I-10 were subjected to injection molding at a molding temperature (resin temperature) of 240° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

Example II-11

The pellets prepared in Example I-11 were subjected to injection molding at a molding temperature (resin temperature) of 240° C., and at a mold temperature of 40° C. to thereby prepare test pieces. Table 8 shows the Tsc (° C.) and Tsh (° C.) of the pellets (resin composition), and the flexural modulus (MPa) and degree of orientation of the thus-obtained test pieces.

TABLE 7

| | (Molding Method (I): r-PP) | | | | | | | | |
|---|---|---|---|---|---|---|---|---|---|
| | Amide-based compound (A) | | Fatty acid metal salt (B) | | Storage modulus transition temperature (° C.) | | Kneading step Resin temp. (° C.) | Molding step Resin temp. (° C.) | Molded product | |
| Example | Type | Amount (wt. part) | Type | Amount (wt. part) | Tsc (° C.) | Tsh (° C.) | | | Flexural modulus (MPa) | Degree of orientation |
| I-1 | PTC-2MeCHA (100) | 0.2 | — | — | 213 | 235 | 260 | 220 | 1400 | 2.4 |
| I-2 | PTC-2MeCHA (74) | 0.2 | — | — | 185 | 211 | 240 | 200 | 1450 | 2.5 |
| I-3 | PTC-2MeCHA (74) | 0.1 | — | — | 168 | 200 | 240 | 180 | 1460 | 2.7 |
| I-4 | PTC-2MeCHA (50) | 0.2 | — | — | 165 | 201 | 240 | 180 | 1460 | 2.8 |
| I-5 | PTC-CHA | 0.2 | — | — | 176 | 189 | 240 | 180 | 1420 | 2.2 |
| I-6 | PTC-2MeCHA (100) | 0.2 | StCa | 0.05 | 198 | 230 | 260 | 220 | 1430 | 2.3 |
| I-7 | PTC-2MeCHA (74) | 0.2 | StCa | 0.05 | 177 | 211 | 240 | 200 | 1510 | 2.4 |
| I-8 | PTC-2MeCHA (74) | 0.2 | StZn | 0.05 | 176 | 211 | 240 | 200 | 1460 | 2.6 |
| I-9 | PTC-2MeCHA (74) | 0.2 | StMg | 0.05 | 174 | 211 | 240 | 200 | 1470 | 2.6 |
| I-10 | PTC-2MeCHA (74) | 0.2 | StCa | 0.1 | 173 | 210 | 240 | 200 | 1500 | 2.3 |
| I-11 | PTC-CHA | 0.2 | StCa | 0.05 | 167 | 190 | 240 | 180 | 1460 | 2.3 |

StCa: Calcium stearate
StZn: Zinc stearate
StMg: Magnesium stearate

TABLE 8

(Molding Method (II): r-PP)

| Example | Amide-based compound (A) Type | Amount (wt. part) | Fatty acid metal salt (B) Type | Amount (wt. part) | Storage modulus transition temperature (° C.) Tsc (° C.) | Tsh (° C.) | Kneading Step Resin temp. (° C.) | Molding step Resin temp. (° C.) | Molded product Flexural modulus (MPa) | Degree of orientation |
|---|---|---|---|---|---|---|---|---|---|---|
| II-1 | PTC-2MeCHA (100) | 0.2 | — | — | 213 | 235 | 260 | 260 | 1330 | 1.8 |
| II-2 | PTC-2MeCHA (74) | 0.2 | — | — | 185 | 211 | 240 | 240 | 1330 | 1.7 |
| II-3 | PTC-2MeCHA (74 | 0.1 | — | — | 168 | 200 | 240 | 240 | 1270 | 1.6 |
| II-4 | PTC-2MeCHA (50) | 0.2 | — | — | 165 | 201 | 240 | 240 | 1320 | 1.5 |
| II-5 | PTC-CHA | 0.2 | — | — | 176 | 189 | 240 | 240 | 1330 | 1.5 |
| II-6 | PTC-2MeCHA (100) | 0.2 | StCa | 0.05 | 198 | 230 | 260 | 260 | 1330 | 1.8 |
| II-7 | PTC-2MeCHA (74) | 0.2 | StCa | 0.05 | 177 | 211 | 240 | 240 | 1320 | 1.7 |
| II-8 | PTC-2MeCHA (74) | 0.2 | StZn | 0.05 | 176 | 211 | 240 | 240 | 1290 | 1.7 |
| II-9 | PTC-2MeCHA (74) | 0.2 | StMg | 0.05 | 174 | 211 | 240 | 240 | 1310 | 1.7 |
| II-10 | PTC-2MeCHA (74) | 0.2 | StCa | 0.1 | 173 | 210 | 240 | 240 | 1320 | 1.6 |
| II-11 | PTC-CHA | 0.2 | StCa | 0.05 | 167 | 190 | 240 | 240 | 1300 | 1.5 |

StCa: Calcicum stearate
StZn: Zinc stearate
StMg: Magnesium stearate

As seen from Tables 7 and 8, the molded products obtained by molding method (II) had a degree of orientation of less than 2, whereas the molded products obtained by molding method (I) had a degree of orientation of at least 2. It is also clear that the molded products having a degree of orientation of at least 2 have significantly higher flexural modulus, compared with the molded products having a degree of orientation of less than 2.

In view of the above, it is clear that the molded products obtained according to molding method (I) of the invention and having the polyolefin-based resin crystal lamellae orientated have a significantly high rigidity.

Example I-12

Per 100 parts by weight of h-PP, 0.2 part by weight of PTC-2MeCHA (100), 0.05 part by weight of tetrakis[methylene-3-(3,5-di-t-butyl-4-hydroxyphenyl)propionate]methane (product of Ciba Specialty Chemicals Inc., product name "IRGANOX 1010"), and 0.05 part by weight of tetrakis(2,4-di-t-butylphenyl)phosphite (product of Ciba Specialty Chemicals Inc., product name "IRGAFOS 168") were weighed. These compounds were dry blended with 100 parts by weight of h-PP using a Henschel mixer at 1000 rpm for 5 minutes.

Using a single screw extruder (L/D=440 mm/20 mm), the obtained dry blend was melt-kneaded at a kneading temperature of 260° C. (resin temperature), the extruded strands were cooled with water, and the strands thus obtained were cut to obtain a polyolefin-based resin composition in the form of pellets.

The thus obtained pellets were injection-molded at a molding temperature (resin temperature) of 220° C. and at a mold temperature of 40° C. to prepare test pieces.

Table 9 shows the Tsc (° C.) and Tsh (° C.) of the thus-obtained resin composition, and the flexural modulus (MPa) and degree of orientation of the thus-obtained test pieces.

Example I-13

Test pieces were produced in the same manner as in Example I-12 except that PTC-2MeCHA(74) was used in place of PTC-2MeCHA(100), and the kneading temperature was changed to 240° C. and the molding temperature was changed to 200° C. Table 9 shows the Tsc (° C.) and Tsh (° C.) of the thus-obtained resin composition, and the flexural modulus (MPa) and degree of orientation of the thus-obtained test pieces.

Example I-14

Test pieces were produced in the same manner as in Example I-13 except that 0.1 part by weight of PTC-2MeCHA (74) was used instead of 0.2 part by weight thereof, and the molding temperature was changed to 180° C. Table 9 shows the Tsc (° C.) and Tsh (° C.) of the thus-obtained resin composition, and the flexural modulus (MPa) and degree of orientation of the thus-obtained test pieces.

Example I-15

Test pieces were produced in the same manner as in Example I-12 except that PTC-2MeCHA (50) was used in place of PTC-2MeCHA (100), and the kneading temperature was changed to 240° C. and the molding temperature was changed to 180° C. Table 9 shows the Tsc (° C.) and Tsh (° C.) of the thus-obtained resin composition, and the flexural modulus (MPa) and degree of orientation of the thus-obtained test pieces.

Example I-16

Test pieces were produced in the same manner as in Example I-12 except that PTC-CHA was used in place of PTC-2MeCHA(100), and the kneading temperature was changed to 240° C., and the molding temperature was changed to 180° C. Table 9 shows the Tsc (° C.) and Tsh (° C.) of the thus-obtained resin composition, and the flexural modulus (MPa) and degree of orientation of the thus-obtained test pieces.

Example I-17

Test pieces were produced in the same manner as in Example I-12 except that 0.05 part by weight of calcium stearate was further added during dry blending. Table 9 shows the Tsc (° C.) and Tsh (° C.) of the thus-obtained resin composition, and the flexural modulus (MPa) and degree of orientation of the thus-obtained test pieces.

Example I-18

Test pieces were produced in the same manner as in Example I-13 except that 0.05 part by weight of calcium stearate was further added during dry blending. Table 9 shows the Tsc (° C.) and Tsh (° C.) of the thus-obtained resin composition, and the flexural modulus (MPa) and degree of orientation of the thus-obtained test pieces.

Example I-19

Test pieces were produced in the same manner as in Example I-13 except that 0.05 part by weight of magnesium stearate was further added during dry blending. Table 9 shows the Tsc (° C.) and Tsh (° C.) of the thus-obtained resin composition, and the flexural modulus (MPa) and degree of orientation of the thus-obtained test pieces.

Example I-20

Test pieces were produced in the same manner as in Example I-13 except that 0.05 part by weight of zinc stearate was further added during dry blending. Table 9 shows the Tsc (° C.) and Tsh (° C.) of the thus-obtained resin composition, and the flexural modulus (MPa) and degree of orientation of the thus-obtained test pieces.

Example I-21

Test pieces were produced in the same manner as in Example I-16 except that 0.05 part by weight of calcium stearate was further added during dry blending. Table 9 shows the Tsc (° C.) and Tsh (° C.) of the thus-obtained resin composition, and the flexural modulus (MPa) and degree of orientation of the thus-obtained test pieces.

Example II-12

The pellets prepared in Example I-12 were subjected to injection molding at a molding temperature (resin temperature) of 260° C. and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

Example II-13

The pellets prepared in Example I-13 were subjected to injection molding at a molding temperature (resin temperature) of 240° C. and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

Example II-14

The pellets prepared in Example I-14 were subjected to injection molding at a molding temperature (resin temperature) of 240° C. and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

Example II-15

The pellets prepared in Example I-15 were subjected to injection molding at a molding temperature (resin temperature) of 240° C. and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

Example II-16

The pellets prepared in Example I-16 were subjected to injection molding at a molding temperature (resin temperature) of 240° C. and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

Example II-17

The pellets prepared in Example I-17 were subjected to injection molding at a molding temperature (resin temperature) of 260° C. and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

Example II-18

The pellets prepared in Example I-18 were subjected to injection molding at a molding temperature (resin temperature) of 240° C. and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

Example II-19

The pellets prepared in Example I-19 were subjected to injection molding at a molding temperature (resin temperature) of 240° C. and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

Example II-20

The pellets prepared in Example I-20 were subjected to injection molding at a molding temperature (resin temperature) of 240° C. and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

Example II-21

The pellets prepared in Example I-21 were subjected to injection molding at a molding temperature (resin temperature) of 240° C., and at a mold temperature of 40° C. to thereby prepare test pieces. Table 10 shows the Tsc (° C.) and Tsh (° C.) of the pellets (resin composition), and the flexural modulus (MPa) and degree of orientation of the thus-obtained test pieces.

TABLE 9

(Molding Method (I): h-PP)

| Example | Amide-based compound (A) Type | Amount (wt. part) | Fatty acid metal salt (B) Type | Amount (wt. part) | Storage modulus transition temperature (°C.) Tsc (°C.) | Tsh (°C.) | Kneading Step Resin temp. (°C.) | Molding step Resin temp. (°C.) | Molded product Flexural modulus (MPa) | Degree of orientation |
|---|---|---|---|---|---|---|---|---|---|---|
| I-12 | PTC-2MeCHA (100) | 0.2 | — | — | 207 | 229 | 260 | 220 | 1890 | 2.3 |
| I-13 | PTC-2MeCHA (74) | 0.2 | — | — | 186 | 214 | 240 | 200 | 1860 | 2.2 |
| I-14 | PTC-2MeCHA (74) | 0.1 | — | — | 168 | 201 | 240 | 180 | 1870 | 204 |
| I-15 | PTC-2MeCHA (50) | 0.2 | — | — | 165 | 197 | 240 | 180 | 1870 | 2.4 |
| I-16 | PTC-CHA | 0.2 | — | — | 168 | 188 | 240 | 180 | 1820 | 2.1 |
| I-17 | PTC-2MeCHA (100) | 0.2 | StCa | 0.05 | 194 | 229 | 260 | 220 | 1890 | 2.2 |
| I-18 | PTC-2MeCHA (74) | 0.2 | StCa | 0.05 | 174 | 211 | 240 | 200 | 1890 | 2.4 |
| I-19 | PTC-2MeCHA (74) | 0.2 | StMg | 0.05 | 172 | 211 | 240 | 200 | 1890 | 2.4 |
| I-20 | PTC-2MeCHA (74) | 0.2 | StZn | 0.05 | 172 | 211 | 240 | 200 | 1890 | 2.4 |
| I-21 | PTC-CHA | 0.2 | StCa | 0.05 | 163 | 188 | 240 | 180 | 1860 | 2.2 |

StCa: Calcium stearate
StMg: Magnesium stearate
StZn: Zinc stearate

TABLE 10

(molding method (II): h-PP)

| Example | Amide-based compound (A) Type | Amount (wt. part) | Fatty acid metal salt (B) Type | Amount (wt. part) | Storage modulus transtition temperature (°C.) Tsc (°C.) | Tsh (°C.) | Kneading step Resin temp. (°C.) | Molding step Resin temp. (°C.) | Molded product Flexural modulus (MPa) | Degree of orientation |
|---|---|---|---|---|---|---|---|---|---|---|
| II-12 | PTC-2MeCHA (100) | 0.2 | — | — | 207 | 229 | 260 | 260 | 1690 | 1.6 |
| II-13 | PTC-2MeCHA (74) | 0.2 | — | — | 186 | 214 | 240 | 240 | 1690 | 1.6 |
| II-14 | PTC-2MeCHA (74) | 0.1 | — | — | 168 | 201 | 240 | 240 | 1630 | 1.6 |
| II-15 | PTC-2MeCHA (50) | 0.2 | — | — | 165 | 197 | 240 | 240 | 1670 | 1.5 |
| II-16 | PTC-CHA | 0.2 | — | — | 168 | 188 | 240 | 240 | 1680 | 1.3 |
| II-17 | PTC-2MeCHA (100) | 0.2 | StCa | 0.05 | 194 | 229 | 260 | 260 | 1680 | 1.7 |
| II-18 | PTC-2MeCHA (74) | 0.2 | StCa | 0.05 | 174 | 211 | 240 | 240 | 1650 | 1.5 |
| II-19 | PTC-2MeCHA (74) | 0.2 | StMg | 0.05 | 172 | 211 | 240 | 240 | 1640 | 1.6 |
| II-20 | PTC-2MeCHA (74) | 0.2 | StZn | 0.05 | 172 | 211 | 240 | 240 | 1660 | 1.6 |
| II-21 | PTC-CHA | 0.2 | StCa | 0.05 | 163 | 188 | 240 | 240 | 1650 | 1.4 |

StCa: Calcium stearate
StMg: Magnesium stearate
StZn: Zinc stearate

As seen from Tables 9 and 10, with respect to h-PP as well as r-PP, the molded products obtained by molding method (II) had a degree of orientation of less than 2, whereas the molded products obtained by molding method (I) had a degree of orientation of at least 2. It is also clear that the molded products having a degree of orientation of at least 2 have significantly higher flexural modulus, compared with the molded products having a degree of orientation of less than 2.

In view of the above, it is clear that the molded products obtained according to molding method (I) of the invention and having the polyolefin-based resin crystal lamellae orientated have a significantly high rigidity.

Example I-22

Per 100 parts by weight of b-PP, 0.2 part by weight of PTC-2MeCHA (100), 0.05 part by weight of tetrakis[methylene-3-(3,5-di-t-butyl-4-hydroxyphenyl)propionate]methane (product of Ciba Specialty Chemicals Inc., product name: "IRGANOX 1010"), and 0.05 part by weight of tetrakis(2,4-di-t-butylphenyl)phosphite (product of Ciba Specialty Chemicals Inc., product name: "IRGAFOS 168") were weighed. These compounds were dry blended with 100 parts by weight of b-PP using a Henschel mixer at 1000 rpm for 5 minutes.

Using a single screw extruder (L/D=440 mm/20 mm), the obtained dry blend was melt-kneaded at a kneading temperature of 260° C. (resin temperature), the extruded strands were cooled with water, and the strands thus obtained were cut to obtain a polyolefin-based resin composition in the form of pellets.

The thus obtained pellets were injection-molded at a molding temperature (resin temperature) of 220° C. and at a mold temperature of 40° C. to prepare test pieces (length: 90 mm, width: 10 mm and height: 4 mm).

Table 11 shows the Tsc (° C.) and Tsh (° C.) of the thus-obtained resin composition, and the flexural modulus (MPa) and degree of orientation of the thus-obtained test pieces.

Example I-23

Test pieces were produced in the same manner as in Example I-22 except that PTC-2MeCHA(74) was used in place of PTC-2MeCHA(100), and the kneading temperature was changed to 240° C. and the molding temperature was changed to 200° C. Table 11 shows the Tsc (° C.) and Tsh (° C.) of the thus-obtained resin composition, and the flexural modulus (MPa) and degree of orientation of the thus-obtained test pieces.

Example I-24

Test pieces were produced in the same manner as in Example I-23 except that 0.1 part by weight of PTC-2MeCHA (74) was used instead of 0.2 part by weight thereof, and the molding temperature was changed to 180° C. Table 11 shows the Tsc (° C.) and Tsh (° C.) of the thus-obtained resin composition, and the flexural modulus (MPa) and degree of orientation of the thus-obtained test pieces.

Example I-25

Test pieces were produced in the same manner as in Example I-22 except that PTC-2MeCHA (50) was used in place of PTC-2MeCHA (100), and the kneading temperature was changed to 240° C. and the molding temperature was changed to 180° C. Table 11 shows the Tsc (° C.) and Tsh (° C.) of the thus-obtained resin composition, and the flexural modulus (MPa) and degree of orientation of the thus-obtained test pieces.

Example I-26

Test pieces were produced in the same manner as in Example I-22 except that PTC-CHA was used in place of PTC-2MeCHA(100), and the kneading temperature was changed to 240° C. and the molding temperature was changed to 180° C. Table 11 shows the Tsc (° C.) and Tsh (° C.) of the thus-obtained resin composition, and the flexural modulus (MPa) and degree of orientation of the thus-obtained test pieces.

Example I-27

Test pieces were produced in the same manner as in Example I-22 except that 0.5 part by weight of calcium stearate was further added during dry blending. Table 11 shows the Tsc (° C.) and Tsh (° C.) of the thus-obtained resin composition, and the flexural modulus (MPa) and degree of orientation of the thus-obtained test pieces.

Example I-28

Test pieces were produced in the same manner as in Example I-23 except that 0.05 part by weight of calcium stearate was further added during dry blending. Table 11 shows the Tsc (° C.) and Tsh (° C.) of the thus-obtained resin composition, and the flexural modulus (MPa) and degree of orientation of the thus-obtained test pieces.

Example I-29

Test pieces were produced in the same manner as in Example I-23 except that 0.05 part by weight of magnesium stearate was further added during dry blending. Table 11 shows the Tsc (° C.) and Tsh (° C.) of the thus-obtained resin composition, and the flexural modulus (MPa) and degree of orientation of the thus-obtained test pieces.

Example I-30

Test pieces were produced in the same manner as in Example I-23 except that 0.05 part by weight of zinc stearate was further added during dry blending. Table 11 shows the Tsc (° C.) and Tsh (° C.) of the thus-obtained resin composition, and the flexural modulus (MPa) and degree of orientation of the thus-obtained test pieces.

Example I-31

Test pieces were produced in the same manner as in Example I-26 except that 0. 05 part by weight of calcium stearate was further added during dry blending. Table 11 shows the Tsc (° C.) and Tsh (° C.) of the thus-obtained resin composition, and the flexural modulus (MPa) and degree of orientation of the thus-obtained test pieces.

Example II-22

The pellets prepared in Example I-22 were subjected to injection molding at a molding temperature (resin temperature) of 260° C. and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

Example II-23

The pellets prepared in Example I-23 were subjected to injection molding at a molding temperature (resin temperature) of 240° C. and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

Example II-24

The pellets prepared in Example I-24 were subjected to injection molding at a molding temperature (resin temperature) of 240° C. and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

Example II-25

The pellets prepared in Example I-25 were subjected to injection molding at a molding temperature (resin temperature) of 240° C. and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

Example II-26

The pellets prepared in Example I-26 were subjected to injection molding at a molding temperature (resin temperature) of 240° C. and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

Example II-27

The pellets prepared in Example I-27 were subjected to injection molding at a molding temperature (resin temperature) of 260° C. and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

Example II-28

The pellets prepared in Example I-28 were subjected to injection molding at a molding temperature (resin temperature) of 240° C. and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

Example II-29

The pellets prepared in Example I-29 were subjected to injection molding at a molding temperature (resin temperature) of 240° C. and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

Example II-30

The pellets prepared in Example I-30 were subjected to injection molding at a molding temperature (resin temperature) of 240° C. and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

Example II-31

The pellets prepared in Example I-31 were subjected to injection molding at a molding temperature (resin temperature) of 240° C., and at a mold temperature of 40° C. to thereby prepare test pieces. Table 12 shows the Tsc (° C.) and Tsh (° C.) of the pellets (resin composition), and the flexural modulus (MPa) and degree of orientation of the thus-obtained test pieces.

TABLE 11

(Molding Method (I): b-PP)

| | Amide-based compound (A) | | Fatty acid metal salt (B) | | Storage modulus transition temperature (° C.) | | Kneading step | Molding step | Molded product | |
|---|---|---|---|---|---|---|---|---|---|---|
| Example | Type | Amount (wt. part) | Type | Amount (wt. part) | Tsc (° C.) | Tsh (° C.) | Resin temp. (° C.) | Resin temp. (° C.) | Flexural modulus (MPa) | Degree of orientation |
| I-22 | PTC-2MeCHA (100) | 0.2 | — | — | 204 | 227 | 260 | 220 | 1560 | 2.0 |
| I-23 | PTC-2MeCHA (74) | 0.2 | — | — | 186 | 212 | 240 | 200 | 1570 | 2.3 |
| I-24 | PTC-2MeCHA (74) | 0.1 | — | — | 168 | 203 | 240 | 180 | 1550 | 2.1 |
| I-25 | PTC-2MeCHA (50) | 0.2 | — | — | 166 | 200 | 240 | 180 | 1550 | 2.3 |
| I-26 | PTC-CHA | 0.2 | — | — | 174 | 206 | 240 | 180 | 1580 | 2.1 |
| I-27 | PTC-2MeCHA (100) | 0.2 | StCa | 0.05 | 201 | 225 | 260 | 220 | 1520 | 2.1 |
| I-28 | PTC-2MeCHA (74) | 0.2 | StCa | 0.05 | 178 | 212 | 240 | 200 | 1600 | 2.1 |
| I-29 | PTC-2MeCHA (74) | 0.2 | StMg | 0.05 | 175 | 212 | 240 | 200 | 1580 | 2.2 |
| I-30 | PTC-2MeCHA (74) | 0.2 | StZn | 0.05 | 176 | 212 | 240 | 200 | 1560 | 2.2 |
| I-31 | PTC-CHA | 0.2 | StCa | 0.05 | 168 | 206 | 240 | 180 | 1570 | 2.1 |

StCa: Calcium stearate
StMg: Magnesium stearate
StZn: Zinc stearate

TABLE 12

(Molding Method (II): b-PP)

| Example | Amide-based compound (A) Type | Amount (wt. part) | Fatty acid metal salt (B) Type | Amount (wt. part) | Storage modulus transition temperature (° C.) Tsc (° C.) | Tsh (° C.) | Kneading step Resin temp. (° C.) | Molding step Resin temp. (° C.) | Molded product Flexural modulus (MPa) | Degree of orientation |
|---|---|---|---|---|---|---|---|---|---|---|
| II-22 | PTC-2MeCHA (100) | 0.2 | — | — | 204 | 227 | 260 | 260 | 1290 | 1.5 |
| II-23 | PTC-2MeCHA (74) | 0.2 | — | — | 186 | 212 | 240 | 240 | 1360 | 1.5 |
| II-24 | PTC-2MeCHA (74) | 0.1 | — | — | 168 | 203 | 240 | 240 | 1310 | 1.4 |
| II-25 | PTC-2MeCHA (50) | 0.2 | — | — | 166 | 200 | 240 | 240 | 1300 | 1.3 |
| II-26 | PTC-CHA | 0.2 | — | — | 174 | 206 | 240 | 240 | 1320 | 1.5 |
| II-27 | PTC-2MeCHA (100) | 0.2 | StCa | 0.05 | 201 | 225 | 260 | 260 | 1270 | 1.7 |
| II-28 | PTC-2MeCHA (74) | 0.2 | StCa | 0.05 | 178 | 212 | 240 | 240 | 1350 | 1.3 |
| II-29 | PTC-2MeCHA (74) | 0.2 | StMg | 0.05 | 175 | 212 | 240 | 240 | 1350 | 1.5 |
| II-30 | PTC-2MeCHA (74) | 0.2 | StZn | 0.05 | 176 | 212 | 240 | 240 | 1330 | 1.6 |
| II-31 | PTC-CHA | 0.2 | StCa | 0.05 | 168 | 206 | 240 | 240 | 1310 | 1.2 |

StCa: Calcium stearate
StMg: Magnesium stearate
StZn: Zinc stearate

As seen from Tables 11 and 12, with respect to b-PP as well as r-PP, the molded products obtained by molding method (II) had a degree of orientation of less than 2, whereas the molded products obtained by molding method (I) had a degree of orientation of at least 2. It is also clear that the molded products having a degree of orientation of at least 2 have significantly higher flexural modulus, compared with the molded products having a degree of orientation of less than 2.

In view of the above, it is clear that the molded products obtained according to molding method (I) of the invention and having the polyolefin-based resin crystal lamellae orientated have a significantly high rigidity.

Example I-32

The pellets prepared in Example I-28 were subjected to injection molding at a molding temperature (resin temperature) of 200° C. and at a mold temperature of 40° C. to thereby prepare test pieces (sheets having a thickness of 2 mm) for the impact resistance test. Table 13 shows the impact resistance test results.

Example II-32

The pellets prepared in Example I-28 were subjected to injection molding at a molding temperature (resin temperature) of 240° C. and at a mold temperature of 40° C. to thereby prepare test pieces for the impact resistance test. Table 13 shows the impact resistance test results.

Comparative Example 7

The pellets prepared in Comparative Example 6 were subjected to injection molding at a molding temperature (resin temperature) of 200° C. and at a mold temperature of 40° C. to thereby prepare test pieces for the impact resistance test. Table 13 shows the impact resistance test results.

TABLE 13

(Molding Method (I), Molding Method (II): b-PP)

| | Amide-based compound (A) Type | Amount (wt. part) | Fatty acid metal salt (B) Type | Amount (wt. part) | Storage modulus transition temperature (° C.) Tsc (° C.) | Tsh (° C.) | Kneading step Resin temp. (° C.) | Molding step Resin temp. (° C.) | Impact resistance 50% breaking energy (J) |
|---|---|---|---|---|---|---|---|---|---|
| Example I-32 | PTC-2MeCHA (74) | 0.2 | StCa | 0.05 | 178 | 212 | 240 | 200 | 7.3 |
| Example II-32 | PTC-2MeCHA (74) | 0.2 | StCa | 0.05 | 178 | 212 | 240 | 240 | 6.5 |
| Comp. Ex. 7 | — | — | StCa | 0.05 | — | — | 240 | 200 | 5.5 |

StCa: Calcium stearate

Table 13 shows that the molded product obtained using b-PP by molding method (I) has not only a significantly improved flexural modulus but also a significantly improved impact resistance.

INDUSTRIAL APPLICABILITY

The polyolefin-based resin composition of the invention can control the crystallization rate and crystallization temperature, and therefore can be suitably used for injection molding, film molding, blow molding, extrusion molding, etc. A molded product obtained by molding the polyolefin-based resin composition contains a low amount of undispersed matter and has excellent transparency, and can be used for packaging materials for medical instruments, foods, plants, etc.; various types of cases; food containers; containers for use in microwave ovens; sundries; stationeries; electrical and mechanical parts; automobile parts; etc.

The invention claimed is:

1. A polyolefin-based resin composition comprising a polyolefin-based resin and a crystallization rate-controlling composition comprising:
   (A) at least one amide-based compound represented by General Formula (1)

$$R^1\text{-(CONHR}^2)_k \tag{1}$$

wherein $R^1$ represents a residue obtained by removing all the carboxyl groups of 1,2,3-propanetricarboxylic acid or 1,2,3,4-butanetetracarboxylic acid, k represents an integer of 3 or 4, and the three or four $R^2$ groups are the same or different, and each represent cyclohexyl or cyclohexyl substituted with one $C_{1-10}$ linear or branched alkyl; and
   (B) at least one fatty acid metal salt represented by General Formula (2)

$$(R^3\text{—COO})_n M \tag{2}$$

wherein $R^3$ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two $R^3$ groups may be the same or different, and M represents a monovalent or divalent metal,
   the component (A): component (B) weight ratio being from 95:5 to 30:70.

2. The composition according to claim 1, wherein the component (A): component (B) weight ratio is from 90:10 to 60:40.

3. The composition according to claim 1, wherein the three or four $R^2$ groups in General Formula (1) are the same or different and each represent cyclohexyl or cyclohexyl substituted with $C_{1-4}$ linear or branched alkyl.

4. The composition according to claim 1, wherein the three or four $R^2$ groups in General Formula (1) are the same or different and each represent cyclohexyl or 2-methyl-, 3-methyl- or 4-methylsubstituted cyclohexyl.

5. The composition according to claim 1, wherein $R^1$ in General Formula (1) represents a residue obtained by removing all of the carboxyl groups from 1,2,3-propanetricarboxylic acid, and k is 3.

6. The composition according to claim 1, wherein M in General Formula (2) is at least one metal selected from the group consisting of alkali metals, alkaline earth metals and zinc.

7. The composition according claim 1, wherein $R^3$ in General Formula (2) is a residue obtained by removing the carboxyl group from a $C_{10-18}$ saturated or unsaturated aliphatic monocarboxylic acid which may have at least one hydroxyl group per molecule.

8. The composition according to claim 7, wherein the aliphatic monocarboxylic acid is at least one member selected from the group consisting of lauric acid, myristic acid, palmitic acid, stearic acid, oleic acid, and 12-hydroxystearic acid.

9. A method for controlling the crystallization rate of a polyolefin-based resin during molding of the polyolefin-based resin, the method comprising
   incorporating into the polyolefin-based resin a polyolefin-based resin crystallization rate-controlling composition comprising:
   (A) at least one amide-based compound represented by General Formula (1)

$$R^1\text{-(CONHR}^2)_k \tag{1}$$

wherein $R^1$ represents a residue obtained by removing all of the carboxyl groups from 1,2,3-propanetricarboxylic acid or 1,2,3,4-butanetetracarboxylic acid, k represents an integer of 3 or 4, and the three or four $R^2$ groups are the same or different and each represent cyclohexyl or cyclohexyl substituted with one $C_{1-10}$ linear or branched alkyl, and
   (B) at least one fatty acid metal salt represented by General Formula (2)

$$(R^3\text{—COO})_n M \tag{2}$$

wherein $R^3$ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two $R^3$ may be the same or different, and M represents a monovalent or divalent metal, the weight ratio of component (A):component (B) being from 95:5 to 30:70, or
   incorporating component (A) and component (B), simultaneously or separately, into the polyolefin-based resin such that the weight ratio of component (A) component (B) is from 95:5 to 30:70
   to thereby give a polyolefin-based resin composition, and molding the resin composition.

10. The method according to claim 9, wherein the weight ratio of component (A) : component (B) is from 90:10 to 60:40.

11. The method according to claim 9, wherein the resin composition is molded at a resin temperature higher than the transition temperature of storage modulus during heating.

12. The method according to claim 9, wherein the resin composition is molded at a resin temperature not lower than the melting temperature of the polyolefin-based resin and not higher than the transition temperature of storage modulus during heating.

13. A process for producing a polyolefin-based resin molded product, the process comprising
   incorporating into a polyolefin-based resin a polyolefin-based resin crystallization rate-controlling composition comprising:
   (A) at least one amide-based compound represented by General Formula (1)

$$R^1\text{-(CONHR}^2)_k \tag{1}$$

wherein $R^1$ represents a residue obtained by removing all of the carboxyl groups from 1,2,3- propanetricarboxylic acid or 1,2,3,4-butanetetracarboxylic acid, k represents an integer of 3 or 4, and the three or four $R^2$ groups are the same or different and each represent cyclohexyl or cyclohexyl substituted with one $C_{1-10}$ linear or branched alkyl, and (B) at least one fatty acid metal salt represented by General Formula (2)

wherein $R^3$ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two $R^3$ may be the same or different, and M represents a monovalent or divalent metal, the weight ratio of component (A):component (B) being from 95:5 to 30:70, or incorporating component (A) and component (B), simultaneously or separately, into a polyolefin-based resin such that the weight ratio of component (A) : component (B) is from 95:5 to 30:70 to thereby give a polyolefin-based resin composition, and molding the resin composition.

14. The process according to claim 13, wherein the weight ratio of component (A) : component (B) is from 90:10 to 60:40.

15. The process according to claim 13, wherein the resin composition is molded at a resin temperature higher than the transition temperature of storage modulus during heating.

16. The process according to claim 13, wherein the resin composition is molded at a resin temperature not lower than the melting temperature of the polyolefin-based resin and not higher than the transition temperature of storage modulus during heating.

17. A process according to claim 16, comprising the step of molding a molten polyolefin-based resin composition comprising a network structure formed of fibrous particles of an amide-based compound represented by the formula (1-p)

wherein $R^{1P}$ represents a residue obtained by removing all of the carboxyl groups from 1,2,3-propanetricarboxylic acid, and the three $R^{2P}$ groups are the same or different and each represent cyclohexyl or cyclohexyl substituted with one $C_1$ linear or branched alkyl, under temperature conditions such that the fibrous particles constituting the network structure do not dissolve or melt.

18. The process according to claim 17, wherein the polyolefin-based resin composition containing the network structure formed of said fibrous particles is molded by a molding method comprising an injection step or an extrusion step.

19. The process according to claim 13, wherein said polyolefin-based resin is at least one member selected from the group consisting of propylene homopolymers and propylene copolymers.

20. A polyolefin-based resin molded product comprising:
a polyolefin-based resin,
(A) at least one amide-based compound represented by General Formula (1)

wherein $R^1$ represents a residue obtained by removing all of the carboxyl groups from 1,2,3-propanetricarboxylic acid or 1,2,3,4-butanetetracarboxylic acid, k represents an integer of 3 or 4, and the three or four $R^2$ groups are the same or different and each represent cyclohexyl or cyclohexyl substituted with one $C_{1-10}$ linear or branched alkyl, and (B) at least one fatty acid metal salt represented by General Formula (2)

wherein $R^3$ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two $R^3$ groups may be the same or different and M represents a monovalent or divalent metal, the weight ratio of component (A): component (B) being from 95:5 to 30:70, the molded product having an orientation degree represented by the ratio of the (040) reflection intensity to the (110) reflection intensity determined by wide angle X-ray diffractometry of at least 2.

21. A polyolefin-based resin molded product comprising:
a polyolefin-based resin, and
(A) at least one amide-based compound represented by the formula (1-p)

wherein $R^{1P}$ represents a residue obtained by removing all of the carboxyl groups from 1,2,3- propanetricarboxylic acid, and the three $R^{2P}$ groups are the same or different and each represent cyclohexyl or cyclohexyl substituted with one $C_{1-4}$ linear or branched alkyl, and (B) at least one fatty acid metal salt represented by General Formula (2)

wherein $R^3$ represents a residue obtained by removing the carboxyl group from a $C_{8-32}$ saturated or unsaturated aliphatic monocarboxylic acid which may have at least one hydroxyl group per molecule, n represents an integer of 1 or 2, when n is 2, the two $R^3$ groups may be the same or different and M represents a monovalent or divalent metal, the weight ratio of component (A) component (B) being from 95:5 to 30:70, the molded product having an orientation degree represented by the ratio of the (040) reflection intensity to the (110) reflection intensity determined by wide angle X-ray diffractometry of at least 2.

22. The polyolefin-based resin composition according to claim 1 comprising the crystallization rate—controlling composition in an amount of 0.01 to 10 parts by weight per 100 parts by weight of the polyolefin-based resin.

23. A polyolefin-based resin molded product obtained by molding the polyolefin-based resin composition of claim 1.

24. The polyolefin-based resin composition according to claim 1 wherein the weight ratio of component (A): component (B) is in the range from 90:10 to 60:40.

25. A process for producing a polyolefin-based resin molded product, comprising the steps of molding a molten polyolefin-based resin composition comprising:

a network structure formed of fibrous particles of (A) an amide-based compound represented by the formula (1)

wherein $R^1$ represents a residue obtained by removing all of the carboxyl groups from 1,2,3-propanetricarboxylic acid or 1,2,3,4-butanetetracarboxylic acid, k represents an integer of 3 or 4, and the three of four $R^2$ groups are the same or different and each represent cyclohexyl or cyclohexyl substituted with one $C_{1-10}$ linear or branched alkyl, and (B) at least one fatty acid metal salt represented by General Formula (2)

wherein $R^3$ represents a residue obtained by removing the carboxyl group from a $C_{8-32}$ saturated or unsaturated aliphatic monocarboxylic acid which optionally has at least one hydroxyl group per molecule, n represents an integer of 1 or 2, when n is 2, the two $R^3$ groups may be the same or different, and M represents a monovalent or divalent metal, the weight ratio of component (A): component (B)95:5 to 30:70, under temperature conditions such that the fibrous particles constituting the network structure do not dissolve or melt.

26. The process according to claim 25 comprising the steps of:
    (a) dissolving said at least one amide-based compound represented by the formula (1) in a molten polyolefin-based resin to prepare a molten mixture,
    (b) cooling the molten mixture to a temperature not higher than the transition temperature of storage modulus during cooling to obtain a polyolefin-based resin composition containing a network structure formed of fibrous particles of said at least one amide-based compound represented by the formula (1), and
    (c) molding the polyolefin-based resin composition at a resin temperature not lower than the melting temperature of the polyolefin-based resin and not higher than the transition temperature of storage modulus during heating.

27. The process according to claim 25, wherein said polyolefin-based resin composition is in the form of pellets.

28. The process according to claim 26, wherein the polyolefin-based resin composition containing the network structure formed of said fibrous particles is molded by a molding method comprising an injection step or an extrusion step.

29. The process according to claim 26, wherein said molding method comprising an injection step or an extrusion step is injection molding, extrusion molding, injection-blow molding, injection-extrusion blow molding, injection-compression molding, extrusion-blow molding, injection-compression molding, extrusion-blow molding, extrusion-thermoforming or melt-spinning.

30. The process according to claim 25, wherein said polyolefin-based resin is at least one member selected from the group consisting of propylene homopolymers and propylene copolymers.

31. A polyolefin-based resin molded product prepared by the process of claim 25 and having an orientation degree represented by the ratio of the (040) reflection intensity to the (110) reflection intensity determined by wide angle X-ray diffractometry of at least 2.

* * * * *